US012552779B2

(12) United States Patent
Lee et al.

(10) Patent No.: US 12,552,779 B2
(45) Date of Patent: Feb. 17, 2026

(54) 1-ALKYL-5-ARYLIDENE-2-SELENOXO-IMIDAZOLIDINE-4-ON AND DERIVATIVE THEREOF, PREPARATION METHOD THEREFOR, AND COMPOSITION COMPRISING SAME FOR PREVENTING, ALLEVIATING OR TREATING NEURODEGENERATIVE DISEASES

(71) Applicants: DUKSUNG WOMEN'S UNIVERSITY INDUSTRY-ACADEMIC COOPERATION FOUNDATION, Seoul (KR); KNU-INDUSTRY COOPERATION FOUNDATION, Gangwon-do (KR); INDUSTRY ACADEMIC COOPERATION FOUNDATION OF YEUNGNAM UNIVERSITY, Gyeongsangbuk-do (KR); EWHA UNIVERSITY - INDUSTRY COLLABORATION FOUNDATION, Seoul (KR)

(72) Inventors: Sang Hyup Lee, Seoul (KR); Dong Young Choi, Gyeongsangbuk-do (KR); Jungkwan Lee, Busan (KR); Sung Hoon Ahn, Seoul (KR); Sun Choi, Seoul (KR); Hyun Sung Cho, Daejeon (KR); Cho Rong Kim, Seoul (KR); Yoo Jin Lim, Seoul (KR); Ye Eun Kim, Seoul (KR); Yoonji Lee, Seoul (KR)

(73) Assignees: DUKSUNG WOMEN'S UNIVERSITY INDUSTRY-ACADEMIC COOPERATION FOUNDATION, Seoul (KR); KNU- INDUSTRY COOPERATION FOUNDATION, Gangwon-Do (KR); INDUSTRY ACADEMIC COOPERATION FOUNDATION OF YEUNGNAM UNIVERSITY, Gyeongsangbuk-Do (KR); EWHA UNIVERSITY—INDUSTRY COLLABORATION FOUNDATION, Seoul (KR)

(*) Notice: Subject to any disclaimer, the term of this patent is extended or adjusted under 35 U.S.C. 154(b) by 509 days.

(21) Appl. No.: 18/004,952

(22) PCT Filed: Jul. 9, 2021

(86) PCT No.: PCT/KR2021/008850
§ 371 (c)(1),
(2) Date: Jan. 10, 2023

(87) PCT Pub. No.: WO2022/010328
PCT Pub. Date: Jan. 13, 2022

(65) Prior Publication Data
US 2023/0286956 A1 Sep. 14, 2023

(30) Foreign Application Priority Data

Jul. 10, 2020 (KR) .......................... 10-2020-0085549

(51) Int. Cl.
C07D 403/10 (2006.01)
A61P 25/28 (2006.01)
C07D 233/96 (2006.01)
C07D 401/06 (2006.01)

(52) U.S. Cl.
CPC ............ *C07D 403/10* (2013.01); *A61P 25/28* (2018.01); *C07D 233/96* (2013.01); *C07D 401/06* (2013.01)

(58) Field of Classification Search
CPC .. C07D 403/10; C07D 233/96; C07D 401/06; A61P 25/28
USPC ...................................................... 514/235.8
See application file for complete search history.

(56) References Cited

U.S. PATENT DOCUMENTS

2012/0093832 A1 4/2012 Brüstle et al.

FOREIGN PATENT DOCUMENTS

WO 2004106312 A1 12/2004

OTHER PUBLICATIONS

International Search Report for International Application No. PCT/KR2021/008850 dated Oct. 19, 2021, 7 pages with English translation.
Kuznetsova, O. Y. et al., "An Improved Protocol for Synthesis of 3-Substituted 5-Arylidene-2-thiohydantoins: Two-step Procedure Alternative to Classical Methods", Journal of Heterocyclic Chemistry, 2015, vol. 53, No. 5, pp. 1570-1577.
Maeda, H. et al., "Synthesis of selenohydantoins from isoselenocyanates and α-amino acids", Heterocycles, 2010, vol. 82, No. 2, pp. 1709-1717.

(Continued)

*Primary Examiner* — Kristin A Vajda
(74) *Attorney, Agent, or Firm* — MH2 Technology Law Group, LLP

(57) ABSTRACT

The present invention relates to 1-alkyl-5-arylidene-2-selenoxoimidazolidine-4-ons and derivatives thereof, a method for producing the same, and a composition for prevention, improvement or treatment of neurodegenerative disease containing the same. Specifically, 1-alkyl-5-arylidene-2-selenoxoimidazolidine-4-ons and derivatives thereof, which are novel compounds of the present invention, can be used as an excellent composition for prevention, improvement or treatment of neurodegenerative disease.

16 Claims, 12 Drawing Sheets

(56) References Cited

OTHER PUBLICATIONS

Vyhivskyi, O. et al., "Copper-Promoted C—Se Cross-Coupling of 2-Selenohydantoins with Arylboronic Acids in an Open Flask", ACS Combinatorial Science, 2019, vol. 21, No. 6, pp. 456-464.
Vyhivskyi, O. et al., "Ullmann-type C—Se Cross-Coupling in the Hydantoin Family: Synthesis, Mechanistic Studies, and Tests of Biological Activity", The Journal of Organic Chemistry, 2020, vol. 85. No. 5, pp. 3160-3173.
Bae et al., "Synthesis and biological evaluation of 3-substituted 5-benzylidene-1-methyl-2-thiohydantoins as potent NADPH oxidase (NOX) inhibitors", Bioorganic & Medicinal Chemistry, 2016, vol. 24, pp. 4144-4151.
Extended European Search Report and Search Opinion dated Jun. 18, 2024 for corresponding European Application No. 21837734.9, 7 pages.

1-ALKYL-5-ARYLIDENE-2-SELENOXO-IMIDAZOLIDINE-4-ON AND DERIVATIVE THEREOF, PREPARATION METHOD THEREFOR, AND COMPOSITION COMPRISING SAME FOR PREVENTING, ALLEVIATING OR TREATING NEURODEGENERATIVE DISEASES

CROSS-REFERENCE TO RELATED APPLICATIONS

This application is a U.S. National Stage application of PCT/KR2021/008850 filed 9 Jul. 2021, which claims priority to Korean application No. 10-2020-0085549 filed 10 Jul. 2020, the entire disclosures of which are hereby incorporated by reference in their entireties.

TECHNICAL FIELD

The present invention relates to 1-alkyl-5-arylidene-2-selenoxoimidazolidine-4-ons and derivatives thereof, a method for producing the same, and a composition for prevention, improvement or treatment of neurodegenerative disease containing the same. Specifically, 1-alkyl-5-arylidene-2-selenoxoimidazolidine-4-ons and derivatives thereof, which are novel compounds of the present invention, can be used as an excellent composition for prevention, improvement or treatment of neurodegenerative disease.

BACKGROUND ART

Neurodegenerative disease (ND) is a disease in which nerve cells in the human brain degenerate and cause brain function abnormalities, and includes Parkinson's disease, Alzheimer's disease, Huntington's disease, Lou Gehrig's disease, multiple sclerosis, and Lewy body related disease, and the like.

Parkinson's disease (PD), one of the representative neurodegenerative diseases, occurs most often in the elderly over 60 years of age, and is expected to become a more serious problem in the future along with the aging phenomenon since this disease significantly deteriorates the patient's quality of life upon onset but is hardly treated or improved.

The number of patients with Parkinson's disease reaches 6.3 million worldwide, of which more than 120,000 deaths occur every year. In Korea as well, the number of patients with Parkinson's disease is more than 100,000 and the severity is increasing.

The fundamental pathology of Parkinson's disease is the death of dopaminergic neuronal cells in the substantia nigra, resulting in damage to the signal transduction pathway, but the cause of dopaminergic neuronal cell death has not been clearly revealed.

Recently, a large number of studies on the cause of dopaminergic neuronal cell death have been conducted in the pathological aspect. Among others, the result that oxidative stress by activation of NADPH oxidase (NOX), an enzyme in vivo, induces the dopaminergic neuronal cell death in Parkinson's disease and the result that NOX overexpression is found in dopaminergic neuronal cells of the substantia nigra of patients with Parkinson's disease (PD) suggest that there is a deep connection between NOX and Parkinson's disease.

As another pathological phenomenon, it has been reported that abnormal accumulation and aggregation of α-synuclein is the cause of Parkinson's disease. It has been observed that α-synuclein accumulation and aggregation are increased in the substantia nigra of patients with Parkinson's disease. As a result, it has been revealed that oxidative stress causes overexpression and aggregation of α-synuclein and NOX activation, and these changes are deeply involved in the development of Parkinson's disease.

Nuclear factor erythroid 2-related factor 2 (Nrf2), a protein involved in the process of counteracting oxidative stress, is also known to be associated with Parkinson's disease.

As medicines for Parkinson's disease, dopaminergic target drugs are mainly developed and some non-dopamine target drugs are being developed. In addition, studies on new targets, deep brain stimulation, and cell therapy products are in progress. In Korea, studies on existing targets is progressing to the extent of developing incrementally modified drugs of existing medicines. Overseas, it is known that the development of anti-Parkinson drugs has been sluggish, to the extent that the MAO-B inhibitor Xadago, as a combination therapy with existing drugs, has been developed as an adjuvant in about 10 years.

However, currently used anti-Parkinson drugs have several fundamental limitations. Currently used anti-Parkinson drugs are to the extent of simply quantitatively supplementing (dopa therapy) the lack of dopamine, which is the main cause of Parkinson's disease or using dopamine agonists with great side effects. Most of these drugs have only the effect of delaying the worsening of symptoms but not treat the disease as well as have a problem in that side effects related to dyskinesia and various forms of mental disorders appear continuously. As a result, these drugs have limitations in not being fundamental treatment for the dopamine nervous system.

For the fundamental treatment of neurodegenerative diseases (ND), particularly Parkinson's disease, normalizing the dopamine production pathway (normalization of nerve cells) by inhibiting dopaminergic neuronal cell death is the most fundamental and complete treatment. Therefore, there is an urgent need for the development of a novel medicine that inhibits nerve cell death and protects nerve cells through the normalization of dopamine pathway.

Accordingly, for the fundamental treatment of neurodegenerative diseases (ND) including Parkinson's disease, the present inventors have developed a novel compound that inhibits the generation of reactive oxygen species by inhibiting NOX enzyme and simultaneously inhibits the aggregation and fibrosis of core protein α-synuclein as well as activates nuclear factor erythroid 2-related factor 2 (Nrf2) and inhibits dopaminergic neuronal cell death, thereby exhibiting an effect of protecting nerve cells, confirmed the effect of the novel compound to treat neurodegenerative diseases (ND) such as Parkinson's disease, and thus completed the present invention.

SUMMARY OF INVENTION

Technical Problem

An object of the present invention is to provide 1-alkyl-5-arylidene-2-selenoxoimidazolidine-4-ons and derivatives thereof having an effect of inhibiting NOX enzyme directly or indirectly involved in nerve cell death, inhibiting aggregation and fibrosis of α-synuclein, and activating nuclear factor erythroid 2-related factor 2 (Nrf2) for fundamental treatment of neurodegenerative diseases (ND) including Parkinson's disease, and to provide a method for producing the same.

Another object of the present invention is to provide a composition for prevention, improvement or treatment of neurodegenerative disease (ND) containing a 1-alkyl-5-arylidene-2-selenoxoimidazolidine-4-on and a derivative thereof or a pharmaceutically acceptable salt thereof as an active ingredient.

Solution to Problem

The present invention provides a compound represented by the following Chemical Formula 1 or a pharmaceutically acceptable salt thereof. The present invention also provides a pharmaceutical composition for prevention or treatment of neurodegenerative disease containing a compound represented by the following Chemical Formula 1 or a pharmaceutically acceptable salt thereof.

[Chem. 1]

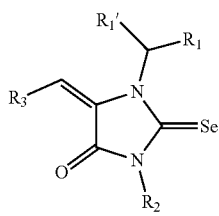

where,

R$_1$ and R$_1$' are each independently selected from the group consisting of hydrogen, alkyl, cycloalkyl, heterocycloalkyl, an aryl group, heteroaryl, benzyl, and a phenethyl group, or R$_1$ and R$_1$' may bond to each other to form a single ring;

R$_2$ and R$_3$ are each independently hydrogen, halo, cyano, alkyl, alkoxy, alkenyl, alkynyl, cycloalkyl, heterocycloalkyl, heterocycloalkyl-alkyl, aryl, aryl-alkyl, or heteroaryl; and the alkyl, alkoxy, alkenyl, alkynyl, cycloalkyl, heterocycloalkyl, heterocycloalkyl-alkyl, aryl, aryl-alkyl, or heteroaryl may not be substituted or may be substituted with one or more groups selected from the group consisting of hydroxy; halogen; alkyl; -alkyl-hydroxy; -heterocycloalkyl-alkyl-hydroxy; —NH alkyl-O-alkyl-hydroxy; —NH alkyl-O-alkyl-halogen; —NH alkyl-heterocycloalkyl; alkoxy; amino; dialkylamino; nitro; cyano; carbonyl; cycloalkyl; heterocycloalkyl unsubstituted or substituted with alkyl; aryl; and heteroaryl.

In an embodiment, R$_1$ and R$_1$' are each independently selected from the group consisting of hydrogen, C$_1$-C$_6$ alkyl, C$_3$-C$_8$ cycloalkyl, C$_3$-C$_8$ heterocycloalkyl, C$_6$-C$_{10}$ aryl, C$_5$-C$_{10}$ heteroaryl, benzyl and a phenethyl group, or R$_1$ and R$_1$' may bond to each other to form a single ring.

In an embodiment,

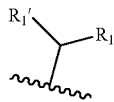

may be

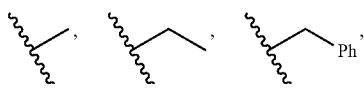

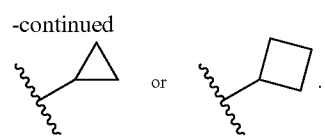

In an embodiment, R$_2$ may be hydrogen; C$_1$-C$_{12}$ alkyl unsubstituted or substituted with halogen; C$_3$-C$_{10}$ cycloalkyl; —C$_1$-C$_6$ alkyl-C$_3$-C$_{10}$ heterocycloalkyl containing one or more heteroatoms selected from the group consisting of N, S and O; —C$_6$-C$_{10}$ aryl unsubstituted or substituted with halogen or C$_1$-C$_{12}$ alkyl; or —C$_1$-C$_6$ alkyl-C$_6$-C$_{10}$ aryl.

In an embodiment, R$_2$ may be hydrogen; C$_1$-C$_{12}$ alkyl; C$_1$-C$_6$ alkyl substituted with halogen; C$_3$-C$_8$ cycloalkyl; —C$_1$-C$_6$ alkyl-C$_3$-C$_{10}$ heterocycloalkyl containing heteroatoms N and O; —C$_6$-C$_{10}$ aryl unsubstituted or substituted with halogen or C$_1$-C$_6$ alkyl; or —C$_1$-C$_6$ alkyl-C$_6$-C$_{10}$ aryl.

In an embodiment, R$_2$ may be hydrogen; C$_1$-C$_{12}$ alkyl; C$_1$-C$_6$ alkyl substituted with halogen; C$_3$-C$_8$ cycloalkyl; —C$_1$-C$_6$ alkyl-morpholine; phenyl unsubstituted or substituted with halogen or C$_1$-C$_6$ alkyl; or —C$_1$-C$_6$ alkyl-phenyl.

In an embodiment, R$_3$ is C$_6$-C$_{10}$ heterocycloalkyl, C$_6$-C$_{10}$ aryl or C$_6$-C$_{10}$ heteroaryl, and the heterocycloalkyl, aryl or heteroaryl may not be substituted or may be substituted with one or more groups selected from the group consisting of hydroxy; halogen; C$_1$-C$_6$ alkyl; —C$_1$-C$_6$ alkyl-hydroxy; —C$_3$-C$_8$ heterocycloalkyl-C$_1$-C$_6$ alkyl-hydroxy; —NHC$_1$-C$_6$ alkyl-O—C$_1$-C$_6$ alkyl-hydroxy; —NHC$_1$-C$_6$ alkyl-O—C$_1$-C$_6$ alkyl-halogen; —NHC$_1$-C$_6$ alkyl-C$_3$-C$_8$ heterocycloalkyl; C$_1$-C$_6$ alkoxy; amino; di-C$_1$-C$_6$ alkylamino; and C$_3$-C$_8$ heterocycloalkyl unsubstituted or substituted with C$_1$-C$_6$ alkyl.

In an embodiment, R$_3$ is C$_6$-C$_{10}$ heterocycloalkyl having a heteroatom N, C$_6$-C$_{10}$ aryl or C$_6$-C$_{10}$ heteroaryl having a heteroatom N, and the heterocycloalkyl, aryl or heteroaryl may not be substituted or may be substituted with one or more groups selected from the group consisting of hydroxy; halogen; C$_1$-C$_6$ alkyl; —C$_1$-C$_6$ alkyl-hydroxy; —C$_3$-C$_8$ heterocycloalkyl-C$_1$-C$_6$ alkyl-hydroxy; —NHC$_1$-C$_6$ alkyl-O—C$_1$-C$_6$ alkyl-hydroxy; —NHC$_1$-C$_6$ alkyl-O—C$_1$-C$_6$ alkyl-halogen; —NHC$_1$-C$_6$ alkyl-C$_3$-C$_8$ heterocycloalkyl; C$_1$-C$_6$ alkoxy; amino; di-C$_1$-C$_6$ alkylamino; and C$_3$-C$_8$ heterocycloalkyl unsubstituted or substituted with C$_1$-C$_6$ alkyl.

In an embodiment, R$_3$ is phenyl, naphthyl, pyridine, piperazine, or imidazole, and the phenyl, naphthyl, pyridine, piperazine, or imidazole may not be substituted or may be substituted with one or more groups selected from the group consisting of hydroxy; halogen; C$_1$-C$_6$ alkyl; —C$_1$-C$_6$ alkyl-hydroxy; -piperazine-C$_1$-C$_6$ alkyl-hydroxy; —NHC$_1$-C$_6$ alkyl-O—C$_1$-C$_6$ alkyl-hydroxy; —NHC$_1$-C$_6$ alkyl-O—C$_1$-C$_6$ alkyl-halogen; —NHC$_1$-C$_6$ alkyl-morpholine; C$_1$-C$_6$ alkoxy; amino; di-C$_1$-C$_6$ alkylamino; pyrrolidine; piperidine; piperazine unsubstituted or substituted with C$_1$-C$_6$ alkyl; and morpholine.

In an embodiment, the compound of the present invention may be a compound selected from the group consisting of the compounds listed in the following Table 1 or a pharmaceutically acceptable salt thereof.

TABLE 1

| Compound | Chemical name | Structural formula |
|---|---|---|
| 1 (1aaa) | 5-(2,4-dihydroxybenzylidene)-1-methyl-3-phenyl-2-selenoxoimidazolidine-4-on | 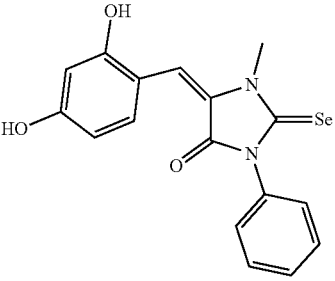 [SMILES: CN1C(=[Se])N(c2ccccc2)C(=O)/C1=C\c1ccc(O)cc1O] |
| 2 (1aab) | 5-(2, 3-dihydroxybenzylidene)-1-methyl-3-phenyl-2-selenoxoimidazolidine-4-on | 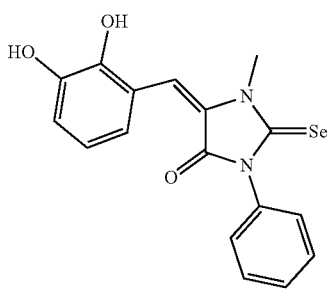 [SMILES: CN1C(=[Se])N(c2ccccc2)C(=O)/C1=C\c1cccc(O)c1O] |
| 3 (1aac) | 5-(4-(dimethylamino) benzylidene)-1-methyl-3-phenyl-2-selenoxoimidazolidine-4-on | 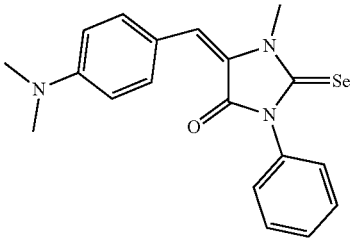 [SMILES: CN1C(=[Se])N(c2ccccc2)C(=O)/C1=C\c1ccc(N(C)C)cc1] |
| 4 (1aad) | 5-(3,4-dihydroxybenzylidene)-1-methyl-3-phenyl-2-selenoxoimidazolidine-4-on | 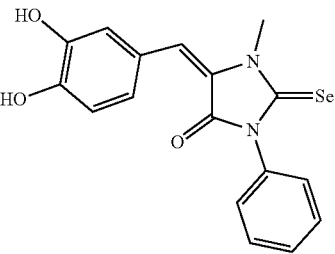 [SMILES: CN1C(=[Se])N(c2ccccc2)C(=O)/C1=C\c1ccc(O)c(O)c1] |
| 5 (1aae) | 5-(3,5-dihydroxybenzylidene)-1-methyl-3-phenyl-2-selenoxoimidazolidine-4-on | 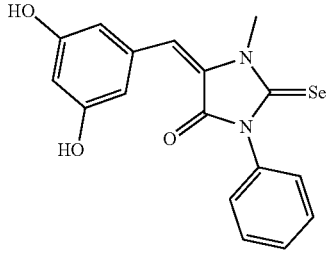 [SMILES: CN1C(=[Se])N(c2ccccc2)C(=O)/C1=C\c1cc(O)cc(O)c1] |

TABLE 1-continued

| Compound | Chemical name | Structural formula |
| --- | --- | --- |
| 6 (1aaf) | 5-(2, 6-dimethoxybenzylidene)-1-methyl-3-phenyl-2-selenoxoimidazolidine-4-on | |
| 7 (1aak) | 1-methyl-3-phenyl-5-(4-pyrrolidine-1-yl)benzylidene-2-selenoxoimidazolidine-4-on | |
| 8 (1aam) | 5-(3-hydroxybenzylidene)-1-methyl-3-phenyl-2-selenoxoimidazolidine-4-on | |
| 9 (1aan) | 1-methyl-3-phenyl-5-(pyridine-3-ylmethylene)-2-selenoxoimidazolidine-4-on | |
| 10 (1aba) | 5-(2,4-dihydroxybenzylidene)-1-methyl-3-(4-tolyl)-2-selenoxoimidazolidine-4-on | |

TABLE 1-continued

| Compound | Chemical name | Structural formula |
|---|---|---|
| 11 (1abb) | 5-(2, 3-dihydroxybenzylidene)-1-methyl-3-(4-tolyl)-2-selenoxoimidazolidine-4-on | |
| 12 (1abc) | 5-(4-(dimethylamino) benzylidene)-1-methyl-3-(4-tolyl)-2-selenoxoimidazolidine-4-on | |
| 13 (1abd) | 5-(3,4-dihydroxybenzylidene)-1-methyl-3-(4-tolyl)-2-selenoxoimidazolidine-4-on | |
| 14 (1abe) | 5-(3,5-dihydroxybenzylidene)-1-methyl-3-(4-tolyl)-2-selenoxoimidazolidine-4-on | |
| 15 (1abh) | 1-methyl-5-(4-piperidine-1-yl)benzylidene-3-(4-tolyl)-2-selenoxoimidazolidine-4-on | |

TABLE 1-continued

| Compound | Chemical name | Structural formula |
| --- | --- | --- |
| 16 (1abi) | 5-(4-bromobenzylidene)-1-methyl-2-selenoxo-3-(4-tolyl)imidazolidine-4-on | |
| 17 (1abk) | 1-methyl-5-(4-pyrrolidine-1-yl)benzylidene-2-selenoxo-3-(4-tolyl)imidazolidine-4-on | |
| 18 (1abl) | 5-(4-hydroxybenzylidene)-1-methyl-2-selenoxo-3-(4-tolyl)imidazolidine-4-on | |
| 19 (1abn) | 1-methyl-5-(pyridine-3-ylmethylene)-2-selenoxo-3-(4-tolyl)imidazolidine-4-on | |
| 20 (1abt) | 1-methyl-5-(4-(4-methylpiperazine-1-yl)benzylidene)-2-selenoxo-3-(4-tolyl)imidazoline-4-on | |

TABLE 1-continued

| Compound | Chemical name | Structural formula |
|---|---|---|
| 21 (1abu) | 5-(4-(4-(2-hydroxyethyl)piperazine-1-yl)benzylidene)-1-methyl-2-selenoxo-3-(4-tolyl)imidazoline-4-on | 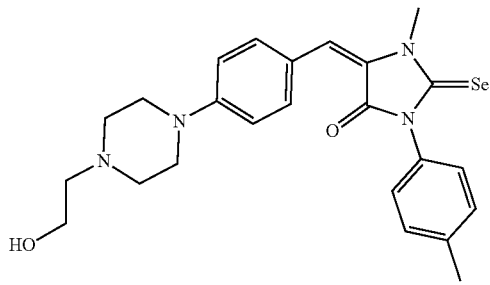 [SMILES: Cc1ccc(N2C(=O)/C(=C\c3ccc(N4CCN(CCO)CC4)cc3)N(C)C2=[Se])cc1] |
| 22 (1abv) | 5-(4-((2-(2-hydroxyethoxy)ethyl)amino)benzylidene)-1-methyl-2-selenoxo-3-(4-tolyl)imidazoline-4-on | 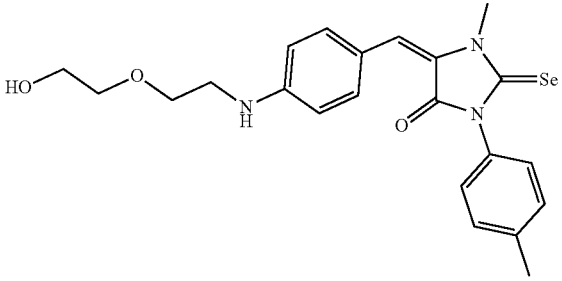 [SMILES: Cc1ccc(N2C(=O)/C(=C\c3ccc(NCCOCCO)cc3)N(C)C2=[Se])cc1] |
| 23 (1abw) | 1-methyl-5-(4-((2-morpholinoethyl)amino)benzylidene)-2-selenoxo-3-(4-tolyl)imidazoline-4-on | 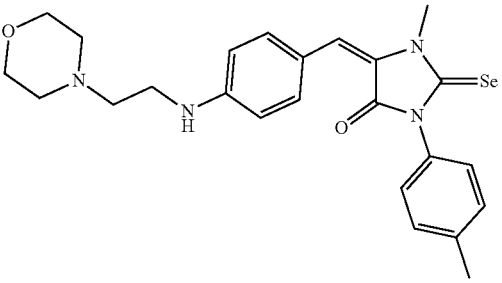 [SMILES: Cc1ccc(N2C(=O)/C(=C\c3ccc(NCCN4CCOCC4)cc3)N(C)C2=[Se])cc1] |
| 24 (1aca) | 5-(2,4-dihydroxybenzylidene)-3-(4-ethylphenyl)-1-methyl-2-selenoxoimidazolidine-4-on | 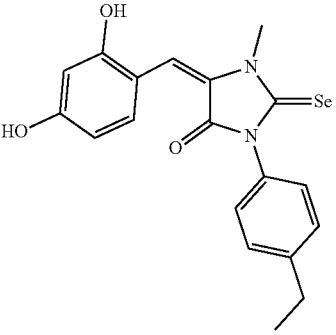 [SMILES: CCc1ccc(N2C(=O)/C(=C\c3ccc(O)cc3O)N(C)C2=[Se])cc1] |
| 25 (1acc) | 5-(4-(dimethylamino)benzylidene)-3-(4-ethylphenyl)-1-methyl-2-selenoxoimidazolidine-4-on | 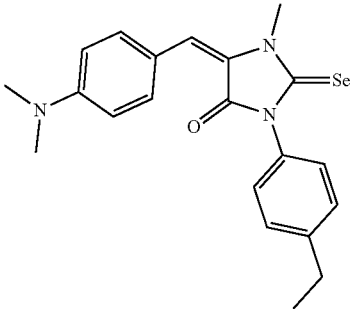 [SMILES: CCc1ccc(N2C(=O)/C(=C\c3ccc(N(C)C)cc3)N(C)C2=[Se])cc1] |

TABLE 1-continued

| Compound | Chemical name | Structural formula |
|---|---|---|
| 26 (1acd) | 5-(3,4-dihydroxybenzylidene)-3-(4-ethylphenyl)-1-methyl-2-selenoxoimidazolidine-4-on | |
| 27 (1ace) | 5-(3,5-dihydroxybenzylidene)-3-(4-ethylphenyl)-1-methyl-2-selenoxoimidazolidine-4-on | |
| 28 (1ach) | 3-(4-ethylphenyl)-1-methyl-5-(4-(piperidine-1-yl)benzylidene)-2-selenoxoimidazolidine-4-on | |
| 29 (1aci) | 5-(4-bromobenzylidene)-3-(4-ethylphenyl)-1-methyl-2-selenoxoimidazolidine-4-on | |
| 30 (1ack) | 3-(4-ethylphenyl)-1-methyl-5-(4-pyrrolidine-1-yl)benzylidene)-2-selenoxoimidazolidine-4-on | |

TABLE 1-continued

| Compound | Chemical name | Structural formula |
|---|---|---|
| 31 (1acn) | 3-(4-ethylphenyl)-1-methyl-5-(pyridine-3-ylmethylene)-2-selenoxoimidazolidine-4-on | |
| 32 (1acs) | 3-(4-ethylphenyl)-1-methyl-5-(4-morpholidinobenzylidene)-2-selenoxoimidazolidine-4-on | |
| 33 (1acu) | 3-(4-ethylphenyl)-5-(4-(4-(2-hydroxyethyl)piperazine-1-yl)benzylidene)-1-methyl-2-selenoxoimidazolidine-4-on | |
| 34 (1acy) | 3-(4-ethylphenyl)-5-(4-((2-(2-fluoroethoxy)ethyl)amino)benzylidene)-1-methyl-2-selenoxoimidazolidine-4-on | |
| 35 (1ada) | 3-(4-chlorophenyl)-5-(2,4-dihydroxybenzylidene)-1-methyl-2-selenoxoimidazolidine-4-on | |

TABLE 1-continued

| Compound | Chemical name | Structural formula |
|---|---|---|
| 36 (1adb) | 3-(4-chlorophenyl)-5-(2, 3-dihydroxybenzylidene)-1-methyl-2-selenoxoimidazolidine-4-on | |
| 37 (1add) | 3-(4-chlorophenyl)-5-(3,4-dihydroxybenzylidene)-1-methyl-2-selenoxoimidazolidine-4-on | |
| 38 (1ade) | 3-(4-chlorophenyl)-5-(3,5-dihydroxybenzylidene)-1-methyl-2-selenoxoimidazolidine-4-on | |
| 39 (1adn) | 3-(4-chlorophenyl)-1-methyl-5-(pyridine-3-ylmethylene)-2-selenoxoimidazolidine-4-on | |
| 40 (1aeb) | 3-(3-chlorophenyl)-5-(2,3-dihydroxybenzylidene)-1-methyl-2-selenoxoimidazolidine-4-on | |

TABLE 1-continued

| Compound | Chemical name | Structural formula |
|---|---|---|
| 41 (1aha) | 5-(2,4-dihydroxybenzylidene)-1-methyl-3-phenethyl-2-selenoxoimidazolidine-4-on | |
| 42 (1ahb) | 5-(2,3-dihydroxybenzylidene)-1-methyl-3-phenethyl-2-selenoxoimidazolidine-4-on | |
| 43 (1ahc) | 5-(4-(dimethylamino)benzylidene)-1-methyl-3-phenethyl-2-selenoxoimidazolidine-4-on | |
| 44 (1ahe) | 5-(3,5-dihydroxybenzylidene)-1-methyl-3-phenethyl-2-selenoxoimidazolidine-4-on | |
| 45 (1ahh) | 1-methyl-3-phenethyl-5-(4-(piperidine-1-yl)benzylidene)-2-selenoxoimidazolidine-4-on | |

TABLE 1-continued

| Compound | Chemical name | Structural formula |
|---|---|---|
| 46 (1ahj) | 5-(4-chlorobenzylidene)-1-methyl-3-phenethyl-2-selenoxoimidazolidine-4-on | |
| 47 (1ahk) | 1-methyl-3-phenethyl-5-(4-(pyrrolidine-1-yl)benzylidene)-2-selenoxoimidazolidine-4-on | |
| 48 (1ahl) | 5-(4-hydroxybenzylidene)-1-methyl-3-phenethyl-2-selenoxoimidazolidine-4-on | |
| 49 (1ahm) | 5-(3-hydroxybenzylidene)-1-methyl-3-phenethyl-2-selenoxoimidazolidine-4-on | |
| 50 (1ahp) | 1-methyl-5-(naphthalene-2-ylmethylene)-3-phenethyl-2-selenoxoimidazolidine-4-on | |

TABLE 1-continued

| Compound | Chemical name | Structural formula |
| --- | --- | --- |
| 51 (1ahq) | 1-methyl-5-((1-methyl-1H-imidazole-5-yl)methylene)-3-phenethyl-2-selenoxoimidazolidine-4-on | |
| 52 (1ahs) | 1-methyl-5-(4-morpholinobenzylidene)-3-phenethyl-2-selenoxoimidazolidine-4-on | |
| 53 (1ahu) | 5-(4-(4-(2-hydroxyethyl)piperazine-1-yl)benzylidene)-1-methyl-3-phenethyl-2-selenoxoimidazolidine-4-on | |
| 54 (1ahw) | 1-methyl-5-(2-(morpholinoethyl)amino)benzylidene)-3-phenethyl-2-selenoxoimidazolidine-4-on | |
| 55 (1aia) | 3-cyclohexyl-5-(2,4-dihydroxybenzylidene)-1-methyl-2-selenoxoimidazolidine-4-on | |

TABLE 1-continued

| Compound | Chemical name | Structural formula |
|---|---|---|
| 56 (1aib) | 3-cyclohexyl-5-(2,3-dihydroxybenzylidene)-1-methyl-2-selenoxoimidazolidine-4-on | |
| 57 (1aic) | 3-cyclohexyl-5-(4-dimethylamino)benzylidene)-1-methyl-2-selenoxoimidazolidine-4-on | |
| 58 (1aie) | 3-cyclohexyl-5-(3,5-dihydroxybenzylidene)-1-methyl-2-selenoxoimidazolidine-4-on | |
| 59 (1aja) | 5-(2,4-dihydroxybenzylidene)-3-hexyl-1-methyl-2-selenoxoimidazolidine-4-on | |
| 60 (1ajb) | 5-(2,3-dihydroxybenzylidene)-3-hexyl-1-methyl-2-selenoxoimidazolidine-4-on | |

TABLE 1-continued

| Compound | Chemical name | Structural formula |
|---|---|---|
| 61 (1ajc) | 5-(4-(dimethylamino)benzylidene)-3-hexyl-1-methyl-2-selenoxoimidazolidine-4-on | |
| 62 (1aje) | 5-(3,5-dihydroxybenzylidene)-3-hexyl-1-methyl-2-selenoxoimidazolidine-4-on | |
| 63 (1ajs) | 3-hexyl-1-methyl-5-(4-morpholinobenzylidene)-2-selenoxoimidazolidine-4-on | |
| 64 (1ajv) | 3-hexyl-5-(4-((2-(2-hydroxyethoxy)ethyl)amino)benzylidene)-1-methyl-2-selenoxoimidazolidine-4-on | |
| 65 (1ajw) | 3-hexyl-1-methyl-5-(4-((2-morpholinoethyl)amino)benzylidene)-2-selenoxoimidazolidine-4-on | |

TABLE 1-continued

| Compound | Chemical name | Structural formula |
|---|---|---|
| 66 (1ajx) | 5-(4-fluorobenzylidene)-3-hexyl-1-methyl-2-selenoxoimidazolidine-4-on | |
| 67 (1ajy) | 5-(4-((2-(2-fluoroethoxy)ethyl)amino)benzylidene)-3-hexyl-1-methyl-2-selenoxoimidazolidine-4-on | |
| 68 (1aka) | 3-cyclopentyl-5-(2,4-dihydroxybenzylidene)-1-methyl-2-selenoxoimidazolidine-4-on | |
| 69 (1akb) | 3-cyclopentyl-5-(2,3-dihydroxybenzylidene)-1-methyl-2-selenoxoimidazolidine-4-on | |
| 70 (1akc) | 3-cyclopentyl-5-(4-(dimethylamino)benzylidene)-1-methyl-2-selenoxoimidazolidine-4-on | |
| 71 (1akd) | 3-cyclopentyl-5-(3,4-dihydroxybenzylidene)-1-methyl-2-selenoxoimidazolidine-4-on | |

TABLE 1-continued

| Compound | Chemical name | Structural formula |
|---|---|---|
| 72 (1ake) | 3-cyclopentyl-5-(3,5-dihydroxybenzylidene)-1-methyl-2-selenoxoimidazolidine-4-on | |
| 73 (1ala) | 5-(2,4-dihydroxybenzylidene)-3-(4-fluorophenyl)-1-methyl-2-selenoxoimidazolidine-4-on | |
| 74 (1alb) | 5-(2,3-dihydroxybenzylidene)-3-(4-fluorophenyl)-1-methyl-2-selenoxoimidazolidine-4-on | |
| 75 (1alc) | 5-(4-(dimethylamino)benzylidene-3-(4-fluorophenyl)-1-methyl-2-selenoxoimidazolidine-4-on | |
| 76 (1ald) | 5-(3,4-dihydroxybenzylidene)-3-(4-fluorophenyl)-1-methyl-2-selenoxoimidazolidine-4-on | |

TABLE 1-continued

| Compound | Chemical name | Structural formula |
|---|---|---|
| 77 (1ale) | 5-(3,5-dihydroxybenzylidene)-3-(4-fluorophenyl)-1-methyl-2-selenoxoimidazolidine-4-on | |
| 78 (1ama) | 5-(2,4-dihydroxybenzylidene)-1-methyl-3-octyl-2-selenoxoimidazolidine-4-on | |
| 79 (1ame) | 5-(3,5-dihydroxybenzylidene)-1-methyl-3-octyl-2-selenoxoimidazolidine-4-on | |
| 80 (1ana) | 3-decyl-5-(2,4-dihydroxybenzylidene)-1-methyl-2-selenoxoimidazolidine-4-on | |

TABLE 1-continued

| Compound | Chemical name | Structural formula |
|---|---|---|
| 81 (1apa) | 5-(2,4-dihydroxybenzylidene-1-methyl-3-(2-morpholinoethyl)-2-selenoxoimidazolidine-4-on | |
| 82 (1ape) | 5-(3,5-dihydroxybenzylidene)-1-methyl-3-(2-morpholinoethyl)-2-selenoxoimidazolidine-4-on | |
| 83 (1aqa) | 5-(2,4-dihydroxybenzylidene)-1-methyl-3-(3-morpholinopropyl)-2-selenoxoimidazolidine-4-on | |
| 84 (1aqe) | 5-(3,5-dihydroxybenzylidene)-1-methyl-3-(3-morpholinopropyl)-2-selenoxoimidazolidine-4-on | |
| 85 (1aqi) | 5-(4-chlorobenzylidene)-1-methyl-3-(3-morpholinopropyl)-2-selenoxoimidazolidine-4-on | |

TABLE 1-continued

| Compound | Chemical name | Structural formula |
|---|---|---|
| 86 (1aqx) | 5-(4-fluorobenzylidene)-1-methyl-3-(3-morpholinopropyl)-2-selenoxoimidazolidine-4-on | |
| 87 (1ara) | 5-(2,4-dihydroxybenzylidene)-3-(5-fluorohexyl)-1-methyl-2-selenoxoimidazolidine-4-on | |
| 88 (1are) | 5-(3,5-dihydroxybenzylidene)-3-(5-fluorohexyl)-1-methyl-2-selenoxoimidazolidine-4-on | |
| 89 (1asa) | 5-(2,4-dihydroxybenzylidene)-3-(5-fluoropentyl)-1-methyl-2-selenoxoimidazolidine-4-on | |
| 90 (1ase) | 5-(3,5-dihydroxybenzylidene)-3-(5-fluoropentyl)-1-methyl-2-selenoxoimidazolidine-4-on | |

TABLE 1-continued

| Compound | Chemical name | Structural formula |
|---|---|---|
| 91 (1ata) | 3-butyl-5-(2,4-dihydroxybenzylidene)-1-methyl-2-selenoxoimidazolidine-4-on | |
| 92 (1ate) | 3-butyl-5-(3,5-dihydroxybenzylidene)-1-methyl-2-selenoxoimidazolidine-4-on | |
| 93 (1aua) | 5-(2,4-dihydroxybenzylidene)-1-methyl-3-pentyl-2-selenoxoimidazolidine-4-on | |
| 94 (1aue) | 5-(3,5-dihydroxybenzylidene)-1-methyl-3-pentyl-2-selenoxoimidazolidine-4-on | |
| 95 (1baa) | 5-(2,4-dihydroxybenzylidene)-1-ethyl-3-phenyl-2-selenoxoimidazolidine-4-on | |
| 96 (1bab) | 5-(2,3-dihydroxybenzylidene)-1-ethyl-3-phenyl-2-selenoxoimidazolidine-4-on | |

TABLE 1-continued

| Compound | Chemical name | Structural formula |
|---|---|---|
| 97 (1bac) | 5-(4-(dimethylamino)benzylidene)-1-ethyl-3-phenyl-2-selenoxoimidazolidine-4-on | |
| 98 (1bad) | 5-(3,4-dihydroxybenzylidene)-1-ethyl-3-phenyl-2-selenoxoimidazolidine-4-on | |
| 99 (1bae) | 5-(3,5-dihydroxybenzylidene)-1-ethyl-3-phenyl-2-selenoxoimidazolidine-4-on | |
| 100 (1bce) | 5-(3,5-dihydroxybenzylidene)-1-ethyl-3-(4-ethylphenyl)-2-selenoxoimidazolidine-4-on | |
| 101 (1bci) | 5-(4-bromobenzylidene)-1-ethyl-3-(4-ethylphenyl)-2-selenoxoimidazolidine-4-on | |

TABLE 1-continued

| Compound | Chemical name | Structural formula |
|---|---|---|
| 102 (1bck) | 1-ethyl-3-(4-ethylphenyl)-5-(4-pyrrolidine-1-yl)benzylidene-2-selenoxoimidazolidine-4-on | |
| 103 (1caa) | 1-benzyl-5-(2,4-dihydroxybenzylidene)-3-phenyl-2-selenoxoimidazolidine-4-on | |
| 104 (1cab) | 1-benzyl-5-(2,3-dihydroxybenzylidene)-3-phenyl-2-selenoxoimidazolidine-4-on | |
| 105 (1cac) | 1-benzyl-5-(4-(dimethylamino)benzylidene)-3-phenyl-2-selenoxoimidazolidine-4-on | |
| 106 (1cad) | 1-benzyl-5-(3,4-dihydroxybenzylidene)-3-phenyl-2-selenoxoimidazolidine-4-on | |

TABLE 1-continued

| Compound | Chemical name |
|---|---|
| 107 (1cae) | 1-benzyl-5-(3,5-dihydroxybenzylidene)-3-phenyl-2-selenoxoimidazolidine-4-on |
| 108 (1cca) | 1-benzyl-5-(2,4-dihydroxybenzylidene)-3-(4-ethylphenyl)-2-selenoxoimidazolidine-4-on |
| 109 (1ccd) | 1-benzyl-5-(3,4-dihydroxybenzylidene)-3-(4-ethylphenyl)-2-selenoxoimidazolidine-4-on |
| 110 (1cce) | 1-benzyl-5-(3,5-dihydroxybenzylidene)-3-(4-ethylphenyl)-2-selenoxoimidazolidine-4-on |

TABLE 1-continued

| Compound | Chemical name | Structural formula |
|---|---|---|
| 111 (1cdb) | 1-benzyl-3-(4-chlorophenyl)-5-(2,3-dihydroxybenzylidene)-2-selenoxoimidazolidine-4-on | |
| 112 (1cdd) | 1-benzyl-3-(4-chlorophenyl)-5-(3,4-dihydroxybenzylidene)-2-selenoxoimidazolidine-4-on | |
| 113 (1aak HCl) | 1-methyl-3-phenyl-5-(4-(pyrrolidine-1-yl)benzylidene)-2-selenoxoimidazolidine-4-on hydrochloride | |
| 114 (1abk HCl) | 1-methyl-5-(4-pyrrolidine-1-yl)benzylidene-2-selenoxo-3-(4-tolyl)imidazolidine-4-on hydrochloride | |
| 115 (1abt HCl) | 1-methyl-5-(4-(4-methylpiperazine-1-yl)benzylidene)-2-selenoxo-3-(4-tolyl)-imidazolidine-4-on hydrochloride | |

TABLE 1-continued

| Compound | Chemical name | Structural formula |
|---|---|---|
| 116 (1abw HCl) | 1-methyl-5-(4-((2-morpholinoethyl)amino) benzylidene)-2-selenoxo-3-(4-tolyl)imidazoline-4-on hydrochloride | |
| 117 (1ach HCl) | 3-(4-ethylphenyl)-1-methyl-5-(4-(piperidine-1-yl)benzylidene)-2-selenoxoimidazolidine-4-on hydrochloride | |
| 118 (1ajw HCl) | 3-hexyl-1-methyl-5-(4-((2-morpholinoethyl)amino) benzylidene)-2-selenoxoimidazolidine-4-on hydrochloride | |
| 119 (1ahk HCl) | 1-Methyl-3-phenethyl-5-(4-(pyrrolidine-1-yl)benzylidene)-2-selenoxoimidazolidine-4-on hydrochloride | |
| 120 (1akc HCl) | 3-cyclopentyl-5-(4-(dimethylamino) benzylidene)-1-methyl-2-selenoxoimidazolidine-4-on hydrochloride | |

TABLE 1-continued

| Compound | Chemical name | Structural formula |
|---|---|---|
| 121 (1aqa HCl) | 5-(2,4-dihydroxybenzylidene)-1-methyl-3-(3-morpholinopropyl)-2-selenoxoimidazolidine-4-on hydrochloride | |
| 122 (1aqx HCl) | 5-(4-fluorobenzylidene)-1-methyl-3-(3-morpholinopropyl)-2-selenoxoimidazolidine-4-on hydrochloride | |

In an embodiment, the neurodegenerative disease may be selected from the group consisting of Parkinson's disease, Alzheimer's disease, Huntington's disease, Lou Gehrig's disease, and Lewy body related disease.

The present invention also provides a method for producing a compound represented by the following Chemical Formula 1 or a pharmaceutically acceptable salt thereof, which includes:

reacting an amine compound represented by the following Chemical Formula 5 with formic acid to produce a formamide compound represented by the following Chemical Formula 6;

reacting the formamide compound with selenium (Se) under a condition containing one or more selected from the group consisting of triphosgene, dichloromethane, and triethylamine to produce an isoselenocyanate compound represented by the following Chemical Formula 7;

reacting the isoselenocyanate compound with an amino acid compound represented by the following Chemical Formula 8 in a solvent to produce a 1-alkyl-2-selenoxoimidazolidine-4-on compound represented by the following Chemical Formula 9; and reacting the 1-alkyl-2-selenoxoimidazolidine-4-on compound with an aldehyde-based compound represented by the following Chemical Formula 10 to produce the compound represented by the following Chemical Formula 1.

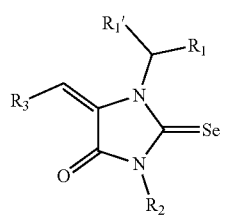

[Chem. 1]

[Chem. 5]

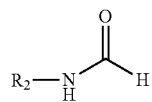

[Chem. 6]

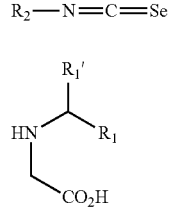

[Chem. 7]

[Chem. 8]

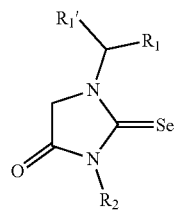

[Chem. 9]

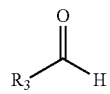

[Chem. 10]

where, $R_1$ and $R_1'$ are each independently selected from the group consisting of hydrogen, alkyl, cycloalkyl, heterocycloalkyl, an aryl group, heteroaryl, benzyl, and a phenethyl group, or $R_1$ and $R_1'$ may bond to each other to form a single ring;

R$_2$ and R$_3$ are each independently hydrogen, halo, cyano, alkyl, alkoxy, alkenyl, alkynyl, cycloalkyl, heterocycloalkyl, heterocycloalkyl-alkyl, aryl, aryl-alkyl, or heteroaryl; and the alkyl, alkoxy, alkenyl, alkynyl, cycloalkyl, heterocycloalkyl, heterocycloalkyl-alkyl, aryl, aryl-alkyl, or heteroaryl may not be substituted or may be substituted with one or more groups selected from the group consisting of hydroxy; halogen; alkyl; -alkyl-hydroxy; -heterocycloalkyl-alkyl-hydroxy; —NH alkyl-O-alkyl-hydroxy; —NH alkyl-O-alkyl-halogen; —NH alkyl-heterocycloalkyl; alkoxy; amino; dialkylamino; nitro; cyano; carbonyl; cycloalkyl; heterocycloalkyl unsubstituted or substituted with alkyl; aryl; and heteroaryl.

In an embodiment,

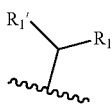

may be

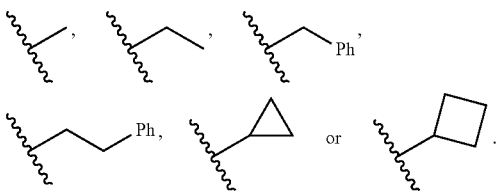

In an embodiment, R$_2$ may be hydrogen; C$_1$-C$_{12}$ alkyl; C$_1$-C$_6$ alkyl substituted with halogen; C$_3$-C$_8$ cycloalkyl; —C$_1$-C$_6$ alkyl-morpholine; phenyl unsubstituted or substituted with halogen or C$_1$-C$_6$ alkyl; or —C$_1$-C$_6$ alkyl-phenyl.

In an embodiment, R$_3$ is phenyl, naphthyl, pyridine, piperazine, or imidazole and the phenyl, naphthyl, pyridine, piperazine, or imidazole may not be substituted or may be substituted with one or more groups selected from the group consisting of hydroxy; halogen; C$_1$-C$_6$ alkyl; —C$_1$-C$_6$ alkyl-hydroxy; -piperazine-C$_1$-C$_6$ alkyl-hydroxy; —NHC$_1$-C$_6$ alkyl-O—C$_1$-C$_6$ alkyl-hydroxy; —NHC$_1$-C$_6$ alkyl-O—C$_1$-C$_6$ alkyl-halogen; —NHC$_1$-C$_6$ alkyl-morpholine; C$_1$-C$_6$ alkoxy; amino; di-C$_1$-C$_6$ alkylamino; pyrrolidine; piperidine; piperazine unsubstituted or substituted with C$_1$-C$_6$ alkyl; and morpholine.

In an embodiment, the solvent may be one or more selected from the group consisting of dioxane, methanol, ethanol, acetonitrile, tetrahydrofuran (THF), dimethylformamide (DMF), dimethyl sulfoxide (DMSO), and dichloroethylene (DCE).

Advantageous Effects of Invention

A 1-alkyl-5-arylidene-2-selenoxoimidazolidine-4-on or a derivative thereof, which is a novel compound of the present invention, regulates NADPH oxidase, α-synuclein, and Nrf2 in the body and can be thus usefully used for preventing, improving, or treating neurodegenerative disease, particularly Parkinson's disease.

The present invention can also provide a composition for prevention, improvement or treatment of neurodegenerative disease containing a 1-alkyl-5-arylidene-2-selenoxoimidazolidine-4-on and a derivative thereof or a pharmaceutically acceptable salt thereof.

DESCRIPTION OF EMBODIMENTS

Figure 1:
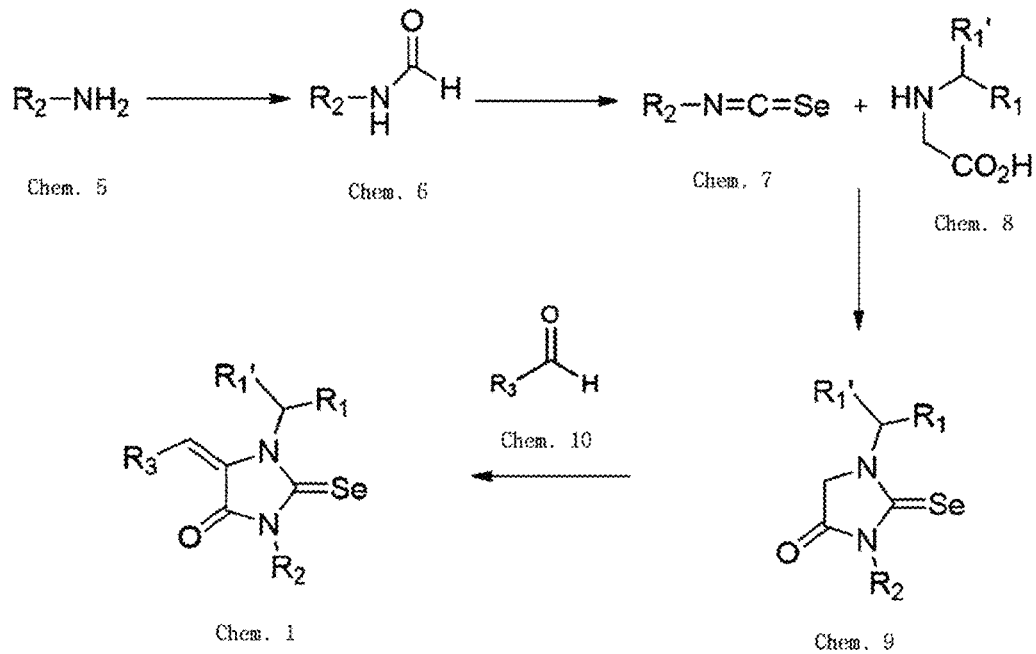
FIG. 1 illustrates a reaction scheme schematically showing a method for producing 1-alkyl-5-arylidene-2-selenoxoimidazolidine-4-ons and derivatives thereof.

Hereinafter, embodiments and examples of the present disclosure will be described in detail with reference to the accompanying drawings so that those skilled in the art can easily practice the present invention. However, the present disclosure may be implemented in various forms and is not limited to the embodiments and examples described herein.

Throughout the specification of the present disclosure, when it is described that a part "includes" a certain component, this means that the part does not exclude other components but may further include other components unless specifically stated otherwise.

In the case of description of temporal relation, for example, when the order of temporal relation is described as 'after', 'subsequently to', 'then', 'before' or the like, non-continuous cases may also be included unless the expression 'immediately' or 'directly' is used otherwise.

Although first, second and the like are used to describe various components, these components are not limited by these terms. These terms are only used to distinguish one component from another component. Therefore, the first component mentioned below may also be the second component within the technical spirit of the present invention.

The term "at least one" should be understood to include all possible combinations presented from one or more related items. For example, "at least one of a first item, a second item, or a third item" may mean not only each of the first item, second item, and third item but also all possible combinations presented from two or more items among the first item, the second item, and the third item.

The respective features of the various examples of the present invention can be partially or entirely bound or combined with each other, technically various interlocking and driving are possible, and the respective examples may be implemented independently of each other or may be implemented together in an associative relation.

As used herein, the term "alkyl" is a hydrocarbon having primary, secondary, tertiary and/or quaternary carbon atoms, and includes saturated aliphatic groups which may be straight-chain, branched or cyclic, or combinations thereof. For example, an alkyl group may have 1 to 20 carbon atoms (namely, $C_1$-$C_{20}$ alkyl), 1 to 10 carbon atoms (namely, $C_1$-$C_{10}$ alkyl), or 1 to 6 carbon atoms (namely, $C_1$-$C_6$ alkyl). Unless defined otherwise, alkyl refers to $C_1$-$C_6$ alkyl in preferred embodiments.

Examples of suitable alkyl groups include, but are not limited to, methyl (Me, —CH₃), ethyl (Et, —CH₂CH₃), 1-propyl (n-Pr, n-propyl, —CH₂CH₂CH₃), 2-propyl (i-Pr, i-propyl, —CH(CH₃)₂), 1-butyl (n-Bu, n-butyl, —CH₂CH₂CH₂CH₃), 2-methyl-1-propyl (i-Bu, i-butyl, —CH₂CH(CH₃)₂), 2-butyl (s-Bu, s-butyl, —CH(CH₃)CH₂CH₃), 2-methyl-2-propyl (t-Bu, t-butyl, —C(CH₃) 3), 1-pentyl (n-pentyl, —CH₂CH₂CH₂CH₂CH₃), 2-pentyl (—CH(CH₃)CH₂CH₂CH₃), 3-pentyl (—CH(CH₂CH₃)₂), 2-methyl-2-butyl (—C(CH₃)₂CH₂CH₃), 3-methyl-2-butyl (—CH(CH₃)CH(CH₃)₂), 3-methyl-1-butyl (—CH₂CH₂CH (CH₃)₂), 2-methyl-1-butyl (—CH₂CH(CH₃)CH₂CH₃), 1-hexyl (—CH₂CH₂CH₂CH₂CH₂CH₃), 2-hexyl (—CH (CH₃)CH₂CH₂CH₂CH₃), 3-hexyl (—CH(CH₂CH₃) (CH₂CH₂CH₃)), 2-methyl-2-pentyl (—C(CH₃)₂ CH₂CH₂CH₃), 3-methyl-2-pentyl (—CH(CH₃)CH(CH₃) CH₂CH₃), 4-methyl-2-pentyl (—CH(CH₃)CH₂CH(CH₃) 2), 3-methyl-3-pentyl (—C(CH₃) (CH₂CH₃) 2), 2-methyl-3-pentyl (—CH(CH₂CH₃)CH(CH₃)₂), 2,3-dimethyl-2-butyl (—C(CH₃)₂CH(CH₃)₂), 3,3-dimethyl-2-butyl (—CH(CH₃) C(CH₃)₃), and octyl (—CH₂)₇CH₃).

Moreover, the term "alkyl" as used throughout the specification, examples and claims is intended to include both unsubstituted and substituted alkyl groups, and the latter of these refers to alkyl moieties with substituents replacing hydrogen on one or more carbon atoms of the hydrocarbon backbone, including haloalkyl groups such as trifluoromethyl and 2,2,2-trifluoroethyl.

As used herein, the term "cycloalkyl" refers to a substituted or unsubstituted monocyclic, bicyclic or polycyclic, non-aromatic saturated or unsaturated ring in which each atom of the ring is carbon. Cycloalkyl may be polycyclic cycloalkyl composed of two or more rings in which one or more carbon atoms are common to adjacent rings. Polycyclic cycloalkyl may be fused ring systems, spirocyclic ring systems or bridged ring systems, in which one or more of the rings may be cycloalkyl and the other rings may be, for example, cycloalkyl, aryl, heteroaryl, and/or heterocycloalkyl defined herein. Examples of suitable cycloalkyl include, but are not limited to, cyclopropyl, cyclobutyl, cyclopentyl, cyclohexyl, cycloheptyl, and cyclooctyl.

As used herein, the term "heterocycloalkyl" refers to a substituted or unsubstituted monocyclic, bicyclic or polycyclic, non-aromatic saturated or partially saturated ring containing one or more heteroatoms in the ring. Heterocycloalkyl may be polycyclic heterocycloalkyl composed of two or more rings in which one or more carbon atoms are common to adjacent rings. Polycyclic heterocycloalkyl may be fused ring systems, spirocyclic ring systems or bridged ring systems, and one or more of the rings may be heterocycloalkyl and the other rings may be, for example, cycloalkyl, aryl, heteroaryl, and/or heterocycloalkyl defined herein. Examples of suitable heterocycloalkyl include, but are not limited to, piperidinyl, piperazinyl, pyrrolidinyl, morpholinyl, lactonyl, lactamyl, azetidinyl, dihydropyridinyl, dihydroindolyl, tetrahydropyridinyl (piperidinyl), tetrahydrothiophenyl, sulfur-oxidized tetrahydrothiophenyl, indolenyl, 4-piperidinyl, 2-pyrrolidonyl, tetrahydrofuranyl, tetrahydroquinolinyl, tetrahydroisoquinolinyl, decahydroquinolinyl, octahydroisoquinolinyl, 6H-1,2,5-thiadiazinyl, 2H,6H-1,5, 2-dithiazinyl, pyranyl, chromenyl, xanthenyl, phenoxatinyl, 2H-pyrrolyl, 3H-indolyl, 4H-quinolizinyl, phthalazinyl, naphthyridinyl, quinoxalinyl, quinazolinyl, cinnolinyl, pteridinyl, 4aH-carbazolyl, carbazolyl, β-carbolinyl, phenanthridinyl, acridinyl, phenanthrolinyl, phenazinyl, phenothiazinyl, furazanyl, phenoxazinyl, isochromanyl, chromanyl, imidazolidinyl, pyrazolidinyl, pyrazolinyl, quinuclidinyl, and oxazolidinyl.

As used herein, the term "aryl" includes monocyclic, bicyclic or polycyclic, substituted or unsubstituted, monovalent or divalent aromatic hydrocarbon groups in which each atom of the ring is carbon. The aryl ring is preferably a 6- to 20-membered ring, a 6- to 14-membered ring, a 6- to 10-membered ring, or more preferably a 6-membered ring. The aryl group may be a polycyclic ring system having two or more cyclic rings in which two or more carbon atoms are common to two adjacent rings. Here, one or more of the rings may be aromatic and the other cyclic rings may be, for example, cycloalkyl, cycloalkenyl, cycloalkynyl, aryl, heteroaryl, and/or heterocycloalkyl. Examples of the aryl group include benzene, naphthalene, phenanthrene, anthracene, indene, indane, phenol, and aniline.

As used herein, the term "heteroaryl" refers to a monocyclic, bicyclic or polycyclic, substituted or unsubstituted monovalent or divalent aromatic group containing one or more heteroatoms in the ring. Non-limiting examples of suitable heteroatoms that may be contained in an aromatic ring include oxygen, sulfur and nitrogen. In a case where "heteroaryl" is a bicyclic or polycyclic ring system having two or more cyclic rings in which two or more carbon atoms are common to two adjacent rings, one or more of the rings may be heteroaromatic and the other cyclic rings may be, for example, cycloalkyl, cycloalkenyl, cycloalkynyl, aryl, heteroaryl, and/or heterocyclyl. "Heteroaryl" includes, for example, benzofuran, benzothiophene, pyrrole, furan, thiophene, imidazole, indole, isoindole, isoxazole, isothiazole, oxazole, thiazole, quinoline, isoquinoline, pyrazole, pyridine, pyrazine, pyridazine, and pyrimidine (each of these may be substituted or unsubstituted).

As used herein, the term "heteroarylalkyl" refers to an alkyl in which one or more hydrogen atoms are substituted with heteroaryl, and is also referred to as a heteroarylalkyl group.

As used herein, the term "alkoxy" may be represented by a chemical formula —O-alkyl, where the alkyl group is attached to the parent compound through an oxygen atom, at this time, the alkyl group is as defined herein and may be substituted or unsubstituted. The alkyl group of an alkoxy group may have, for example, 1 to 20 carbon atoms (namely, $C_1$-$C_{20}$ alkoxy), 1 to 12 carbon atoms (namely, $C_1$-$C_{12}$ alkoxy), 1 to 10 carbon atoms (namely, $C_1$-$C_{10}$ alkoxy), or 1 to 6 carbon atoms (namely, $C_1$-$C_6$ alkoxy) Examples of suitable alkoxy groups include methoxy (—O—$CH_3$ or —OMe), ethoxy (—$OCH_2CH_3$ or —OEt), and t-butoxy (—$OC(CH_3)_3$ or —O-tBu), but is not limited thereto.

As used herein, the terms "halo" and "halogen" both mean halogen and include chlorine, fluorine, bromine, and iodine.

The alkyl, cycloalkyl, heterocycloalkyl, aryl, heteroaryl, arylalkyl, heteroarylalkyl, and alkoxy include those in which one or more hydrogens are substituted with chemically substitutable substituents as well as halogen, alkyl, alkoxy, hydroxy (OH), thiol (SH), amino ($NH_2$) and nitro ($NO_2$) unless otherwise explicitly stated.

In the present invention, a "derivative" refers to a similar compound obtained by chemically changing a part of a compound, and refers to a compound in which a specific substituent or hydrogen (H) is substituted with another atom or another group of atoms.

In the present invention, a "pharmaceutically acceptable salt" means a salt that is pharmaceutically acceptable and retains the desired pharmacological activity of the parent compound. The salt is not particularly limited as long as it is pharmaceutically acceptable.

The neurodegenerative disease of the present invention may include one selected from the group consisting of Parkinson's disease, Alzheimer's disease, Huntington's disease, Lou Gehrig's disease, and Lewy body related disease, but is not limited thereto. In particular, Parkinson's disease is a representative neurodegenerative disease that occurs as a signal transduction pathway is damaged by the death of dopaminergic neuronal cells.

The compound represented by Chemical Formula 1 of the present invention, namely a 1-alkyl-5-arylidene-2-selenoxo-imidazolidine-4-on and derivatives thereof, or pharmaceutically acceptable salts thereof, reduces NADPH oxidase (NOX) in vivo, prevents accumulation and aggregation of α-synuclein, and activates nuclear factor erythroid 2-related factor 2 (Nrf2). As a result, the compound of the present invention inhibits the death of dopaminergic neuronal cells and thus normalizes the dopamine production pathway. As the dopamine production pathway is normalized, the fundamental cause of neurodegenerative disease can be eliminated.

The pharmaceutical compositions of the present invention may each be formulated and used in any form suitable for pharmaceutical preparations, including oral formulations such as powders, granules, tablets, soft or hard capsules, suspensions, emulsions, syrups, and aerosols, external skin preparations such as ointments and creams, suppositories, injections, and sterile injection solutions according to conventional methods.

For the formulation, commonly used excipients such as fillers, extenders, binders, wetting agents, disintegrants, surfactants, and diluents may be further contained. For example, as an excipient that may be contained in the pharmaceutical composition of the present invention, lactose, dextrose, sucrose, sorbitol, mannitol, xylitol, erythritol, maltitol, starch, acacia gum, alginate, gelatin, calcium phosphate, calcium silicate, cellulose, methyl cellulose, microcrystalline cellulose, polyvinyl pyrrolidone, methyl hydroxybenzoate, propyl hydroxybenzoate, talc, magnesium stearate, mineral oil and the like may be used, but the excipient is not limited thereto. In addition to simple excipients, lubricants such as magnesium stearate and talc may also be used.

The pharmaceutical composition of the present invention may be administered orally or parenterally, and may be administered by intravenous injection, subcutaneous injection, intramuscular injection, intraperitoneal injection, or transdermal administration in the case of being administered parenterally.

Hereinafter, the present invention will be described in more detail through the following examples, but the following examples are for illustrative purposes only and are not intended to limit the scope of the present invention.

EXAMPLES

Example 1

Production of 5-(2,4-dihydroxybenzylidene)-1-methyl-3-phenyl-2-selenoxoimidazolidine-4-on (1aaa, Compound 1)

1) Production of N-phenylformamide

Aniline (20 g, 215 mmol) was added to formic acid (30 g, 644 mmol), and then the reaction was conducted under reflux at 100° C. for 4 hours and terminated. After ethyl acetate was added to the reaction mixture for dilution, the organic layer was washed with water, 0.1 N aqueous hydrochloric acid solution, saturated aqueous sodium bicarbonate solution, and brine. The organic layer was dried over anhydrous sodium sulfate, filtered, and concentrated under reduced pressure to obtain the target compound (25 g, 96%).

$^1$H-NMR (300 MHz, $CDCl_3$) δ 9.06 (br s, 0.4H), 8.68 (d, J=11.4 Hz, 0.6H), 8.33 (s, 0.6H), 8.16 (br s, 0.4H), 7.42-7.62 (m, 1H), 7.00-7.41 (m, 4H).

MS (EI): m/z=121 $[M+H]^+$.

2) Production of phenyl isoselenocyanate

After N-phenylformamide (4 g, 33 mmol) was dissolved in methylene chloride (145 mL), triethylamine (20 mL, 4.3 mmol) and 4A MS (660 mg) were added. After triphosgene (5.3 g, 18 mmol) was dissolved in methylene chloride (25 mL), the solution was slowly added dropwise over 1 hour. The reaction mixture was refluxed for 4 h, then selenium (5.2 g, 66 mmol) was added, and stirring was performed for 4 h. The reaction mixture was cooled, then washed with water, methylene chloride, and brine, dried over anhydrous sodium sulfate, filtered, concentrated under reduced pressure, and then subjected to column separation to obtain the target compound (3.6 g, 60%).

$^1$H-NMR (300 MHz, $CDCl_3$) δ 7.42 (s, 5H).
MS (EI): m/z=183 $[M+H]^+$.

3) Production of 1-methyl-3-phenyl-2-selenoxoimidazolidine-4-on

Dioxane (60 mL) and sarcosine (120 mg, 1.4 mmol) were added to the compound (250 mg, 1.4 mmol) obtained in step 2), and the mixture was warmed at 110° C. for 4 h. After the reaction, the reaction mixture was cooled to room temperature and concentrated under reduced pressure, and the resulting residue was subjected to column separation to obtain the target compound (292 mg, 85%).

$^1$H-NMR (300 MHz, CDCl$_3$) δ 7.45-7.60 (m, 3H), 7.27-7.40 (m, 2H), 4.08 (s, 2H), 3.51 (s, 3H).

MS (EI): m/z=254 [M+H]$^+$.

4) Production of 5-(2,4-dihydroxybenzylidene)-1-methyl-3-phenyl-2-selenoxoimidazolidine-4-on (1aaa)

Dioxane (0.6 mL) was added to the compound (51 mg, 0.2 mmol) obtained in step 3) and 2,4-dihydroxybenzaldehyde (30 mg, 0.22 mmol) and followed by stirring, piperidine (30 μl) and aluminum chloride (3 mg) were added, and the mixture was warmed at 90° C. for 5 h. After the reaction, the mixture was subjected to column separation to obtain the target compound (41 mg, 55%).

$^1$H-NMR (300 MHz, DMSO-d$_6$) δ 9.97 (s, 1H), 9.73 (s, 1H), 8.19 (d, J=8.7 Hz, 1H), 7.30-7.60 (m, 5H), 6.67 (s, 1H), 6.35 (d, J=2.2 Hz, 1H), 6.22 (dd, J=8.7, 2.2 Hz, 1H), 3.19 (s, 3H).

HRMS (ESI): m/z=375.0245 [M+H]$^+$.

Example 2

Production of 5-(2,3-dihydroxybenzylidene)-1-methyl-3-phenyl-2-selenoxoimidazolidine-4-on (1aab, Compound 2)

Dioxane (0.6 mL) was added to the compound (51 mg, 0.2 mmol) obtained in step 3) of Example 1 and 2,3-dihydroxybenzaldehyde (25 mg, 0.22 mmol) and followed by stirring, piperidine (30 μl) and aluminum chloride (3 mg) were added, and the mixture was warmed at 90° C. for 5 h. After the reaction, the mixture was subjected to column separation to obtain the target compound (34 mg, 48%).

$^1$H-NMR (300 MHz, CDCl$_3$) δ 7.44-7.60 (m, 3H), 7.32-7.40 (m, 2H), 7.02-7.15 (m, 2H), 6.87-6.96 (m, 1H), 6.75-6.86 (m, 1H), 5.30-6.50 (br s, 2H), 3.88 (s, 1H), 3.53 (s, 2H).

MS (ESI): m/z=397.0070 [M+Na]$^+$.

Example 3

Production of 5-(4-(dimethylamino)benzylidene)-1-methyl-3-phenyl-2-selenoxoimidazolidine-4-on (1aac, Compound 3)

Dioxane (0.6 mL) was added to the compound (51 mg, 0.2 mmol) obtained in step 3) of Example 1 and 4-(dimethylamino)benzaldehyde (30 mg, 0.22 mmol) and followed by stirring, piperidine (30 μl) and aluminum chloride (3 mg) were added, and the mixture was warmed at 90° C. for 5 h. After the reaction, the mixture was subjected to column separation to obtain the target compound (70 mg, 91%).

$^1$H-NMR (300 MHz, CDCl$_3$) δ 8.20 (d, J=9.1 Hz, 2H), 7.44-7.58 (m, 4H), 7.32-7.42 (m, 3H), 7.14 (s, 0.3H), 6.79 (s, 1H), 6.72 (d, J=8.9 Hz, 0.6H), 6.66 (d, J=9.1 Hz, 2H), 3.85 (s, 3H), 3.68 (s, 1H), 3.06 (s, 2H), 3.05 (s, 6H).

MS (ESI): m/z=386.0769 [M+H]$^+$.

Example 4

Production of 5-(3,4-dihydroxybenzylidene)-1-methyl-3-phenyl-2-selenoxoimidazolidine-4-on (1aad, Compound 4)

Dioxane (0.6 mL) was added to the compound (51 mg, 0.2 mmol) obtained in step 3) of Example 1 and 3,4-dihydroxybenzaldehyde (25 mg, 0.22 mmol) and followed by stirring, piperidine (30 μl) and aluminum chloride (3 mg) were added, and the mixture was warmed at 90° C. for 5 h. After the reaction, the mixture was subjected to column separation to obtain the target compound (34 mg, 45%).

$^1$H-NMR (300 MHz, DMSO-d$_6$) δ 9.80 (br s, 1H), 0.9.25 (br s, 1H), 7.97 (d, J=1.9 Hz, 1H), 7.42-7.65 (m, 4H), 7.30-7.40 (m, 2H), 7.10 (s, 1H), 6.78 (d, J=8.3 Hz, 1H), 3.77 (s, 3H).

MS (ESI): m/z=375.0245 [M+H]$^+$.

Example 5

Production of 5-(3,5-dihydroxybenzylidene)-1-methyl-3-phenyl-2-selenoxoimidazolidine-4-on (1aae, Compound 5)

Dioxane (0.6 mL) was added to the compound (51 mg, 0.2 mmol) obtained in step 3) of Example 1 and 2,6-dimethoxybenzaldehyde (30 mg, 0.22 mmol) and followed by stirring, piperidine (30 μl) and aluminum chloride (3 mg) were added, and the mixture was warmed at 90° C. for 5 h. After the reaction, the mixture was subjected to column separation to obtain the target compound (59 mg, 79%).

$^1$H-NMR (300 MHz, DMSO-d$_6$+CDCl$_3$) δ δ 9.12 (s, 1H), 8.99 (s, 1H), 7.30-7.65 (m, 5H), 6.70-7.20 (m, 2H), 6.30-6.55 (m, 2H), 3.83 (s, 1.3H), 3.59 (s, 1.7H).

MS (ESI): m/z=375.0246 [M+H]$^+$.

Example 6

Production of 5-(2,6-dimethoxybenzylidene)-1-methyl-3-phenyl-2-selenoxoimidazolidine-4-on (1aaf, Compound 6)

Dioxane (0.6 mL) was added to the compound (51 mg, 0.2 mmol) obtained in step 3) of Example 1 and 2,6-dimethoxybenzaldehyde (37 mg, 0.22 mmol) and followed by stirring, piperidine (30 μl) and aluminum chloride (3 mg) were added, and the mixture was warmed at 90° C. for 5 h. After the reaction, the mixture was subjected to column separation to obtain the target compound (79 mg, 89%).

$^1$H-NMR (300 MHz, CDCl$_3$) δ 7.27-7.58 (m, 5H), 6.99 (s, 1H), 6.77 (s, 0.6H), 6.61 (d, J=8.4 Hz, 2H), 6.55 (d, J=8.4 Hz, 1H), 3.87 (s, 4H), 3.84 (s, 1H), 3.82 (s, 2H), 3.45 (s, 2H).

MS (ESI): m/z=425.0376 [M+Na]$^+$.

Example 7

Production of 1-methyl-3-phenyl-5-(4-pyrrolidine-1-yl)benzylidene-2-selenoxoimidazolidine-4-on (1aak, Compound 7)

Dioxane (0.6 mL) was added to the compound (51 mg, 0.2 mmol) obtained in step 3) of Example 1 and 4-(pyrrolidine-1-yl)benzaldehyde (39 mg, 0.22 mmol) and followed by stirring, piperidine (30 μl) and aluminum chloride (3 mg)

were added, and the mixture was warmed at 90° C. for 5 h. After the reaction, the mixture was subjected to column separation to obtain the target compound (61 mg, 74%).
$^1$H-NMR (300 MHz, DMSO-d6) δ 8.25 (d, J=8.9 Hz, 1H), 7.42-7.59 (m, 4H), 7.29-7.41 (m, 2H), 7.15 (s, 0.6H), 7.01 (s, 0.4H), 6.50-6.67 (m, 2H), 3.78 (s, 1.8H), 3.60 (s, 1.2H), 3.34 (br s, 4H), 1.90-2.05 (m, 4H).
MS (EI): m/z=411.0847 [M]$^+$.

Example 8

Production of 5-(3-hydroxybenzylidene)-1-methyl-3-phenyl-2-selenoxoimidazolidine-4-on (1aam, Compound 8)

Dioxane (0.6 mL) was added to the compound (51 mg, 0.2 mmol) obtained in step 3) of Example 1 and 3-hydroxybenzaldehyde (28 mg, 0.22 mmol) and followed by stirring, piperidine (30 μl) and aluminum chloride (3 mg) were added, and the mixture was warmed at 90° C. for 5 h. After the reaction, the mixture was subjected to column separation to obtain the target compound (55 mg, 77%).
$^1$H-NMR (300 MHz, DMSO-d$^6$) δ 9.74 (br s, 0.55H), 9.59 (br s, 0.45H), 7.67 (br s, 0.6H), 7.33-7.58 (m, 5.4H), 7.17-7.31 (m, 1H), 7.16 (s, 0.45H), 7.02 (s, 0.55H), 6.80-7.00 (m, 2H), 3.77 (s, 1.4H), 3.44 (s, 1.6H).
MS (ESI): m/z=381.0114 [M+Na]$^+$.

Example 9

Production of 1-methyl-3-phenyl-5-(pyridine-3-ylmethylene)-2-selenoxoimidazolidine-4-on (1aan, Compound 9)

Dioxane (0.6 mL) was added to the compound (51 mg, 0.2 mmol) obtained in step 3) of Example 1 and 3-pyridinecarboxaldehyde (24 mg, 0.22 mmol) and followed by stirring, piperidine (30 μl) and aluminum chloride (3 mg) were added, and the mixture was warmed at 90° C. for 5 h. After the reaction, the mixture was subjected to column separation to obtain the target compound (44 mg, 64%).
$^1$H-NMR (300 MHz, CDCl$_3$) δ 8.50-9.10 (m, 4H), 7.20-7.90 (m, 5H), 7.09 (s, 0.4H), 6.78 (s, 0.6H), 3.86 (s, 1.8H), 3.53 (s, 1.2H).
MS (ESI): m/z=344.0304 [M+H]$^+$.

Example 10

Production of 5-(2,4-dihydroxybenzylidene)-1-methyl-3-(4-tolyl)-2-selenoxoimidazolidine-4-on (1aba, Compound 10)

1) Production of N-(4-tolyl)formamide

After 4-tolylamine (32 g, 215 mmol) was added to formic acid (30 g, 644 mmol), the reaction was conducted under reflux at 100° C. for 4 hours and terminated. After ethyl acetate was added to the reaction mixture for dilution, the organic layer was washed with water, 0.1 N aqueous hydrochloric acid solution, saturated aqueous sodium bicarbonate solution, and brine. The organic layer was dried over anhydrous sodium sulfate, filtered, and concentrated under reduced pressure to obtain the target compound (28 g, 95%).
$^1$H-NMR (300 MHz, CDCl$_3$) δ 8.63 (d, J=10.0 Hz, 1H), 8.32 (s, 0.5H), 7.84 (br s, 0.5H), 7.42 (d, J=8.4 Hz, 1H), 7.08-7.23 (m, 2H), 6.99 (d, J=8.3 Hz, 1H), 2.33 (s, 1.5H), 2.31 (s, 1.5H).
MS (EI): m/z=135 [M]$^+$.

2) Production of 4-tolyl isoselenocyanate

After N-(4-tolyl)formamide (4.50 g, 33 mmol) was dissolved in methylene chloride (145 mL), triethylamine (20 mL, 4.30 mmol) and 4A MS (660 mg) were added. After triphosgene (5.3 g, 18 mmol) was dissolved in methylene chloride (25 mL), the solution was slowly added dropwise over 1 hour. The reaction mixture was refluxed for 4 h, then selenium (5.2 g, 66 mmol) was added, and stirring was performed for 4 h. The reaction mixture was cooled, then washed with water, methylene chloride, and brine, dried over anhydrous sodium sulfate, filtered, concentrated under reduced pressure, and then subjected to column separation to obtain the target compound (5.7 g, 88%).
$^1$H-NMR (300 MHz, CDCl$_3$) δ 7.11-7.22 (m, 5H), 2.36 (s, 3H).
MS (EI): m/z=260 [M+H]$^+$.

3) Production of 1-methyl-3-(4-tolyl)-2-selenoxoimidazolidine-4-on

Dioxane (170 mL) and sarcosine (346 mg, 3.89 mmol) were added to the compound (762 mg, 3.89 mmol) obtained in step 2), and the mixture was warmed at 110° C. for 4 h. After the reaction, the reaction mixture was cooled to room temperature and concentrated under reduced pressure, and the resulting residue was subjected to column separation to obtain the target compound (748 mg, 72%).
$^1$H-NMR (300 MHz, CDCl$_3$) δ 7.31 (d, J=8.4 Hz, 2H), 7.19 (d, J=8.3 Hz, 2H), 4.06 (s, 2H), 3.50 (s, 3H), 2.41 (s, 3H).
MS (EI): m/z=268 [M+H]$^+$.

4) Production of 5-(2,4-dihydroxybenzylidene)-1-methyl-3-(4-tolyl)-2-selenoxoimidazolidine-4-on (1aba)

Dioxane (0.6 mL) was added to the compound (53 mg, 0.2 mmol) obtained in step 3) and 2,4-dihydroxybenzaldehyde (25 mg, 0.22 mmol) and followed by stirring, piperidine (30 μl) and aluminum chloride (3 mg) were added, and the mixture was warmed at 90° C. for 5 h. After the reaction, the mixture was subjected to column separation to obtain the target compound (47 mg, 61%).
$^1$H-NMR (300 MHz, DMSO-d$_6$) δ 10.4 (s, 1H), 10.1 (s, 1H), 8.50 (d, J=8.8 Hz, 1H), 7.20-7.48 (m, 5H), 6.38 (s, 1H), 6.25 (d, J=8.8 Hz, 1H), 3.74 (s, 3H), 2.37 (s, 3H).
MS (ESI): m/z=411.0220 [M+Na]$^+$.

Example 11

Production of 5-(2,3-dihydroxybenzylidene)-1-methyl-3-(4-tolyl)-2-selenoxoimidazolidine-4-on (1abb, Compound 11)

Dioxane (1.0 mL) was added to the compound (75 mg, 0.28 mmol) obtained in step 3) of Example 10 and 2,3-dihydroxybenzaldehyde (42 mg, 0.31 mmol) and followed by stirring, piperidine (41 μl) and aluminum chloride (4 mg) were added, and the mixture was warmed at 90° C. for 5 h. After the reaction, the mixture was subjected to column separation to obtain the target compound (73 mg, 68%).
$^1$H-NMR (300 MHz, DMSO-d$_6$) δ 9.67 (br s, 1H), 9.18 (br s, 1H), 7.18-7.40 (m, 4H), 6.99 (s, 1H), 6.77-6.92 (m, 2H), 6.70-6.76 (m, 1H), 3.76 (s, 1H), 3.45 (s, 2H), 2.37 (s, 3H).
MS (ESI): m/z=389.0403 [M+H]$^+$.

Example 12

Production of 5-(4-(dimethylamino)benzylidene)-1-methyl-3-(4-tolyl)-2-selenoxoimidazolidine-4-on (1abc, Compound 12)

Dioxane (0.6 mL) was added to the compound (53 mg, 0.2 mmol) obtained in step 3) of Example 10 and 4-dimethylaminobenzaldehyde (33 mg, 0.22 mmol) and followed by stirring, piperidine (30 μl) and aluminum chloride (3 mg) were added, and the mixture was warmed at 90° C. for 5 h. After the reaction, the mixture was subjected to column separation to obtain the target compound (45 mg, 56%).

$^1$H-NMR (300 MHz, CDCl$_3$) δ 8.20 (d, J=8.5 Hz, 1H), 7.20-7.38 (m, 5H), 7.14 (s, 0.4H), 6.78 (s, 0.6H), 6.71 (d, J=8.5 Hz, 1H), 6.66 (d, J=8.3 Hz, 1H), 3.84 (s, 1.8H), 3.68 (s, 1.2H), 3.05 (s, 6H), 2.42 (s, 3H).

MS (ESI): m/z=400.0925 [M+H]$^+$.

Example 13

Production of 5-(3,4-dihydroxybenzylidene)-1-methyl-3-(4-tolyl)-2-selenoxoimidazolidine-4-on (1abd, Compound 13)

Dioxane (0.6 mL) was added to the compound (53 mg, 0.2 mmol) obtained in step 3) of Example 10 and 3,4-dihydroxybenzaldehyde (25 mg, 0.22 mmol) and followed by stirring, piperidine (30 μl) and aluminum chloride (3 mg) were added, and the mixture was warmed at 90° C. for 5 h. After the reaction, the mixture was subjected to column separation to obtain the target compound (31 mg, 40%).

$^1$H-NMR (300 MHz, DMSO-d$_6$) δ 9.79 (s, 1H), 9.23 (s, 1H), 7.95 (d, J=0.9 Hz, 1H), 7.53 (dd, J=8.5, 1.8 Hz, 1H), 7.22-7.36 (m, 4H), 7.09 (s, 1H), 6.77 (d, J=8.3 Hz, 1H), 3.76 (s, 3H), 2.37 (s, 3H).

MS (ESI): m/z=369.0401 [M+H]$^+$.

Example 14

Production of 5-(3,5-dihydroxybenzylidene)-1-methyl-3-(4-tolyl)-2-selenoxoimidazolidine-4-on (1abe, Compound 14)

Dioxane (0.6 mL) was added to the compound (53 mg, 0.2 mmol) obtained in step 3) of Example 10 and 3,5-dihydroxybenzaldehyde (25 mg, 0.22 mmol) and followed by stirring, piperidine (30 μl) and aluminum chloride (3 mg) were added, and the mixture was warmed at 90° C. for 5 h. After the reaction, the mixture was subjected to column separation to obtain the target compound (31 mg, 40%).

$^1$H-NMR (300 MHz, DMSO-d$_6$) δ 9.56 (s, 2H), 7.20-7.38 (m, 4H), 6.91 (m, 1H), 6.35 (d, J=1.4 Hz, 2H), 6.29 (d, J=1.9 Hz, 1H), 3.45 (s, 3H), 2.37 (s, 3H).

MS (ESI): m/z=389.0403 [M+H]$^+$.

Example 15

Production of 1-methyl-5-(4-piperidine-1-yl)benzylidene-3-(4-tolyl)-2-selenoxoimidazolidine-4-on (1abh, Compound 15)

Dioxane (0.6 mL) was added to the compound (51 mg, 0.2 mmol) obtained in step 3) of Example 10 and 4-(piperidine-1-yl)benzaldehyde (42 mg, 0.22 mmol) and followed by stirring, piperidine (30 μl) and aluminum chloride (3 mg) were added, and the mixture was warmed at 90° C. for 5 h. After the reaction, the mixture was subjected to column separation to obtain the target compound (77 mg, 83%).

$^1$H-NMR (300 MHz, CDCl$_3$) δ 8.16 (d, J=9.0 Hz, 1H), 7.15-7.40 (m, 5H), 7.12 (s, 0.4H), 6.78-6.96 (m, 2H), 6.76 (s, 0.6H), 3.84 (s, 1.8H), 3.65 (s, 1.2H), 3.25-3.50 (m, 4H), 2.41 (s, 3H), 1.50-1.90 (m, 5H), 1.20-1.37 (m, 1H).

MS (ESI): m/z=440.1237 [M+H]$^+$.

Example 16

Production of 5-(4-bromobenzylidene)-1-methyl-2-selenoxo-3-(4-tolyl)imidazolidine-4-on (1abi, Compound 16)

Dioxane (0.6 mL) was added to the compound (53 mg, 0.2 mmol) obtained in step 3) of Example 10 and 4-bromobenzaldehyde (41 mg, 0.22 mmol) and followed by stirring, piperidine (30 μl) and aluminum chloride (3 mg) were added, and the mixture was warmed at 90° C. for 5 h. After the reaction, the mixture was subjected to column separation to obtain the target compound (37 mg, 43%).

$^1$H-NMR (300 MHz, CDCl$_3$) δ 7.97 (d, J=8.6 Hz, 1H), 7.45-7.64 (m, 2H), 7.17-7.38 (m, 5H), 7.07 (s, 0.3H), 6.74 (s, 0.7H), 3.84 (s, 2H), 3.51 (s, 1H), 2.42 (s, 3H).

MS (ESI): m/z=456.9428 [M+Na]$^+$.

Example 17

Production of 1-methyl-5-(4-pyrrolidine-1-yl)benzylidene-2-selenoxo-3-(4-tolyl)imidazolidine-4-on (1abk, Compound 17)

Dioxane (0.6 mL) was added to the compound (53 mg, 0.2 mmol) obtained in step 3) of Example 10 and 4-(pyrrolidine-1-yl)benzaldehyde (39 mg, 0.22 mmol) and followed by stirring, piperidine (30 μl) and aluminum chloride (3 mg) were added, and the mixture was warmed at 90° C. for 5 h. After the reaction, the mixture was subjected to column separation to obtain the target compound (74 mg, 72%).

$^1$H-NMR (300 MHz, CDCl$_3$) δ 8.25 (d, J=8.6 Hz, 1H), 7.19-7.45 (m, 5H), 7.14 (s, 0.4H), 6.77 (s, 0.6H), 6.46-6.67 (m, 2H), 3.84 (s, 2H), 3.69 (s, 1H), 3.36 (br s, 4H), 1.89-2.14 (m, 4H).

MS (ESI): m/z=426.1083 [M+H]$^+$.

Example 18

Production of 5-(4-hydroxybenzylidene)-1-methyl-2-selenoxo-3-(4-tolyl)imidazolidine-4-on (1abl, Compound 18)

Dioxane (0.6 mL) was added to the compound (53 mg, 0.2 mmol) obtained in step 3) of Example 10 and 4-hydroxybenzaldehyde (27 mg, 0.22 mmol) and followed by stirring, piperidine (30 μl) and aluminum chloride (3 mg) were added, and the mixture was warmed at 90° C. for 5 h. After the reaction, the mixture was subjected to column separation to obtain the target compound (59 mg, 77%).

$^1$H-NMR (300 MHz, DMSO-d$_6$) δ 10.2 (br s, 1H), 8.15 (d, J=8.7 Hz, 2H), 7.19-7.38 (m, 4H), 7.18 (s, 0.9H), 7.01 (s, 0.1H), 6.80 (d, J=8.7 Hz, 2H), 3.76 (s, 2.7H), 3.50 (s, 0.3H), 2.37 (s, 4H), 1.90-2.05 (m, 3H).

MS (ESI): m/z=395.0270 [M+Na]$^+$.

Example 19

Production of 1-methyl-5-(pyridine-3-ylmethylene)-2-selenoxo-3-(4-tolyl)imidazolidine-4-on (1abn, Compound 19)

Dioxane (0.6 mL) was added to the compound (53 mg, 0.2 mmol) obtained in step 3) of Example 10 and 3-pyridinecarboxaldehyde (24 mg, 0.22 mmol) and followed by stirring, piperidine (30 µl) and aluminum chloride (3 mg) were added, and the mixture was warmed at 90° C. for 5 h. After the reaction, the mixture was subjected to column separation to obtain the target compound (39 mg, 55%).

$^1$H-NMR (300 MHz, DMSO-$d_6$) δ 9.05 (d, J=1.9 Hz, 0.4H), 8.77 (d, J=2.2 Hz, 0.6H), 8.62 (dd, J=4.8, 1.2 Hz, 0.6H), 8.50-8.58 (m, 0.8H), 8.00 (d, J=7.0 Hz, 0.6H), 7.40-7.53 (m, 1H), 7.24-7.37 (m, 4H), 7.23 (s, 0.4H), 7.09 (s, 0.6H), 3.77 (s, 1H), 3.42 (s, 2H), 2.38 (s, 2H), 2.37 (s, 1H).

MS (ESI): m/z=358.0457 [M+H]$^+$.

Example 20

Production of 1-methyl-5-(4-(4-methylpiperazine-1-yl)benzylidene)-2-selenoxo-3-(4-tolyl)imidazoline-4-on (1abt, Compound 20)

Dioxane (0.6 mL) was added to the compound (53 mg, 0.2 mmol) obtained in step 3) of Example 10 and 4-(4-methylpiperazine-1-yl)benzaldehyde (49 mg, 0.21 mmol) and followed by stirring, piperidine (30 µl) and aluminum chloride (3 mg) were added, and the mixture was warmed at 90° C. for 5 h. After the reaction, the mixture was subjected to column separation to obtain the target compound (42 mg, 39%).

$^1$H-NMR (300 MHz, DMSO-$d_6$) δ 8.20 (d, J=9.0 Hz, 2H), 7.31 (d, J=8.3 Hz, 2H), 7.23 (d, J=8.3 Hz, 2H), 7.16 (s, 1H), 6.97 (d, J=9.2 Hz, 2H), 3.77 (s, 2.6H), 3.55 (s, 0.4H), 3.23-3.33 (m, 4H), 2.38-2.46 (m, 4H), 2.37 (s, 3H), 2.21 (s, 3H).

MS (EI): m/z=454.1269 [M]$^+$.

Example 21

Production of 5-(4-(4-(2-hydroxyethyl)piperazine-1-yl)benzylidene)-1-methyl-2-selenoxo-3-(4-tolyl)imidazoline-4-on (1abu, Compound 21)

Dioxane (0.6 mL) was added to the compound (53 mg, 0.2 mmol) obtained in step 3) of Example 10 and 4-(4-(2-hydroxyethyl)piperazine-1-yl)benzaldehyde (49 mg, 0.21 mmol) and followed by stirring, piperidine (30 µl) and aluminum chloride (3 mg) were added, and the mixture was warmed at 90° C. for 5 h. After the reaction, the mixture was subjected to column separation to obtain the target compound (37 mg, 39%).

$^1$H-NMR (300 MHz, DMSO-$d_6$) δ 8.20 (d, J=8.9 Hz, 2H), 7.47 (d, J=8.9 Hz, 2H), 7.18-7.35 (m, 4H), 7.15 (s, 0.4H), 7.00 (s, 0.6H), 4.40-4.50 (m, 2H), 3.77 (s, 1.2H), 3.55 (s, 1.8H), 3.47-3.59 (m, 4H), 2.51-2.59 (m, 4H), 2.39-2.47 (m, 2H), 2.37 (s, 3H).

MS (EI): m/z=484.1373 [M]$^+$.

Example 22

Production of 5-(4-((2-(2-hydroxyethoxy)ethyl)amino)benzylidene)-1-methyl-2-selenoxo-3-(4-tolyl)imidazoline-4-on (1abv, Compound 22)

Dioxane (0.5 mL) was added to the compound (43 mg, 0.16 mmol) obtained in step 3) of Example 10 and 4-((2-(2-hydroxyethoxy)ethyl)amino)benzaldehyde (33 mg, 0.17 mmol) and followed by stirring, piperidine (24 µl) and aluminum chloride (2.1 mg) were added, and the mixture was warmed at 90° C. for 5 h. After the reaction, the mixture was subjected to column separation to obtain the target compound (44 mg, 59%).

$^1$H-NMR (300 MHz, DMSO-$d_6$) δ 8.17 (d, J=8.9 Hz, 2H), 7.30 (d, J=8.3 Hz, 2H), 7.22 (d, J=8.3 Hz, 2H), 7.11 (s, 1H), 6.74 (t, J=5.5 Hz, 1H), 6.64 (d, J=8.9 Hz, 2H), 4.62 (t, J=5.3 Hz, 1H), 3.76 (s, 3H), 3.22-3.63 (m, 8H), 3.47-3.59 (m, 4H), 2.38 (s, 3H).

MS (ESI): m/z=459.1064 [M]$^+$.

Example 23

Production of 1-methyl-5-(4-((2-morpholinoethyl)amino)benzylidene)-2-selenoxo-3-(4-tolyl)imidazolidine-4-on (1abw, Compound 23)

Dioxane (1.0 mL) was added to the compound (53 mg, 0.2 mmol) obtained in step 3) of Example 10 and 4-((2-morpholinoethyl)amino)benzaldehyde (53 mg, 0.2 mmol) and followed by stirring, piperidine (40 µl) and aluminum chloride (5.3 mg) were added, and the mixture was warmed at 90° C. for 5 h. After the reaction, the mixture was subjected to column separation to obtain the target compound (37 mg, 38%).

$^1$H-NMR (300 MHz, DMSO-$d_6$) δ 8.17 (d, J=8.9 Hz, 2H), 7.30 (d, J=8.2 Hz, 2H), 7.22 (d, J=8.2 Hz, 2H), 7.11 (s, 1H), 6.96 (s, 0.2H), 6.63 (d, J=8.9 Hz, 2H), 6.50-6.70 (m, 1H), 3.76 (s, 2.4H), 3.53-3.64 (m, 4H), 3.42 (s, 0.6H), 3.16-3.26 (m, 2H), 2.39-2.45 (m, 4H), 2.38 (s, 3H).

MS (EI): m/z=484.1380 [M]$^+$.

Example 24

Production of 5-(2,4-dihydroxybenzylidene)-3-(4-ethylphenyl)-1-methyl-2-selenoxoimidazolidine-4-on (1aca, Compound 24)

1) Production of N-(4-ethylphenyl)formamide

After 4-ethylaniline (26 g, 215 mmol) was added to formic acid (30 g, 644 mmol), the reaction was conducted under reflux at 100° C. for 4 hours and terminated. After ethyl acetate was added to the reaction mixture for dilution, the organic layer was washed with water, 0.1 N aqueous hydrochloric acid solution, saturated aqueous sodium bicarbonate solution, and brine. The organic layer was dried over anhydrous sodium sulfate, filtered, and concentrated under reduced pressure to obtain the target compound (28 g, 87%).

$^1$H-NMR (300 MHz, CDCl$_3$) δ 8.64 (d, J=11.4 Hz, 0.6H), 8.20-8.55 (br s, 0.4H), 8.34 (s, 0.6H), 7.60 (br s, 0.4H), 7.45 (d, J=8.4 Hz, 1H), 7.17 (t, J=8.1 Hz, 2H), 7.02 (d, J=8.9 Hz, 1H), 2.55-2.70 (m, 2H), 1.15-1.30 (m, 3H).

MS (EI): m/z=149 [M+H]$^+$.

2) Production of 4-ethylphenyl isoselenocyanate

After N-(4-ethylphenyl)formamide (4.92 g, 33 mmol) was dissolved in methylene chloride (145 mL), triethylamine (20 mL, 4.30 mmol) and 4A MS (660 mg) were added. After triphosgene (5.3 g, 18 mmol) was dissolved in methylene chloride (25 mL), the solution was slowly added dropwise over 1 hour. The reaction mixture was refluxed for 4 h, then selenium (5.2 g, 66 mmol) was added, and stirring was performed for 4 h. The reaction mixture was cooled, then washed with water, methylene chloride, and brine, dried over anhydrous sodium sulfate, filtered, concentrated under reduced pressure, and then subjected to column separation to obtain the target compound (2.8 g, 40%).

$^1$H-NMR (300 MHz, CDCl$_3$) δ 7.19 (s, 4H), 2.64 (q, J=7.6 Hz, 2H), 1.22 (t, J=7.6 Hz, 3H).

MS (EI): m/z=211 [M+H]$^+$.

3) Production of 3-(4-ethylphenyl)-1-methyl-2-selenoxoimidazolidine-4-on

Dioxane (170 mL) and sarcosine (346 mg, 3.89 mmol) were added to the compound (817 mg, 3.89 mmol) obtained in step 2), and the mixture was warmed at 110° C. for 4 h. After the reaction, the reaction mixture was cooled to room temperature and concentrated under reduced pressure, and the resulting residue was subjected to column separation to obtain the target compound (1.02 g, 92%).

$^1$H-NMR (300 MHz, CDCl$_3$) δ 7.33 (d, J=8.3 Hz, 2H), 7.22 (d, J=8.3 Hz, 2H), 4.06 (s, 2H), 3.50 (s, 3H), 2.71 (q, J=7.6 Hz, 2H), 1.27 (t, J=7.6 Hz, 3H).

MS (EI): m/z=282 [M+H]$^+$.

4) Production of 5-(2,4-dihydroxybenzylidene)-3-(4-ethylphenyl)-1-methyl-2-selenoxoimidazolidine-4-on (1aca)

Dioxane (0.6 mL) was added to the compound (53 mg, 0.2 mmol) obtained in step 3) and 2,4-dihydroxybenzaldehyde (25 mg, 0.22 mmol) and followed by stirring, piperidine (30 μl) and aluminum chloride (3 mg) were added, and the mixture was warmed at 90° C. for 5 h. After the reaction, the mixture was subjected to column separation to obtain the target compound (47 mg, 61%).

$^1$H-NMR (300 MHz, DMSO-d$_6$) δ 10.4 (s, 1H), 10.1 (s, 1H), 8.49 (d, J=8.8 Hz, 1H), 7.21-7.40 (m, 5H), 6.38 (d, J=2.3 Hz, 1H), 6.24 (dd, J=8.9, 2.3 Hz, 1H), 3.74 (s, 3H), 2.67 (q, J=7.5 Hz, 2H), 1.23 (t, J=7.5 Hz, 3H).

MS (ESI): m/z=403.0559 [M+H]$^+$.

Example 25

Production of 5-(4-(dimethylamino)benzylidene)-3-(4-ethylphenyl)-1-methyl-2-selenoxoimidazolidine-4-on (1acc, Compound 25)

Dioxane (0.6 mL) was added to the compound (57 mg, 0.20 mmol) obtained in step 3) of Example 24 and 4-dimethylaminobenzaldehyde (36 mg, 0.22 mmol) and followed by stirring, piperidine (30 μl) and aluminum chloride (3 mg) were added, and the mixture was warmed at 90° C. for 5 h. After the reaction, the mixture was subjected to column separation to obtain the target compound (41 mg, 50%).

$^1$H-NMR (300 MHz, DMSO-d$_6$) δ 8.20 (d, J=9.1 Hz, 1H), 7.20-7.42 (m, 5H), 7.13 (s, 0.3H), 6.77 (s, 0.7H), 6.71 (d, J=8.9 Hz, 0.3H), 6.65 (d, J=9.1 Hz, 0.7H), 3.84 (s, 3H), 3.67 (s, 1.5H), 2.72 (q, J=7.6 Hz, 2H), 1.28 (t, J=7.6 Hz, 3H).

MS (ESI): m/z=414.1083 [M+H]$^+$.

Example 26

Production of 5-(3,4-dihydroxybenzylidene)-3-(4-ethylphenyl)-1-methyl-2-selenoxoimidazolidine-4-on (1acd, Compound 26)

Dioxane (0.6 mL) was added to the compound (57 mg, 0.20 mmol) obtained in step 3) of Example 24 and 4-dimethylaminobenzaldehyde (36 mg, 0.22 mmol) and followed by stirring, piperidine (30 μl) and aluminum chloride (3 mg) were added, and the mixture was warmed at 90° C. for 5 h. After the reaction, the mixture was subjected to column separation to obtain the target compound (41 mg, 50%).

$^1$H-NMR (300 MHz, DMSO-d$_6$) δ 9.79 (br s, 1H), 9.24 (br s, 1H), 7.96 (d, J=1.9 Hz, 1H), 7.54 (dd, J=8.5, 1.8 Hz, 1H), 7.22-7.40 (m, 4H), 7.09 (s, 1H), 6.77 (d, J=8.3 Hz, 1H), 3.76 (s, 3H), 2.67 (q, J=7.6 Hz, 2H), 1.23 (t, J=7.6 Hz, 3H).

MS (EI): m/z=402.0484 [M]$^+$.

Example 27

Production of 5-(3,5-dihydroxybenzylidene)-3-(4-ethylphenyl)-1-methyl-2-selenoxoimidazolidine-4-on (1ace, Compound 27)

Dioxane (0.6 mL) was added to the compound (57 mg, 0.20 mmol) obtained in step 3) of Example 24 and 3,5-dihydroxybenzaldehyde (25 mg, 0.22 mmol) and followed by stirring, piperidine (30 μl) and aluminum chloride (3 mg) were added, and the mixture was warmed at 90° C. for 5 h. After the reaction, the mixture was subjected to column separation to obtain the target compound (40 mg, 50%).

$^1$H-NMR (300 MHz, DMSO-d$^6$) δ 5 9.56 (s, 1H), 9.40 (s, 1H), 7.23-7.44 (m, 4H), 7.07 (d, J=8.2 Hz, 1H), 7.01 (s, 0.4H), 6.91 (s, 0.6H), 6.35 (d, J=1.6 Hz, 1H), 6.20-6.32 (m, 1H), 3.75 (s, 1.2H), 3.45 (s, 1.8H), 2.67 (q, J=7.6 Hz, 2H), 1.23 (dt, J=7.6, 1.8 Hz, 3H).

MS (ESI): m/z=403.0560 [M+H]$^+$.

Example 28

Production of 3-(4-ethylphenyl)-1-methyl-5-(4-(piperidine-1-yl)benzylidene)-2-selenoxoimidazolidine-4-on (1ach, Compound 28)

Dioxane (0.6 mL) was added to the compound (57 mg, 0.20 mmol) obtained in step 3) of Example 24 and 4-(piperidinyl)benzaldehyde (42 mg, 0.22 mmol) and followed by stirring, piperidine (30 μl) and aluminum chloride (3 mg) were added, and the mixture was warmed at 90° C. for 5 h. After the reaction, the mixture was subjected to column separation to obtain the target compound (55 mg, 61%).

$^1$H-NMR (300 MHz, CDCl$_3$) δ 8.16 (d, J=9.0 Hz, 2H), 7.20-7.48 (m, 4H), 6.82 (d, J=9.0 Hz, 2H), 6.75 (s, 1H), 3.83 (s, 3H), 3.51 (s, 0.6H), 3.26-3.50 (m, 4H), 2.71 (q, J=7.6 Hz, 2H), 1.65 (br s, 6H), 1.27 (t, J=7.6 Hz, 3H).

MS (ESI): m/z=454.1394 [M+H]$^+$.

Example 29

Production of 5-(4-bromobenzylidene)-3-(4-ethylphenyl)-1-methyl-2-selenoxoimidazolidine-4-on (1aci, Compound 29)

Dioxane (0.6 mL) was added to the compound (57 mg, 0.20 mmol) obtained in step 3) of Example 24 and 4-bromobenzaldehyde (41 mg, 0.22 mmol) and followed by stirring, piperidine (30 μl) and aluminum chloride (3 mg) were added, and the mixture was warmed at 90° C. for 5 h. After the reaction, the mixture was subjected to column separation to obtain the target compound (60 mg, 67%).

$^1$H-NMR (300 MHz, CDCl$_3$) δ 7.97 (d, J=8.6 Hz, 2H), 7.45-7.62 (m, 2H), 7.21-7.42 (m, 4H), 7.07 (s, 0.2H), 6.74 (s, 0.8H), 3.83 (s, 2.4H), 3.51 (s, 0.6H), 2.72 (q, J=7.6 Hz, 2H), 1.27 (t, J=7.6 Hz, 3H).

MS (ESI): m/z=470.9584 [M+Na]$^+$.

Example 30

Production of 3-(4-ethylphenyl)-1-methyl-5-(4-(pyrrolidine-1-yl)benzylidene)-2-selenoxoimidazolidine-4-on (1ack, Compound 30)

Dioxane (0.6 mL) was added to the compound (57 mg, 0.20 mmol) obtained in step 3) of Example 24 and 4-(pyrrolidinyl)benzaldehyde (39 mg, 0.22 mmol) and followed by stirring, piperidine (30 μl) and aluminum chloride (3 mg) were added, and the mixture was warmed at 90° C. for 5 h. After the reaction, the mixture was subjected to column separation to obtain the target compound (63 mg, 72%).

$^1$H-NMR (300 MHz, DMSO-d$_6$) δ 8.24 (d, J=8.7 Hz, 2H), 7.33 (d, J=8.1 Hz, 2H), 7.25 (d, J=8.3 Hz, 2H), 7.14 (s, 1H), 6.58 (d, J=8.9 Hz, 2H), 3.77 (s, 3H), 2.67 (q, J=7.6 Hz, 2H), 1.23 (t, J=7.6 Hz, 3H).

MS (ESI): m/z=440.1237 [M+H]$^+$.

Example 31

Production of 3-(4-ethylphenyl)-1-methyl-5-(pyridine-3-ylmethylene)-2-selenoxoimidazolidine-4-on (1acn, Compound 31)

Dioxane (0.6 mL) was added to the compound (57 mg, 0.20 mmol) obtained in step 3) of Example 24 and 3-pyridinecarboxaldehyde (24 mg, 0.22 mmol) and followed by stirring, piperidine (30 μl) and aluminum chloride (3 mg) were added, and the mixture was warmed at 90° C. for 5 h. After the reaction, the mixture was subjected to column separation to obtain the target compound (45 mg, 61%).

$^1$H-NMR (300 MHz, DMSO-d$_6$) δ 9.05 (s, 0.3H), 8.77 (s, 0.7H), 8.62, 8.55 (each d, J=4.8, 5.4 Hz, 1.3H), 7.99 (d, J=7.9 Hz, 0.7H), 7.40-7.57 (m, 1.3H), 7.28-7.39 (m, 4H), 7.27 (s, 0.3H), 7.09 (s, 0.7H), 3.77 (s, 0.9H), 3.42 (s, 2.1H), 2.68 (q, J=7.6 Hz, 2H), 1.23 (t, J=7.6 Hz, 3H).

MS (ESI): m/z=375.0612 [M+H]$^+$.

Example 32

Production of 3-(4-ethylphenyl)-1-methyl-5-(4-morpholidinobenzylidene)-2-selenoxoimidazolidine-4-on (1acs, Compound 32)

Dioxane (0.8 mL) was added to the compound (57 mg, 0.20 mmol) obtained in step 3) of Example 24 and 4-morpholinobenzaldehyde (38 mg, 0.22 mmol) and followed by stirring, piperidine (79 μl) and aluminum chloride (6 mg) were added, and the mixture was warmed at 90° C. for 5 h. After the reaction, the mixture was subjected to column separation to obtain the target compound (56 mg, 62%).

$^1$H-NMR (300 MHz, CD$_3$CN) δ 8.20 (d, J=8.9 Hz, 1.2H), 7.30-7.50 (m, 2.8H), 7.17-7.29 (m, 2H), 6.86-7.05 (m, 3H), 3.70-3.85 (m, 4H), 3.77 (s, 1.7H), 3.56 (s, 1.3H), 3.15-3.35 (m, 4H), 2.74 (q, J=7.6 Hz, 2H), 1.28 (t, J=7.6 Hz, 3H).

MS (ESI): m/z=455.1115 [M]$^+$.

Example 33

Production of 3-(4-ethylphenyl)-5-(4-(4-(2-hydroxyethyl)piperazine-1-yl)benzylidene)-1-methyl-2-selenoxoimidazolidine-4-on (1acu, Compound 33)

Dioxane (0.6 mL) was added to the compound (57 mg, 0.20 mmol) obtained in step 3) of Example 24 and 4-(4-(2-hydroxyethyl)piperazine-1-yl)benzaldehyde (49 mg, 0.21 mmol) and followed by stirring, piperidine (30 μl) and aluminum chloride (3 mg) were added, and the mixture was warmed at 90° C. for 5 h. After the reaction, the mixture was subjected to column separation to obtain the target compound (51 mg, 52%).

$^1$H-NMR (300 MHz, CD$_3$CN) δ 8.16 (d, J=9.0 Hz, 1H), 7.30-7.50 (m, 4H), 7.26 (s, 0.7H), 7.23 (s, 0.3H), 6.90-7.10 (m, 3H), 3.75 (s, 2H), 3.56-3.65 (m, 2H), 3.55 (s, 1H), 3.20-3.40 (m, 4H), 2.72 (d, J=7.6 Hz, 2H), 2.54-2.67 (m, 4H), 2.50 (d, J=5.6 Hz, 2H), 1.26 (t, J=7.6 Hz, 3H).

MS (ESI): m/z=498.1538 [M]$^+$.

Example 34

Production of 3-(4-ethylphenyl)-5-(4-((2-(2-fluoroethoxy)ethyl)amino)benzylidene)-1-methyl-2-selenoxoimidazolidine-4-on (1acy, Compound 34)

Dioxane (0.6 mL) was added to the compound (57 mg, 0.20 mmol) obtained in step 3) of Example 24 and 4-(4-(2-hydroxyethyl)piperazine-1-yl)benzaldehyde (44 mg, 0.21 mmol) and followed by stirring, piperidine (30 μl) and aluminum chloride (3 mg) were added, and the mixture was warmed at 90° C. for 5 h. After the reaction, the mixture was subjected to column separation to obtain the target compound (68 mg, 72%).

$^1$H-NMR (300 MHz, CD$_3$CN) δ 8.14 (d, J=8.9 Hz, 2H), 7.35 (d, J=8.3 Hz, 2H), 7.25 (d, J=8.3 Hz, 2H), 6.94 (s, 1H), 6.65 (d, J=8.9 Hz, 2H), 5.28 (br s, 1H), 4.54-4.57 (m, 1H), 4.39-4.51 (m, 1H), 3.76 (s, 3H), 3.52-3.75 (m, 4H), 3.33 (q, J=5.5 Hz, 2H), 2.72 (q, J=7.6 Hz, 2H), 1.26 (t, J=7.6 Hz, 3H).

MS (ESI): m/z=475.1176 [M]$^+$.

Example 35

Production of 3-(4-chlorophenyl)-5-(2,4-dihydroxybenzylidene)-1-methyl-2-selenoxoimidazolidine-4-on (1ada, Compound 35)

1) Production of N-4-chlorophenylformamide

To formic acid (30 g, 644 mmol), 4-chloroaniline (27 g, 215 mmol) was added. The reaction was conducted under reflux at 100° C. for 4 hours and terminated. After ethyl acetate was added to the reaction mixture for dilution, zinc oxide was removed by filtration. The organic layer was washed with water, 0.1 N aqueous hydrochloric acid solution, saturated aqueous sodium bicarbonate solution, and brine. The organic layer was dried over anhydrous sodium sulfate, filtered, and concentrated under reduced pressure to obtain the target compound (27 g, 82%).

$^1$H-NMR (300 MHz, CDCl$_3$) δ 8.64 (d, J=11.3 Hz, 0.5H), 8.37 (d, J=1.5 Hz, 0.5H), 7.79 (br s, 0.5H), 7.50 (d, J=9.6 Hz, 1H), 7.19-7.36 (m, 2.5H), 7.02 (d, J=9.6 Hz, 1H).

MS (EI): m/z=155 [M]$^+$.

2) Production of 4-chlorophenyl isoselenocyanate

After N-4-chlorophenylformamide (5.20 g, 33 mmol) was dissolved in methylene chloride (145 mL), triethylamine (20 mL, 4.3 mmol) and 4A MS (660 mg) were added. After triphosgene (5.3 g, 18 mmol) was dissolved in methylene chloride (25 mL), the solution was slowly added dropwise over 1 hour. The reaction mixture was refluxed for 4 h, then selenium (5.2 g, 66 mmol) was added, and stirring was performed for 4 h. The reaction mixture was cooled, then washed with water, methylene chloride, and brine, dried over anhydrous sodium sulfate, filtered, concentrated under reduced pressure, and then subjected to column separation to obtain the target compound (4.9 g, 68%).

$^1$H-NMR (300 MHz, CDCl$_3$) δ 7.35 (d, J=8.5 Hz, 2H), 7.23 (d, J=8.5 Hz, 2H).

MS (EI): m/z=217 [M+H]$^+$.

3) Production of 1-methyl-3-(4-chlorophenyl)-2-selenoxoimidazolidine-4-on

Dioxane (170 mL) and sarcosine (346 mg, 3.89 mmol) were added to the compound (842 mg, 3.89 mmol) obtained in step 2), and the mixture was warmed at 110° C. for 4 h. After the reaction, the reaction mixture was cooled to room temperature and concentrated under reduced pressure, and the resulting residue was subjected to column separation to obtain the target compound (1.06 g, 95%).

$^1$H-NMR (300 MHz, CDCl$_3$) δ 7.48 (d, J=6.7 Hz, 2H), 7.29 (d, J=6.7 Hz, 2H), 4.08 (s, 2H), 3.51 (s, 3H).

MS (EI): m/z=268 [M+H]$^+$.

4) Production of 3-(4-chlorophenyl)-5-(2,4-dihydroxybenzylidene)-1-methyl-2-selenoxoimidazolidine-4-on (1ada)

Dioxane (0.6 mL) was added to the compound (58 mg, 0.2 mmol) obtained in step 3) and 2,4-dihydroxybenzaldehyde (33 mg, 0.24 mmol) and followed by stirring, piperidine (30 µl) and aluminum chloride (3 mg) were added, and the mixture was warmed at 90° C. for 5 h. After the reaction, the mixture was subjected to column separation to obtain the target compound (34 mg, 41%).

$^1$H-NMR (300 MHz, DMSO-d$_6$) δ 10.4 (br s, 1H), 10.1 (br s, 1H), 8.49 (d, J=8.9 Hz, 1H), 7.58 (d, J=8.6 Hz, 2H), 7.43 (d, J=8.6 Hz, 2H), 7.32 (s, 1H), 6.38 (d, J=2.3 Hz, 1H), 6.26 (dd, J=8.8, 2.3 Hz, 1H), 3.74 (s, 3H).

MS (EI): m/z=407.9781 [M]$^+$.

Example 36

Production of 3-(4-chlorophenyl)-5-(2,3-dihydroxybenzylidene)-1-methyl-2-selenoxoimidazolidine-4-on (1adb, Compound 36)

Dioxane (0.6 mL) was added to the compound (58 mg, 0.2 mmol) obtained in step 3) of Example 35 and 2,3-dihydroxybenzaldehyde (33 mg, 0.22 mmol) and followed by stirring, piperidine (30 µl) and aluminum chloride (3 mg) were added, and the mixture was warmed at 90° C. for 5 h. After the reaction, the mixture was subjected to column separation to obtain the target compound (35 mg, 43%).

$^1$H-NMR (300 MHz, CDCl$_3$) δ 7.47 (d, J=8.7 Hz, 2H), 7.32 (d, J=8.6 Hz, 2H), 7.15 (s, 0.6H), 7.01 (s, 0.7H), 7.11 (s, 0.3H), 6.73-7.00 (m, 3H), 3.87 (s, 0.8H), 3.52 (s, 2.2H).

MS (ESI): m/z=430.9675 [M+Na]$^+$.

Example 37

Production of 3-(4-chlorophenyl)-5-(3,4-dihydroxybenzylidene)-1-methyl-2-selenoxoimidazolidine-4-on (1add, Compound 37)

Dioxane (1.0 mL) was added to the compound (80 mg, 0.28 mmol) obtained in step 3) of Example 35 and 3,4-dihydroxybenzaldehyde (42 mg, 0.31 mmol) and followed by stirring, piperidine (41 µl) and aluminum chloride (4 mg) were added, and the mixture was warmed at 90° C. for 5 h. After the reaction, the mixture was subjected to column separation to obtain the target compound (53 mg, 46%).

$^1$H-NMR (300 MHz, CDCl$_3$) δ 9.69 (br s, 2H), 7.96 (s, 1H), 7.58 (d, J=8.5 Hz, 2H), 7.53 (d, J=8.4 Hz, 1H), 7.43 (d, J=8.5 Hz, 2H), 7.10 (s, 1H), 6.78 (d, J=8.3 Hz, 1H), 3.75 (s, 3H).

MS (ESI): m/z=408.9860 [M+H]$^+$.

Example 38

Production of 3-(4-chlorophenyl)-5-(3,5-dihydroxybenzylidene)-1-methyl-2-selenoxoimidazolidine-4-on (1ade, Compound 38)

Dioxane (1.0 mL) was added to the compound (80 mg, 0.28 mmol) obtained in step 3) of Example 35 and 3,5-dihydroxybenzaldehyde (42 mg, 0.31 mmol) and followed by stirring, piperidine (41 µl) and aluminum chloride (4 mg) were added, and the mixture was warmed at 90° C. for 5 h. After the reaction, the mixture was subjected to column separation to obtain the target compound (52 mg, 46%).

$^1$H-NMR (300 MHz, CDCl$_3$) δ 9.57 (s, 1H), 9.42 (s, 1H), 7.54-7.69 (m, 2H), 7.38-7.50 (m, 2H), 7.07 (d, J=1.9 Hz, 1H), 7.05 (s, 0.4H), 6.93 (s, 0.6H), 6.35 (d, J=1.7 Hz, 1H), 6.20-6.33 (m, 1H), 3.75 (s, 1.8H), 3.56 (s, 1.2H).

MS (EI): m/z=407.9777 [M]$^+$.

Example 39

Production of 3-(4-chlorophenyl)-1-methyl-5-(pyridine-3-ylmethylene)-2-selenoxoimidazolidine-4-on (1adn, Compound 39)

Dioxane (0.6 mL) was added to the compound (58 mg, 0.2 mmol) obtained in step 3) of Example 35 and 3-pyridinecarboxaldehyde (24 mg, 0.22 mmol) and followed by stirring, piperidine (30 µl) and aluminum chloride (3 mg) were added, and the mixture was warmed at 90° C. for 5 h. After the reaction, the mixture was subjected to column separation to obtain the target compound (41 mg, 55%).

$^1$H-NMR (300 MHz, DMSO-d$_6$) δ 9.05 (s, 0.55H), 8.77 (s, 0.45H), 8.46-8.70 (m, 1.5H), 7.99 (d, J=7.7 Hz, 0.5H), 7.39-7.77 (m, 5H), 6.50-6.67 (m, 2H), 3.78 (s, 1.8H), 3.60 (s, 1.2H), 3.34 (br s, 4H), 1.90-2.05 (m, 4H).

MS (ESI): m/z=377.9910 [M+H]$^+$.

Example 40

Production of 3-(3-chlorophenyl)-5-(2,3-dihydroxybenzylidene)-1-methyl-2-selenoxoimidazolidine-4-on (1aeb, Compound 40)

1) Production of N-3-chlorophenylformamide

To formic acid (30 g, 644 mmol), 3-chloroaniline (27 g, 215 mmol) was added. The reaction was conducted under reflux at 100° C. for 4 hours and terminated. After ethyl acetate was added to the reaction mixture for dilution, zinc oxide was removed by filtration. The organic layer was washed with water, 0.1 N aqueous hydrochloric acid solution, saturated aqueous sodium bicarbonate solution, and brine. The organic layer was dried over anhydrous sodium sulfate, filtered, and concentrated under reduced pressure to obtain the target compound (33 g, 100%).

$^1$H-NMR (300 MHz, CDCl$_3$) δ 8.70 (d, J=11.1 Hz, 0.5H), 8.38 (s, 0.5H), 7.67 (s, 0.5H), 7.67 (t, J=1.9 Hz, 1H), 6.94-7.46 (m, 3H).

MS (EI): m/z=155 [M]$^+$.

2) Production of 3-chlorophenyl isoselenocyanate

After N-3-chlorophenylformamide (5.20 g, 33 mmol) was dissolved in methylene chloride (145 mL), triethylamine (20 mL, 4.30 mmol) and 4A MS (660 mg) were added. After triphosgene (5.3 g, 18 mmol) was dissolved in methylene chloride (25 mL), the solution was slowly added dropwise over 1 hour. The reaction mixture was refluxed for 4 h, then selenium (5.2 g, 66 mmol) was added, and stirring was performed for 4 h. The reaction mixture was cooled, then washed with water, methylene chloride, and brine, dried over anhydrous sodium sulfate, filtered, concentrated under reduced pressure, and then subjected to column separation to obtain the target compound (4.9 g, 68%).

$^1$H-NMR (300 MHz, CDCl$_3$) δ 7.25-7.37 (m, 3H), 7.12-7.23 (m, 1H).

MS (EI): m/z=217 [M+H]$^+$.

3) Production of 1-methyl-3-(3-chlorophenyl)-2-selenoxoimidazolidine-4-on

Dioxane (170 mL) and sarcosine (346 mg, 3.89 mmol) were added to the compound (842 mg, 3.89 mmol) obtained in step 2), and heating was performed at 110° C. for 5 h. After the reaction, the reaction mixture was cooled to room temperature and concentrated under reduced pressure, and the resulting residue was subjected to column separation to obtain the target compound (951 mg, 85%).

$^1$H-NMR (300 MHz, CDCl$_3$) δ 7.40-7.49 (m, 2H), 7.35 (s, 1H), 4.08 (s, 2H), 3.51 (s, 3H).

MS (EI): m/z=268 [M+H]$^+$.

4) Production of 3-(3-chlorophenyl)-5-(2,3-dihydroxybenzylidene)-1-methyl-2-selenoxoimidazolidine-4-on (1aeb)

Dioxane (0.6 mL) was added to the compound (80 mg, 0.28 mmol) obtained in step 3) and 2,3-dihydroxybenzaldehyde (42 mg, 0.31 mmol) and followed by stirring, piperidine (30 μl) and aluminum chloride (3 mg) were added, and the mixture was warmed at 90° C. for 5 h. After the reaction, the mixture was subjected to column separation to obtain the target compound (34 mg, 30%).

$^1$H-NMR (300 MHz, DMSO-d$_6$) δ 9.57 (s, 1H), 9.41 (s, 1H), 7.50-7.68 (m, 3H), 7.07 (d, J=2.0 Hz, 1H), 7.05 (s, 0.6H), 6.94 (s, 0.4H), 6.65-6.75 (m, 0.3H), 6.35 (d, J=1.6 Hz, 0.7H), 3.75 (s, 2H), 3.46 (1H).

MS (ESI): m/z=408.9853 [M+H]$^+$.

Example 41

Production of 5-(2,4-dihydroxybenzylidene)-1-methyl-3-phenethyl-2-selenoxoimidazolidine-4-on (1aha, Compound 41)

1) Production of N-(phenethyl)formamide

After phenethylamine (26 g, 215 mmol) was added to formic acid (30 g, 644 mmol), the reaction was conducted under reflux at 100° C. for 4 hours and terminated. After ethyl acetate was added to the reaction mixture for dilution, the organic layer was washed with water, 0.1 N aqueous hydrochloric acid solution, saturated aqueous sodium bicarbonate solution, and brine. The organic layer was dried over anhydrous sodium sulfate, filtered, and concentrated under reduced pressure to obtain the target compound (25 g, 79%).

$^1$H-NMR (300 MHz, CDCl$_3$) δ 8.13 (s, 0.8H), 7.93 (d, J=11.9 Hz, 0.2H), 7.00-7.60 (m, 5H), 5.60 (br s, 1H), 4.00-4.30 (m, 0.6H), 3.40-3.70 (m, 2H), 2.80-3.00 (m, 2H).

MS (EI): m/z=149 [M]$^+$.

2) Production of N-phenethyl isoselenocyanate

After N-(phenethyl)formamide (4.92 g, 33 mmol) was dissolved in methylene chloride (145 mL), triethylamine (20 mL, 4.30 mmol) and 4A MS (660 mg) were added. After triphosgene (5.3 g, 18 mmol) was dissolved in methylene chloride (25 mL), the solution was slowly added dropwise over 1 hour. The reaction mixture was refluxed for 4 h, then selenium (5.2 g, 66 mmol) was added, and stirring was performed for 4 h. The reaction mixture was cooled, then washed with water, methylene chloride, and brine, dried over anhydrous sodium sulfate, filtered, concentrated under reduced pressure, and then subjected to column separation to obtain the target compound (2.5 g, 36%).

$^1$H-NMR (300 MHz, CDCl$_3$) δ 7.00-7.40 (m, 5H), 3.52-3.70 (m, 2H), 2.80-3.10 (m, 2H)

MS (ESI): m/z=211 [M+H]$^+$.

3) Production of 1-methyl-3-phenethyl-2-selenoxoimidazolidine-4-on

Dioxane (170 mL) and sarcosine (346 mg, 3.89 mmol) were added to the compound (817 mg, 3.89 mmol) obtained in step 2), and the mixture was warmed at 110° C. for 4 h. After the reaction, the reaction mixture was cooled to room temperature and concentrated under reduced pressure, and the resulting residue was subjected to column separation to obtain the target compound (746 mg, 68%).

$^1$H-NMR (300 MHz, CDCl$_3$) δ 7.10-7.40 (m, 5H), 7.22 (d, J=8.3 Hz, 2H), 4.00-4.20 (m, 2H), 3.84 (s, 2H), 3.43 (s, 3H), 2.90-3.15 (m, 2H).

MS (EI): m/z=281 [M]$^+$.

4) Production of 5-(2,4-dihydroxybenzylidene)-1-methyl-3-phenethyl-2-selenoxoimidazolidine-4-on (1aha)

Dioxane (0.6 mL) was added to the compound (53 mg, 0.2 mmol) obtained in step 3) and 2,4-dihydroxybenzaldehyde (25 mg, 0.22 mmol) and followed by stirring, piperidine (30 μl) and aluminum chloride (3 mg) were added, and the mixture was warmed at 90° C. for 5 h. After the reaction, the mixture was subjected to column separation to obtain the target compound (47 mg, 61%).

$^1$H-NMR (300 MHz, DMSO-d$_6$) δ 10.4 (br s, 1H), 10.2 (br s, 1H), 8.52 (d, J=8.8 Hz, 1H), 7.10-7.40 (m, 6H), 6.37 (s, 1H), 6.28 (d, J=9.1 Hz, 1H), 4.09 (br s, 2H), 3.66 (s, 3H), 2.93 (br s, 2H).

MS (ESI): m/z=425.0379 [M+Na]$^+$.

Example 42

Production of 5-(2,3-dihydroxybenzylidene)-1-methyl-3-phenethyl-2-selenoxoimidazolidine-4-on (1ahb, Compound 42)

Dioxane (0.6 mL) was added to the compound (57 mg, 0.20 mmol) obtained in step 3) of Example 41 and 2,3-dihydroxybenzaldehyde (25 mg, 0.22 mmol) and followed by stirring, piperidine (30 μl) and aluminum chloride (3 mg) were added, and the mixture was warmed at 90° C. for 5 h. After the reaction, the mixture was subjected to column separation to obtain the target compound (39 mg, 48%).

$^1$H-NMR (300 MHz, DMSO-d$_6$) δ 9.59 (br s, 2H), 7.77 (d, J=9.1 Hz, 1H), 7.15-7.40 (m, 5H), 6.60-7.10 (m, 3H), 4.05-4.20 (m, 2H), 3.73 (s, 3H), 2.93-3.04 (m, 2H).

MS (ESI): m/z=425.0378 [M+Na]$^+$.

Example 43

Production of 5-(4-(dimethylamino)benzylidene)-1-methyl-3-phenethyl-2-selenoxoimidazolidine-4-on (1ahc, Compound 43)

Dioxane (0.6 mL) was added to the compound (57 mg, 0.20 mmol) obtained in step 3) of Example 41 and 4-dimethylaminobenzaldehyde (36 mg, 0.22 mmol) and followed by stirring, piperidine (30 μl) and aluminum chloride (3 mg) were added, and the mixture was warmed at 90° C. for 5 h. After the reaction, the mixture was subjected to column separation to obtain the target compound (40 mg, 49%).

$^1$H-NMR (300 MHz, DMSO-d$_6$) δ 8.22 (d, J=8.7 Hz, 2H), 7.43 (d, J=5.6 Hz, 2H), 7.15-7.38 (m, 5H), 7.08 (s, 0.6H), 6.93 (s, 0.4H), 4.00-4.15 (m, 2H), 3.69 (s, 3H), 2.99 (s, 3H), 2.96 (s, 3H), 2.74-2.95 (m, 2H).

MS (ESI): m/z=414.1085 [M+H]$^+$.

Example 44

Production of 5-(3,5-dihydroxybenzylidene-1-methyl-3-phenethyl-2-selenoxoimidazolidine-4-on (1ahe, Compound 44)

Dioxane (0.6 mL) was added to the compound (57 mg, 0.20 mmol) obtained in step 3) of Example 34 and 3,5-dihydroxybenzaldehyde (25 mg, 0.22 mmol) and followed by stirring, piperidine (30 μl) and aluminum chloride (3 mg) were added, and the mixture was warmed at 90° C. for 5 h. After the reaction, the mixture was subjected to column separation to obtain the target compound (52 mg, 60%).

$^1$H-NMR (300 MHz, DMSO-d$_6$) δ 9.46 (s, 2H), 7.15-7.40 (m, 5H), 7.08 (s, 2H), 6.98 (s, 1H), 6.33 (d, J=1.9 Hz, 1H), 4.10 (t, J=7.7 Hz, 2H), 3.68 (s, 3H), 2.94 (t, J=7.7 Hz, 2H).

MS (ESI): m/z=425.0379 [M+Na]$^+$.

Example 45

Production of 1-methyl-3-phenethyl-5-(4-(piperidine-1-yl)benzylidene)-2-selenoxoimidazolidine-4-on (1ahh, Compound 45)

Dioxane (0.6 mL) was added to the compound (57 mg, 0.20 mmol) obtained in step 3) of Example 41 and 4-(piperidinyl)benzaldehyde (42 mg, 0.22 mmol) and followed by stirring, piperidine (30 μl) and aluminum chloride (3 mg) were added, and the mixture was warmed at 90° C. for 5 h. After the reaction, the mixture was subjected to column separation to obtain the target compound (79 mg, 87%).

$^1$H-NMR (300 MHz, CDCl$_3$) δ 8.13 (d, J=9.0 Hz, 2H), 7.18-7.43 (m, 5H), 6.87 (d, J=9.0 Hz, 2H), 6.68 (s, 1H), 4.18-4.34 (m, 2H), 3.75 (s, 2.4H), 3.51 (s, 0.6H), 3.25-3.45 (m, 4H), 2.94-3.14 (m, 2H), 1.60-1.75 (m, 6H).

MS (ESI): m/z=454.1395 [M+H]$^+$.

Example 46

Production of 5-(4-chlorobenzylidene)-1-methyl-3-phenethyl-2-selenoxoimidazolidine-4-on (1ahj, Compound 46)

Dioxane (0.6 mL) was added to the compound (57 mg, 0.20 mmol) obtained in step 3) of Example 41 and 4-chlorobenzaldehyde (24 mg, 0.22 mmol) and followed by stirring, piperidine (30 μl) and aluminum chloride (3 mg) were added, and the mixture was warmed at 90° C. for 5 h. After the reaction, the mixture was subjected to column separation to obtain the target compound (30 mg, 54%).

H-NMR (300 MHz, CDCl$_3$) δ 8.11 (dd, J=4.2, 1.5 Hz, 0.8H), 7.20-7.40 (m, 5H), 6.94 (t, J=1.9 Hz, 0.8H), 6.88 (t, J=1.9 Hz, 0.2H), 6.58 (s, 0.8H), 6.51-6.56 (m, 0.2H), 6.26-6.73 (m, 0.8H), 6.20-6.26 (m, 0.2H), 4.17-4.32 (m, 2H), 3.77 (s, 2H), 3.76 (s, 3H), 3.71 (s, 1H), 2.98-3.10 (m, 2H).

Example 47

Production of 1-methyl-3-phenethyl-5-(4-(pyrrolidine-1-yl)benzylidene)-2-selenoxoimidazolidine-4-on (1ahk, Compound 47)

Dioxane (0.6 mL) was added to the compound (57 mg, 0.20 mmol) obtained in step 3) of Example 41 and 4-(pyrrolidinyl)benzaldehyde (39 mg, 0.22 mmol) and followed by stirring, piperidine (30 μl) and aluminum chloride (3 mg) were added, and the mixture was warmed at 90° C. for 5 h. After the reaction, the mixture was subjected to column separation to obtain the target compound (46 mg, 53%).

$^1$H-NMR (300 MHz, CDCl$_3$) δ 8.17 (d, J=8.9 Hz, 2H), 7.15-7.40 (m, 5H), 6.69 (s, 1H), 6.56 (d, J=8.9 Hz, 2H), 4.17-4.35 (m, 2H), 3.76 (s, 3H), 3.38 (t, J=6.6 Hz, 4H), 2.96-3.14 (m, 2H), 2.04 (t, J=6.6 Hz, 4H).

MS (ESI): m/z=462.1048 [M+Na]$^+$.

Example 48

Production of 5-(4-hydroxybenzylidene)-1-methyl-3-phenethyl-2-selenoxoimidazolidine-4-on (1ahl, Compound 48)

Dioxane (0.6 mL) was added to the compound (57 mg, 0.20 mmol) obtained in step 3) of Example 41 and 4-hydroxybenzaldehyde (22 mg, 0.22 mmol) and followed by stirring, piperidine (30 μl) and aluminum chloride (3 mg) were added, and the mixture was warmed at 90° C. for 5 h. After the reaction, the mixture was subjected to column separation to obtain the target compound (56 mg, 78%).

H-NMR (300 MHz, CDCl$_3$) δ 7.56 (d, J=1.5 Hz, 1H), 7.29-7.38 (m, 5H), 7.18-7.29 (m, 1H), 6.85 (d, J=3.5 Hz, 1H), 6.70 (s, 1H), 6.57 (dd, J=3.5, 1.8 Hz, 1H), 4.20-4.29 (m, 2H), 4.06 (s, 3H), 3.00-3.09 (m, 2H).

Example 49

Production of 5-(3-hydroxybenzylidene)-1-methyl-3-phenethyl-2-selenoxoimidazolidine-4-on (1ahm, Compound 49)

Dioxane (0.6 mL) was added to the compound (57 mg, 0.20 mmol) obtained in step 3) of Example 41 and 3-hydroxybenzaldehyde (26 mg, 0.21 mmol) and followed by stirring, piperidine (30 μl) and aluminum chloride (3 mg) were added, and the mixture was warmed at 90° C. for 5 h. After the reaction, the mixture was subjected to column separation to obtain the target compound (61 mg, 79%).

$^1$H-NMR (300 MHz, CD$_3$CN) δ 7.15-7.40 (m, 7H), 6.93 (s, 1H), 6.82-6.91 (m, 2H), 4.10-4.19 (m, 2H), 3.67 (s, 1H), 3.36 (s, 2H), 2.96-3.60 (m, 2H).

MS (ESI): m/z=396.0535 [M]$^+$.

Example 50

Production of 1-methyl-5-(naphthalene-2-ylmethylene)-3-phenethyl-2-selenoxoimidazolidine-4-on (1ahp, Compound 50)

Dioxane (0.6 mL) was added to the compound (57 mg, 0.20 mmol) obtained in step 3) of Example 41 and 2-naphthylbenzaldehyde (35 mg, 0.22 mmol) and followed by stirring, piperidine (30 μl) and aluminum chloride (3 mg) were added, and the mixture was warmed at 90° C. for 5 h. After the reaction, the mixture was subjected to column separation to obtain the target compound (75 mg, 89%).

$^1$H-NMR (300 MHz, CDCl$_3$) δ 8.52 (s, 1H), 8.16 (d, J=8.6 Hz, 1H), 7.73-7.79 (m, 3H), 7.45-7.60 (m, 2H), 7.20-7.40 (m, 5H), 6.87 (s, 1H), 4.20-4.35 (m, 2H), 3.77 (s, 2.7H), 3.54 (s, 0.3H), 2.99-3.12 (m, 2H).

MS (ESI): m/z=462.0635 [M+Na]$^+$.

Example 51

Production of 1-methyl-5-((1-methyl-1H-imidazole-5-yl)methylene)-3-phenethyl-2-selenoxoimidazolidine-4-on (1aq, Compound 51)

Dioxane (0.6 mL) was added to the compound (57 mg, 0.20 mmol) obtained in step 3) of Example 41 and 1-methyl-1H-imidazole-5-carboxyaldehyde (24 mg, 0.21 mmol) and followed by stirring, piperidine (30 μl) and aluminum chloride (3 mg) were added, and the mixture was warmed at 90° C. for 5 h. After the reaction, the mixture was subjected to column separation to obtain the target compound (30 mg, 40%).

$^1$H-NMR (300 MHz, CD$_3$CN) δ 8.11 (dd, J=4.2, 1.2 Hz, 0.8H), 7.20-7.40 (m, 5H), 7.14 (s, 0.8H), 7.12 (s, 0.2H), 7.10-6.95 (m, 1.2H), 4.17-4.32 (m, 2H), 3.77 (s, 2H), 3.76 (s, 3H), 3.71 (s, 1H), 2.98-3.10 (m, 2H).

MS (ESI): m/z=373.0692 [M]$^+$.

Example 52

Production of 1-methyl-5-(4-morpholinobenzylidene)-3-phenethyl-2-selenoxoimidazolidine-4-on (1ahs, Compound 52)

Dioxane (0.6 mL) was added to the compound (57 mg, 0.20 mmol) obtained in step 3) of Example 41 and 4-morpholinobenzaldehyde (40 mg, 0.21 mmol) and followed by stirring, piperidine (30 μl) and aluminum chloride (3 mg) were added, and the mixture was warmed at 90° C. for 5 h. After the reaction, the mixture was subjected to column separation to obtain the target compound (54 mg, 59%).

$^1$H-NMR (300 MHz, CD$_3$CN) δ 8.12 (d, J=9.2 Hz, 1.2H), 7.16-7.42 (m, 5.8H), 6.80-6.99 (m, 3H), 4.08-4.21 (m, 2H), 3.72-3.81 (m, 4H), 3.67 (s, 2H), 3.46 (s, 1H), 3.15-3.29 (m, 4H), 2.95-3.05 (m, 2H).

MS (ESI): m/z=455.1115 [M]$^+$.

Example 53

Production of 5-(4-(4-(2-hydroxyethyl)piperazine-1-yl)benzylidene)-1-methyl-3-phenethyl-2-selenoxoimidazolidine-4-on (1ahu, Compound 53)

Dioxane (0.6 mL) was added to the compound (47 mg, 0.20 mmol) obtained in step 3) of Example 41 and 4-(4-(2-hydroxyethyl)piperazine-1-yl)benzaldehyde (49 mg, 0.21 mmol) and followed by stirring, piperidine (30 μl) and aluminum chloride (3 mg) were added, and the mixture was warmed at 90° C. for 5 h. After the reaction, the mixture was subjected to column separation to obtain the target compound (40 mg, 40%).

$^1$H-NMR (300 MHz, CD$_3$CN) δ 8.12 (d, J=9.0 Hz, 1H), 7.36 (d, J=8.9 Hz, 1H), 7.28 (s, 3H), 7.18-7.32 (m, 2H), 6.84-7.00 (m, 3H), 4.10-4.22 (m, 2H), 3.68 (s, 1.6H), 3.59 (t, J=5.6 Hz, 2H), 3.47 (s, 1.4H), 3.25-3.40 (m, 4H), 2.95-3.05 (m, 2H), 2.55-2.70 (m, 4H), 2.47-2.54 (m, 2H).

MS (EI): m/z=498.1532 [M]$^+$.

Example 54

Production of 1-methyl-5-(2-(morpholinoethyl)amino)benzylidene)-3-phenethyl-2-selenoxoimidazolidine-4-on (1ahw, Compound 54)

Dioxane (0.6 mL) was added to the compound (57 mg, 0.20 mmol) obtained in step 3) of Example 41 and 4-((2-morpholinoethyl)amino)benzaldehyde (49 mg, 0.21 mmol) and followed by stirring, piperidine (30 μl) and aluminum chloride (3 mg) were added, and the mixture was warmed at 90° C. for 5 h. After the reaction, the mixture was subjected to column separation to obtain the target compound (40 mg, 40%).

$^1$H-NMR (300 MHz, CD$_3$CN) δ 8.11 (d, J=8.9 Hz, 1H), 7.88 (d, J=8.8 Hz, 1H), 7.10-7.40 (m, 5H), 6.88 (d, J=9.2 Hz, 1H), 6.55-6.72 (m, 2H), 5.26 (s, 1H), 4.16 (q, J=7.8 Hz, 2H), 3.70-3.80 (m, 1H), 3.68 (s, 1H), 3.65 (t, J=4.6 Hz, 4H), 3.51 (s, 2H), 3.15-3.30 (m, 2H), 2.85-3.08 (m, 3H), 2.59 (t, J=6.2 Hz, 3H), 2.46 (br s, 2H).

MS (EI): m/z=498.1537 [M]$^+$.

Example 55

Production of 3-cyclohexyl-5-(2,4-dihydroxyben-zylidene)-1-methyl-2-selenoxoimidazolidine-4-on (1aia, Compound 55)

1) Production of N-cyclohexylformamide

After cyclohexylamine (21 g, 215 mmol) was added to formic acid (30 g, 644 mmol), the reaction was conducted under reflux at 100° C. for 4 hours and terminated. The reaction mixture was concentrated under reduced pressure and dried in a high vacuum to obtain the target compound (11 g, 40%).

$^1$H-NMR (300 MHz, CDCl$_3$) δ 8.11 (d, J=12.2 Hz, 1H), 6.31 (br s, 1H), 3.75-3.95 (m, 0.8H), 3.20-3.40 (m, 0.2H), 1.00-2.30 (m, 10H).

MS (EI): m/z=127 [M+H]$^+$.

2) Production of cyclohexyl isoselenocyanate

After N-cyclohexylformamide (4.20 g, 33 mmol) was dissolved in methylene chloride (145 mL), triethylamine (20 mL, 4.30 mmol) and 4A MS (660 mg) were added. After triphosgene (5.3 g, 18 mmol) was dissolved in methylene chloride (25 mL), the solution was slowly added dropwise over 1 hour. The reaction mixture was refluxed for 4 h, then selenium (5.2 g, 66 mmol) was added, and stirring was performed for 4 h. The reaction mixture was cooled, then washed with water, methylene chloride, and brine, dried over anhydrous sodium sulfate, filtered, concentrated under reduced pressure, and then subjected to column separation to obtain the target compound (1.5 g, 24%).

$^1$H-NMR (300 MHz, CDCl$_3$) δ 3.50-3.65 (m, 1H), 1.55-1.93 (m, 6H), 1.20-1.53 (m, 4H).

MS (EI): m/z=189 [M+H]$^+$.

3) Production of 3-cyclohexyl-1-methyl-2-selenoxoimidazolidine-4-on

Dioxane (170 mL) and sarcosine (346 mg, 3.89 mmol) were added to the compound (732 mg, 3.89 mmol) obtained in step 2), and the mixture was warmed at 110° C. for 4 h. After the reaction, the reaction mixture was cooled to room temperature and concentrated under reduced pressure, and the resulting residue was subjected to column separation to obtain the target compound (645 mg, 64%).

$^1$H-NMR (300 MHz, CDCl$_3$) δ 4.60-4.82 (m, 1H), 3.80 (s, 2H), 3.40 (s, 3H), 2.10-2.40 (m, 2H), 1.55-1.90 (m, 5H), 1.10-1.50 (m, 3H).

MS (EI): m/z=260 [M+H]$^+$.

4) Production of 3-cyclohexyl-5-(2,4-dihydroxyben-zylidene)-1-methyl-2-selenoxoimidazolidine-4-on (1aia)

Dioxane (0.6 mL) was added to the compound (52 mg, 0.2 mmol) obtained in step 3) and 2,4-dihydroxybenzaldehyde (25 mg, 0.22 mmol) and followed by stirring, piperidine (30 μl) and aluminum chloride (3 mg) were added, and the mixture was warmed at 90° C. for 5 h. After the reaction, the mixture was subjected to column separation to obtain the target compound (33 mg, 43%).

$^1$H-NMR (300 MHz, DMSO-d$_6$) δ 10.3 (s, 1H), 10.1 (s, 1H), 8.52 (d, J=8.8 Hz, 1H), 7.23 (s, 1H), 6.37 (d, J=2.4 Hz, 1H), 6.25-6.32 (m, 1H), 4.65-4.87 (m, 1H), 3.66 (s, 3H), 2.12-2.30 (m, 2H), 1.55-1.88 (m, 5H), 1.10-1.38 (m, 3H).

MS (ESI): m/z=381.0715 [M+H]$^+$.

Example 56

Production of 3-cyclohexyl-5-(2,3-dihydroxyben-zylidene)-1-methyl-2-selenoxoimidazolidine-4-on (1aib, Compound 56)

Dioxane (0.6 mL) was added to the compound (52 mg, 0.20 mmol) obtained in step 3) of Example 55 and 3,5-dihydroxybenzaldehyde (25 mg, 0.22 mmol) and followed by stirring, piperidine (30 μl) and aluminum chloride (3 mg) were added, and the mixture was warmed at 90° C. for 5 h. After the reaction, the mixture was subjected to column separation to obtain the target compound (46 mg, 61%).

$^1$H-NMR (300 MHz, DMSO-d$_6$) δ 9.57 (s, 1H), 9.23 (s, 1H), 7.74 (d, J=8.0 Hz, 1H), 7.22 (s, 1H), 6.86 (d, J=7.7 Hz, 1H), 6.63 (t, J=7.9 Hz, 1H), 4.60-4.90 (m, 1H), 3.67 (s, 3H), 2.05-2.40 (m, 2H), 1.52-1.90 (m, 5H), 1.02-1.45 (m, 3H).

MS (ESI): m/z=381.0715 [M+H]$^+$.

Example 57

Production of 3-cyclohexyl-5-(4-dimethylamino)benzylidene)-1-methyl-2-selenoxoimidazolidine-4-on (1aic, Compound 57)

Dioxane (0.6 mL) was added to the compound (52 mg, 0.20 mmol) obtained in step 3) of Example 55 and 4-dimethylaminobenzaldehyde (33 mg, 0.22 mmol) and followed by stirring, piperidine (30 μl) and aluminum chloride (3 mg) were added, and the mixture was warmed at 90° C. for 5 h. After the reaction, the mixture was subjected to column separation to obtain the target compound (50 mg, 65%).

$^1$H-NMR (300 MHz, DMSO-d$_6$) δ 8.22 (d, J=8.4 Hz, 1.4H), 7.42 (d, J=8.1 Hz, 0.6H), 7.06 (s, 0.7H), 6.88 (s, 0.3H), 6.74 (d, J=8.4 Hz, 2H), 4.60-4.90 (m, 1H), 3.68 (s, 2H), 3.49 (s, 1H), 3.02 (s, 3H), 2.98 (s, 3H), 1.90-2.33 (m, 4H), 1.00-1.89 (m, 6H).

MS (ESI): m/z=392.1238 [M+H]$^+$.

Example 58

Production of 3-cyclohexyl-5-(3,5-dihydroxyben-zylidene)-1-methyl-2-selenoxoimidazolidine-4-on (1aie, Compound 58)

Dioxane (0.6 mL) was added to the compound (52 mg, 0.20 mmol) obtained in step 3) of Example 55 and 3,5-dihydroxybenzaldehyde (25 mg, 0.22 mmol) and followed by stirring, piperidine (30 μl) and aluminum chloride (3 mg) were added, and the mixture was warmed at 90° C. for 5 h. After the reaction, the mixture was subjected to column separation to obtain the target compound (65 mg, 86%).

$^1$H-NMR (300 MHz, DMSO-d$_6$) δ 9.51 (s, 0.5H), 9.42 (s, 1.5H), 6.90-7.15 (m, 2H), 6.79 (s, 0.4H), 6.30 (d, J=4.3 Hz, 1H), 6.26 (s, 0.6H), 4.55-4.90 (m, 1H), 3.67 (s, 2H), 3.37 (s, 1H), 2.00-2.30 (m, 2H), 1.55-1.90 (m, 5H), 1.05-1.40 (m, 3H).

MS (ESI): m/z=381.0717 [M+H]$^+$.

Example 59

Production of 5-(2,4-dihydroxybenzylidene)-3-hexyl-1-methyl-2-selenoxoimidazolidine-4-on (1aja, Compound 59)

1) Production of N-hexylformamide

After n-hexylamine (22 g, 215 mmol) was added to formic acid (30 g, 644 mmol), the reaction was conducted under reflux at 100° C. for 4 hours and terminated. The reaction mixture was concentrated under reduced pressure and dried in a high vacuum to obtain the target compound (25 g, 91%).

$^1$H-NMR (300 MHz, CDCl$_3$) δ 8.16 (s, 0.8H), 8.04 (d, J=12.0 Hz, 0.2H), 5.65 (br s, 1H), 3.15-3.38 (m, 2H), 1.82 (br s, 2H), 1.20-1.44 (m, 5H), 0.80-0.95 (m, 3H).

MS (EI): m/z=129 [M]$^+$.

2) Production of N-hexyl isoselenocyanate

After N-hexylformamide (4.26 g, 33 mmol) was dissolved in methylene chloride (145 mL), triethylamine (20 mL, 4.30 mmol) and 4A MS (660 mg) were added. After triphosgene (5.3 g, 18 mmol) was dissolved in methylene chloride (25 mL), the solution was slowly added dropwise over 1 hour. The reaction mixture was refluxed for 4 h, then selenium (5.2 g, 66 mmol) was added, and stirring was performed for 4 h. The reaction mixture was cooled, then washed with water, methylene chloride, and brine, dried over anhydrous sodium sulfate, filtered, concentrated under reduced pressure, and then subjected to column separation to obtain the target compound (6.2 g, 99%).

$^1$H-NMR (300 MHz, CDCl$_3$) δ 3.61 (t, J=6.6 Hz, 0.2H), 1.67-1.82 (m, 2H), 1.26-1.52 (m, 6H), 0.85-0.98 (m, 3H).

MS (ESI): m/z=191 [M+H]$^+$.

3) Production of 3-hexyl-1-methyl-2-selenoxoimidazolidine-4-on

Dioxane (170 mL) and sarcosine (346 mg, 3.89 mmol) were added to the compound (740 mg, 3.89 mmol) obtained in step 2), and the mixture was warmed at 110° C. for 4 h. After the reaction, the reaction mixture was cooled to room temperature and concentrated under reduced pressure, and the resulting residue was subjected to column separation to obtain the target compound (945 mg, 93%).

$^1$H-NMR (300 MHz, CDCl$_3$) δ 3.88 (t, J=7.6 Hz, 0.2H), 3.86 (s, 2H), 3.42 (s, 3H), 1.53-1.80 (m, 2H), 1.20-1.40 (m, 5H), 0.80-0.95 (m, 3H).

MS (EI): m/z=262 [M+H]$^+$.

4) Production of 5-(2,4-dihydroxybenzylidene)-3-hexyl-1-methyl-2-selenoxoimidazolidine-4-on (1aja)

Dioxane (0.6 mL) was added to the compound (52 mg, 0.2 mmol) obtained in step 3) and 2,4-dihydroxybenzaldehyde (25 mg, 0.22 mmol) and followed by stirring, piperidine (30 μl) and aluminum chloride (3 mg) were added, and the mixture was warmed at 90° C. for 5 h. After the reaction, the mixture was subjected to column separation to obtain the target compound (26 mg, 34%).

$^1$H-NMR (300 MHz, DMSO-d$_6$) δ 10.4 (s, 1H), 10.1 (s, 1H), 8.56 (d, J=8.8 Hz, 1H), 7.24 (s, 1H), 6.37 (s, 1H), 6.28 (d, J=8.9 Hz, 1H), 3.83-3.95 (m, 2H), 3.65 (s, 3H), 1.62 (br s, 2H), 1.26 (br s, 5H), 0.85 (br s, 3H).

MS (ESI): m/z=405.0690 [M+Na]$^+$.

Example 60

Production of 5-(2,3-dihydroxybenzylidene)-3-hexyl-1-methyl-2-selenoxoimidazolidine-4-on (1ajb, Compound 60)

Dioxane (0.6 mL) was added to the compound (52 mg, 0.20 mmol) obtained in step 3) of Example 59 and 2,3-dihydroxybenzaldehyde (25 mg, 0.22 mmol) and followed by stirring, piperidine (30 μl) and aluminum chloride (3 mg) were added, and the mixture was warmed at 90° C. for 5 h. After the reaction, the mixture was subjected to column separation to obtain the target compound (39 mg, 51%).

$^1$H-NMR (300 MHz, DMSO-d$_6$) δ 9.63 (br s, 1H), 9.30 (br s, 1H), 7.79 (d, J=8.0 Hz, 1H), 7.24 (s, 1H), 6.50-6.95 (m, 2H) 3.80-4.00 (m, 2H), 3.66 (s, 3H), 1.50-1.80 (br s, 2H), 1.26 (br s, 6H), 0.86 (br s, 3H).

MS (ESI): m/z=405.0689 [M+Na]$^+$.

Example 61

Production of 5-(4-(dimethylamino)benzylidene)-3-hexyl-1-methyl-2-selenoxoimidazolidine-4-on (1ajc, Compound 61)

Dioxane (0.6 mL) was added to the compound (52 mg, 0.20 mmol) obtained in step 3) of Example 59 and 4-dimethylaminobenzaldehyde (33 mg, 0.22 mmol) and followed by stirring, piperidine (30 μl) and aluminum chloride (3 mg) were added, and the mixture was warmed at 90° C. for 5 h. After the reaction, the mixture was subjected to column separation to obtain the target compound (46 mg, 59%).

$^1$H-NMR (300 MHz, DMSO-d$_6$) δ 8.24 (d, J=8.3 Hz, 1H), 7.07 (s, 1H), 6.75 (d, J=8.3 Hz, 1H), 3.82-3.95 (m, 2H), 3.67 (s, 3H), 3.02 (s, 6H), 1.63 (br s, 2H), 1.27 (br s, 6H), 0.85 (br s, 3H).

MS (ESI): m/z=394.1395 [M+H]$^+$.

Example 62

Production of 5-(3,5-dihydroxybenzylidene)-3-hexyl-1-methyl-2-selenoxoimidazolidine-4-on (1aje, Compound 62)

Dioxane (0.6 mL) was added to the compound (52 mg, 0.20 mmol) obtained in step 3) of Example 59 and 3,5-dihydroxybenzaldehyde (25 mg, 0.22 mmol) and followed by stirring, piperidine (30 μl) and aluminum chloride (3 mg) were added, and the mixture was warmed at 90° C. for 5 h. After the reaction, the mixture was subjected to column separation to obtain the target compound (51 mg, 67%).

$^1$H-NMR (300 MHz, DMSO-d$_6$) δ 9.55 (s, 0.5H), 9.45 (s, 1.5H), 7.08 (d, J=1.4 Hz, 1H), 6.95 (s, 0.7H), 6.86 (s, 0.3H), 6.25-6.40 (m, 1H), 3.80-3.95 (m, 2H), 3.66 (s, 3H), 1.62 (br s, 2H), 1.27 (br s, 6H), 0.85 (br s, 3H).

MS (ESI): m/z=405.0689 [M+Na]$^+$.

Example 63

Production of 3-hexyl-1-methyl-5-(4-morpholinobenzylidene)-2-selenoxoimidazolidine-4-on (1ajs, Compound 63)

Dioxane (0.6 mL) was added to the compound (52 mg, 0.20 mmol) obtained in step 3) of Example 59 and 4-morpholinobenzaldehyde (49 mg, 0.21 mmol) and followed by stirring, piperidine (30 μl) and aluminum chloride (3 mg) were added, and the mixture was warmed at 90° C. for 5 h. After the reaction, the mixture was subjected to column separation to obtain the target compound (50 mg, 58%).

$^1$H-NMR (300 MHz, DMSO-$d_6$) δ 8.18 (d, J=9.1 Hz, 2H), 6.94 (d, J=9.1 Hz, 2H), 6.87 (s, 1H), 3.90-3.98 (m, 2H), 3.72-3.82 (m, 4H), 3.66 (s, 3H), 3.20-3.30 (m, 4H), 1.59-1.75 (m, 2H), 1.22-1.44 (m, 6H), 0.80-0.94 (m, 3H).

MS (EI): m/z=435.1425 [M]$^+$.

Example 64

Production of 3-hexyl-5-(4-((2-(2-hydroxyethoxy)ethyl)amino)benzylidene)-1-methyl-2-selenoxoimidazolidine-4-on (1ajv, Compound 64)

Dioxane (0.5 mL) was added to the compound (23 mg, 0.09 mmol) obtained in step 3) of Example 59 and 4-((2-(2-hydroxy)ethyl)amino)benzaldehyde (18 mg, 0.22 mmol) and followed by stirring, piperidine (13 μl) and aluminum chloride (1 mg) were added, and the mixture was warmed at 90° C. for 5 h. After the reaction, the mixture was subjected to column separation to obtain the target compound (14 mg, 35%).

$^1$H-NMR (300 MHz, DMSO-$d_6$) δ 8.15 (d, J=8.9 Hz, 1.4H), 7.29 (d, J=8.8 Hz, 0.6H), 6.92 (s, 0.3H), 6.85 (s, 0.7H), 6.67 (d, J=8.9 Hz, 2H), 5.39 (br s, 0.7H), 5.18 (br s, 0.3H), 3.89-3.99 (m, 2H), 3.66 (s, 2.1H), 3.57-3.65 (m, 4H), 3.49-3.55 (m, 2H), 3.48 (s, 0.9H), 3.26-3.37 (m, 2H), 2.89-2.97 (m, 1H), 1.22-1.78 (m, 8H), 0.80-0.95 (m, 3H).

MS (EI): m/z=453.1534 [M]$^+$.

Example 65

Production of 3-hexyl-1-methyl-5-(4-((2-morpholinoethyl)amino)benzylidene)-2-selenoxoimidazolidine-4-on (1ajw, Compound 65)

Dioxane (0.8 mL) was added to the compound (40 mg, 0.15 mmol) obtained in step 3) of Example 59 and 4-(2-morpholinoethyl)aminobenzaldehyde (36 mg, 0.15 mmol) and followed by stirring, piperidine (23 μl) and aluminum chloride (2 mg) were added, and the mixture was warmed at 90° C. for 5 h. After the reaction, the mixture was subjected to column separation to obtain the target compound (25 mg, 34%).

$^1$H-NMR (300 MHz, CD$_3$CN) δ 8.15 (d, J=8.9 Hz, 0.6H), 7.29 (d, J=8.5 Hz, 0.4H), 6.91 (s, 0.4H), 6.85 (s, 0.6H), 6.65 (d, J=8.8 Hz, 1H), 5.35 (br s, 0.5H), 3.94 (q, J=7.4 Hz, 2H), 3.66 (s, 2H), 3.64 (t, J=4.6 Hz, 2H), 3.49 (s, 1H), 3.12-3.29 (m, 2H), 2.57 (t, J=6.2 Hz, 2H), 2.40-2.50 (m, 4H), 1.62-1.76 (m, 2H), 1.46-1.61 (m, 2H), 1.20-1.40 (m, 6H), 0.83-0.95 (m, 3H).

MS (EI): m/z=478.1849 [M]$^+$.

Example 66

Production of 5-(4-fluorobenzylidene)-3-hexyl-1-methyl-2-selenoxoimidazolidine-4-on (1ajx, Compound 66)

Dioxane (1.2 mL) was added to the compound (105 mg, 0.4 mmol) obtained in step 3) of Example 59 and 4-fluorobenzaldehyde (52 mg, 0.42 mmol) and followed by stirring, piperidine (60 μl) and aluminum chloride (6 mg) were added, and the mixture was warmed at 90° C. for 5 h. After the reaction, the mixture was subjected to column separation to obtain the target compound (18 mg, 12%).

$^1$H-NMR (300 MHz, CD$_3$CN) δ 8.13 (d, J=8.9 Hz, 1H), 6.84 (s, 1H), 7.37 (d, J=8.5 Hz, 1H), 7.17-7.32 (m, 1H), 6.83-6.98 (m, 2H), 4.08-4.20 (m, 1H), 3.77 (t, J=4.8 Hz, 2H), 3.68 (s, 1.7H), 3.47 (s, 1.3H), 3.17-3.30 (m, 2H), 2.95-3.06 (m, 1H), 1.15-1.36 (m, 4H), 0.75-0.96 (m, 3H).

MS (EI): m/z=368.0806 [M+]$^+$.

Example 67

Production of 5-(4-((2-(2-fluoroethoxy)ethyl)amino)benzylidene)-3-hexyl-1-methyl-2-selenoxoimidazolidine-4-on (1ajy, Compound 67)

Dioxane (4.7 mL) was added to the compound (654 mg, 2.49 mmol) obtained in step 3) of Example 59 and 4-((2-(2-fluoroethoxy)ethyl)amino)benzaldehyde (527 mg, 2.49 mmol) and followed by stirring, piperidine (370 μl) and aluminum chloride (66 mg) were added, and the mixture was warmed at 90° C. for 5 h. After the reaction, the mixture was subjected to column separation to obtain the target compound (791 mg, 70%).

$^1$H-NMR (300 MHz, CD$_3$CN) δ 8.15 (d, J=8.9 Hz, 2H), 6.84 (s, 1H), 6.66 (d, J=8.9 Hz, 2H), 5.28 (br s, 1H), 4.62 (t, J=4.0 Hz, 1H), 4.46 (t, J=4.0 Hz, 1H), 3.95 (t, J=7.5 Hz, 2H), 3.75 (t, J=4.0 Hz, 1H) 3.65 (s, 3H), 3.60-3.72 (m, 3H), 1.60-1.75 (m, 2H), 1.24-1.38 (m, 6H), 0.82-0.94 (m, 3H).

MS (EI): m/z=455.1484 [M+]$^+$.

Example 68

Production of 3-cyclopentyl-5-(2,4-dihydroxybenzylidene)-1-methyl-2-selenoxoimidazolidine-4-on (1aka, Compound 68)

1) Production of N-cyclopentylformamide

After cyclopentylamine (27 g, 322 mmol) was added to formic acid (30 g, 644 mmol), the reaction was conducted under reflux at 90° C. for 48 hours and terminated. The reaction mixture was concentrated under reduced pressure and dried in a high vacuum to obtain the target compound (26 g, 71%).

$^1$H-NMR (300 MHz, CDCl$_3$) δ 8.13 (s, 0.2H), 8.09 (s, 0.8H),), 5.98 (br s, 1H), 4.20-4.38 (m, 0.8H), 3.78-3.95 (m, 0.2H), 1.95-2.09 (m, 2H), 1.55-1.79 (m, 4H), 1.35-1.54 (m, 2H).

MS (EI): m/z=113 [M]$^+$.

2) Production of N-cyclopentyl isoselenocyanate

After N-(cyclohexyl)formamide (4.6 g, 33 mmol) was dissolved in methylene chloride (145 mL), triethylamine (20 mL, 4.30 mmol) and 4A MS (660 mg) were added. After triphosgene (5.3 g, 18 mmol) was dissolved in methylene chloride (25 mL), the solution was slowly added dropwise over 1 hour. The reaction mixture was refluxed for 4 h, then selenium (5.2 g, 66 mmol) was added, and stirring was performed for 4 h. The reaction mixture was cooled, then washed with water, methylene chloride, and brine, dried over anhydrous sodium sulfate, filtered, concentrated under reduced pressure, and then subjected to column separation to obtain the target compound (3.4 g, 51%).

$^1$H-NMR (300 MHz, CDCl$_3$) δ 7.20-7.35 (m, 2H), 7.00 (7.13 (m, 2H).

MS (EI): m/z=175 [M]$^+$.

3) Production of 3-cyclopentyl-1-methyl-2-selenoxoimidazolidine-4-on

Dioxane (170 mL) and sarcosine (346 mg, 3.89 mmol) were added to the compound (778 mg, 3.89 mmol) obtained in step 2), and the mixture was warmed at 110° C. for 4 h. After the reaction, the reaction mixture was cooled to room temperature and concentrated under reduced pressure, and the resulting residue was subjected to column separation to obtain the target compound (382 mg, 40%).

$^1$H-NMR (300 MHz, CDCl$_3$) δ 5.15 (quintet, J=8.5 Hz, 1H), 3.81 (s, 2H), 3.42 (s, 3H), 2.00-2.20 (m, 2H), 1.83-1.99 (m, 4H), 1.53-1.70 (m, 2H).

MS (EI): m/z=246 [M+H]$^+$.

4) Production of 3-cyclopentyl-5-(2,4-dihydroxybenzylidene)-1-methyl-2-selenoxoimidazolidine-4-on (1aka)

Dioxane (0.6 mL) was added to the compound (52 mg, 0.2 mmol) obtained in step 3) and 2,4-dihydroxybenzaldehyde (25 mg, 0.22 mmol) and followed by stirring, piperidine (30 μl) and aluminum chloride (3 mg) were added, and the mixture was warmed at 90° C. for 5 h. After the reaction, the mixture was subjected to column separation to obtain the target compound (63 mg, 81%).

$^1$H-NMR (300 MHz, DMSO-d$_6$) δ 10.4 (s, 1H), 10.1 (s, 1H), 8.53 (d, J=8.8 Hz, 1H), 7.24 (s, 1H), 6.37 (d, J=8.8 Hz, 1H), 5.21-5.31 (m, 1H), 1.98-2.15 (m, 2H), 1.68-1.88 (m, 4H), 1.48-1.67 (m, 2H).

MS (ESI): m/z=389.0377 [M+Na]$^+$.

Example 69

Production of 3-cyclopentyl-5-(2,3-dihydroxybenzylidene)-1-methyl-2-selenoxoimidazolidine-4-on (1akb, Compound 69)

Dioxane (0.3 mL) was added to the compound (25 mg, 0.1 mmol) obtained in step 3) of Example 68 and 2,3-dihydroxybenzaldehyde (15 mg, 0.11 mmol) and followed by stirring, piperidine (15 μl) and aluminum chloride (1.3 mg) were added, and the mixture was warmed at 90° C. for 5 h. After the reaction, the mixture was subjected to column separation to obtain the target compound (18 mg, 49%).

$^1$H-NMR (300 MHz, DMSO-d$_6$) δ 7.04 (dt, J=7.7, 1.7 Hz, 1H), 6.85-7.00 (m, 2H), 6.69-6.86 (m, 1H), 3.79 (s, 1H), 3.44 (s, 2H), 2.05-2.30 (m, 2H), 1.85-2.05 (m, 4H), 1.53-1.78 (m, 2H).

MS (ESI): m/z=389.0379 [M+Na]$^+$.

Example 70

Production of 3-cyclopentyl-5-(4-(dimethylamino)benzylidene)-1-methyl-2-selenoxoimidazolidine-4-on (1akc, Compound 70)

Dioxane (0.3 mL) was added to the compound (25 mg, 0.1 mmol) obtained in step 3) of Example 68 and 4-dimethylaminobenzaldehyde (16 mg, 0.11 mmol) and followed by stirring, piperidine (15 μl) and aluminum chloride (1.3 mg) were added, and the mixture was warmed at 90° C. for 5 h. After the reaction, the mixture was subjected to column separation to obtain the target compound (36 mg, 96%).

$^1$H-NMR (300 MHz, CDCl$_3$) δ 8.21 (d, J=9.0 Hz, 2H), 7.07 (s, 1H), 6.75 (d, J=9.0 Hz, 2H), 5.10-5.40 (m, 1H), 3.69 (s, 3H), 3.02 (s, 6H), 1.96-2.18 (m, 2H), 1.75-1.93 (m, 4H), 1.52-1.69 (m, 2H).

MS (ESI): m/z=378.1079 [M+H]$^+$.

Example 71

Production of 3-cyclopentyl-5-(3,4-dihydroxybenzylidene)-1-methyl-2-selenoxoimidazolidine-4-on (1akd, Compound 71)

Dioxane (0.3 mL) was added to the compound (25 mg, 0.1 mmol) obtained in step 3) of Example 68 and 3,4-dihydroxybenzaldehyde (15 mg, 0.11 mmol) and followed by stirring, piperidine (15 μl) and aluminum chloride (1.3 mg) were added, and the mixture was warmed at 90° C. for 5 h. After the reaction, the mixture was subjected to column separation to obtain the target compound (27 mg, 73%).

$^1$H-NMR (300 MHz, DMSO-d$_6$) δ 9.80 (br s, 1H), 9.26 (br s, 1H), 7.94 (d, J=1.9 Hz, 1H), 7.53 (dd, J=8.4, 1.9 Hz, 1H), 7.01 (s, 1H), 5.28 (quintet, J=8.6 Hz, 1H), 3.68 (s, 3H), 2.00-2.20 (m, 2H), 1.73-1.95 (m, 4H), 1.50-1.67 (m, 2H).

MS (ESI): m/z=367.0561 [M+H]$^+$.

Example 72

Production of 3-cyclopentyl-5-(3,5-dihydroxybenzylidene)-1-methyl-2-selenoxoimidazolidine-4-on (1ake, Compound 72)

Dioxane (0.3 mL) was added to the compound (25 mg, 0.1 mmol) obtained in step 3) of Example 68 and 3,5-dihydroxybenzaldehyde (15 mg, 0.11 mmol) and followed by stirring, piperidine (15 μl) and aluminum chloride (1.3 mg) were added, and the mixture was warmed at 90° C. for 5 h. After the reaction, the mixture was subjected to column separation to obtain the target compound (36 mg, 100%).

$^1$H-NMR (300 MHz, DMSO-d$_6$) δ 9.52, 9.42 (each s (1:3), 2H), 7.04 (d, J=2.0 Hz, 1H), 6.95 (s, 1H), 6.80 (s, 0.4H), 5.10-5.37 (m, 1H), 3.67 (s, 2.2H), 3.38 (s, 0.8H), 1.96-2.16 (m, 2H), 1.73-1.95 (m, 4H), 1.48-1.67 (m, 2H).

MS (ESI): m/z=369.0376 [M+Na]$^+$.

Example 73

Production of 5-(2,4-dihydroxybenzylidene)-3-(4-fluorophenyl)-1-methyl-2-selenoxoimidazolidine-4-on (1ala, Compound 73)

1) Production of N-(4-fluorophenyl)formamide

After 4-fluorophenylamine (24 g, 215 mmol) was added to formic acid (30 g, 644 mmol), the reaction was conducted under reflux at 100° C. for 4 hours and terminated. After ethyl acetate was added to the reaction mixture for dilution, the organic layer was washed with water, 0.1 N aqueous hydrochloric acid solution, saturated aqueous sodium bicarbonate solution, and brine. The organic layer was dried over anhydrous sodium sulfate, filtered, and concentrated under reduced pressure to obtain the target compound (24 g, 79%).

$^1$H-NMR (300 MHz, CDCl$_3$) δ 8.57 (d, J=11.4 Hz, 0.4H), 8.37 (s, 0.6H), 7.80 (br s, 0.4H), 7.45-7.56 (m, 1H), 7.23 (br s, 0.6H), 6.97-7.10 (m, 3H).

MS (EI): m/z=139 [M]$^+$.

2) Production of N-(4-fluorophenyl) isoselenocyanate

After N-(4-fluorophenyl)formamide (4.6 g, 33 mmol) was dissolved in methylene chloride (145 mL), triethylamine (20 mL, 4.30 mmol) and 4A MS (660 mg) were added. After triphosgene (5.3 g, 18 mmol) was dissolved in methylene chloride (25 mL), the solution was slowly added dropwise over 1 hour. The reaction mixture was refluxed for 4 h, then selenium (5.2 g, 66 mmol) was added, and stirring was performed for 4 h. The reaction mixture was cooled, then washed with water, methylene chloride, and brine, dried over anhydrous sodium sulfate, filtered, concentrated under reduced pressure, and then subjected to column separation to obtain the target compound (3.4 g, 51%).

$^1$H-NMR (300 MHz, CDCl$_3$) δ 7.20-7.35 (m, 2H), 7.00 (7.13 (m, 2H).
MS (EI): m/z=201 [M]$^+$.

3) Production of 3-(4-fluorophenyl)-1-methyl-2-selenoxoimidazolidine-4-on

Dioxane (170 mL) and sarcosine (346 mg, 3.89 mmol) were added to the compound (778 mg, 3.89 mmol) obtained in step 2), and the mixture was warmed at 110° C. for 4 h. After the reaction, the reaction mixture was cooled to room temperature and concentrated under reduced pressure, and the resulting residue was subjected to column separation to obtain the target compound (939 mg, 89%).

$^1$H-NMR (300 MHz, CDCl$_3$) δ 7.10-7.40 (m, 4H), 4.08 (s, 2H), 3.51 (s, 3H).
MS (EI): m/z=272 [M+H]$^+$.

4) Production of 5-(2,4-dihydroxybenzylidene)-3-(4-fluorophenyl)-1-methyl-2-selenoxoimidazolidine-4-on (1ala)

Dioxane (0.6 mL) was added to the compound (52 mg, 0.2 mmol) obtained in step 3) and 2,4-dihydroxybenzaldehyde (25 mg, 0.22 mmol) and followed by stirring, piperidine (30 μl) and aluminum chloride (3 mg) were added, and the mixture was warmed at 90° C. for 5 h. After the reaction, the mixture was subjected to column separation to obtain the target compound (63 mg, 81%).

$^1$H-NMR (300 MHz, DMSO-d$_6$) δ 10.4 (s, 1H), 10.1 (s, 1H), 8.50 (d, J=8.8 Hz, 1H), 7.28-7.60 (m, 5H), 6.38 (d, J=2.2 Hz, 1H), 6.26 (dd, J=8.8, 2.2 Hz, 1H), 3.75 (s, 3H).
MS (ESI): m/z=393.0150 [M+H]$^+$.

Example 74

Production of 5-(2,3-dihydroxybenzylidene)-3-(4-fluorophenyl)-1-methyl-2-selenoxoimidazolidine-4-on (1alb, Compound 74)

Dioxane (1.5 mL) was added to the compound (136 mg, 0.5 mmol) obtained in step 3) of Example 73 and 2,3-dihydroxybenzaldehyde (78 mg, 0.6 mmol) and followed by stirring, piperidine (74 μl) and aluminum chloride (7 mg) were added, and the mixture was warmed at 90° C. for 5 h. After the reaction, the mixture was subjected to column separation to obtain the target compound (98 mg, 50%).

$^1$H-NMR (300 MHz, DMSO-d$_6$) δ 9.40 (br s, 2H), 7.28-7.53 (m, 4H), 7.00 (s, 1H), 6.60-6.90 (m, 2H), 3.76 (s, 1H), 3.46 (s, 2H).
MS (ESI): m/z=393.0149 [M+1]$^+$.

Example 75

Production of 5-(4-(dimethylamino)benzylidene)-3-(4-fluorophenyl)-1-methyl-2-selenoxoimidazolidine-4-on (1alc, Compound 75)

Dioxane (1.5 mL) was added to the compound (136 mg, 0.5 mmol) obtained in step 3) of Example 73 and 4-dimethylaminobenzaldehyde (82 mg, 0.6 mmol) and followed by stirring, piperidine (74 μl) and aluminum chloride (7 mg) were added, and the mixture was warmed at 90° C. for 5 h. After the reaction, the mixture was subjected to column separation to obtain the target compound (199 mg, 90%).

$^1$H-NMR (300 MHz, DMSO-d$_6$) δ 8.19 (d, J=9.1 Hz, 2H), 7.32-7.44 (m, 2H), 7.13-7.24 (m, 2H), 6.80 (s, 1H), 6.67 (d, J=9.1 Hz, 1H), 3.85 (s, 3H), 3.06 (s, 6H).
MS (ESI): m/z=404.0674 [M+H]$^+$.

Example 76

Production of 5-(3,4-dihydroxybenzylidene)-3-(4-fluorophenyl)-1-methyl-2-selenoxoimidazolidine-4-on (1ald, Compound 76)

Dioxane (1.5 mL) was added to the compound (136 mg, 0.5 mmol) obtained in step 3) of Example 73 and 3,4-dihydroxybenzaldehyde (78 mg, 0.6 mmol) and followed by stirring, piperidine (74 μl) and aluminum chloride (7 mg) were added, and the mixture was warmed at 90° C. for 5 h. After the reaction, the mixture was subjected to column separation to obtain the target compound (67 mg, 34%).

$^1$H-NMR (300 MHz, DMSO-d$_6$) δ 9.56 (s, 2H), 7.29-7.57 (m, 5H), 6.93 (s, 1H), 6.35 (d, J=2.0 Hz, 1H), 6.20-6.32 (m, 1H), 3.46 (s, 3H).
MS (ESI): m/z=414.9971 [M+1]$^+$.

Example 77

Production of 5-(3,5-dihydroxybenzylidene)-3-(4-fluorophenyl)-1-methyl-2-selenoxoimidazolidine-4-on (1ale, Compound 77)

Dioxane (3.0 mL) was added to the compound (272 mg, 1.0 mmol) obtained in step 3) of Example 73 and 3,5-dihydroxybenzaldehyde (155 mg, 1.0 mmol) and followed by stirring, piperidine (148 μl) and aluminum chloride (13 mg) were added, and the mixture was warmed at 90° C. for 5 h. After the reaction, the mixture was subjected to column separation to obtain the target compound (153 mg, 39%).

$^1$H-NMR (300 MHz, DMSO-d$_6$) δ 9.56 (s, 0.5H), 9.41 (s, 1.5H), 7.40-7.56 (m, 2H), 7.30-7.40 (m, 2H), 7.08 (d, J=2.2 Hz, 1H), 7.05 (s, 1H), 6.20-6.52 (m, 2H), 3.76 (s, 2H), 3.46 (s, 1H).
MS (ESI): m/z=393.0149 [M+H]$^+$.

Example 78

Production of 5-(2,4-dihydroxybenzylidene)-1-methyl-3-octyl-2-selenoxoimidazolidine-4-on (1ama, Compound 78)

1) Production of N-octylformamide

After N-octylamine (6.9 mL 32 mmol) was added to formic acid (3.6 mL, 95 mmol), the reaction was conducted under reflux at 90° C. for 48 hours and terminated. The reaction mixture was concentrated under reduced pressure, dried in a high vacuum, and subjected to column separation to obtain the target compound (5.5 g, 94%).

H-NMR (300 MHz, CDCl$_3$) δ 8.15 (s, 1H), 6.17 (br s, 1H), 3.17-3.31 (m, 2H), 1.48-1.55 (m, 2H), 1.24-1.28 (m, 10H), 0.88 (t, J=6.6 Hz, 3H).

MS (EI): m/z=156 [M−1]$^+$.

2) Production of N-octyl isoselenocyanate

After N-octylformamide (1.0 g, 5.8 mmol) was dissolved in EDC (20 mL), triethylamine (3.5 mL, 25 mmol) and 4A MS (1 g) were added. After triphosgene (930 mg, 3.1 mmol) was dissolved in EDC (10 mL), the solution was slowly added dropwise over 1 hour. The reaction mixture was refluxed for 4 h, then selenium (917 mg, 66 mmol) was added, and stirring was performed for 4 h. The reaction mixture was cooled, then washed with water, methylene chloride, and brine, dried over anhydrous sodium sulfate, filtered, concentrated under reduced pressure, and then subjected to column separation to obtain the target compound (912 mg, 67%).

$^1$H-NMR (300 MHz, CDCl$_3$) δ 3.60 (t, J=6.6 Hz, 2H), 1.73 (q, J=7.7 Hz, 2H), 1.29-1.44 (m, 10H), 0.89 (t, J=7.0 Hz, 3H).

3) Production of N-octyl-1-methyl-2-selenoxoimidazolidine-4-on

Dioxane (10 mL) and sarcosine (123 mg, 1.4 mmol) were added to the compound (300 mg, 1.37 mmol) obtained in step 2), and the mixture was warmed at 110° C. for 4 h. After the reaction, the reaction mixture was cooled to room temperature and concentrated under reduced pressure, and the resulting residue was subjected to column separation to obtain the target compound (320 mg, 81%).

$^1$H-NMR (300 MHz, CDCl$_3$) δ 3.86-3.91 (m, 4H), 3.42 (s, 3H), 1.63-1.73 (m, 2H), 1.27-1.32 (m, 10H), 0.89 (t, J=7.0 Hz, 3H).

4) Production of 5-(2,4-dihydroxybenzylidene)-1-methyl-3-octyl-2-selenoxoimidazolidine-4-on (1ama)

Dioxane (2 mL) was added to the compound (150 mg, 0.52 mmol) obtained in step 3) and 2,4-dihydroxybenzaldehyde (86 mg, 0.62 mmol) and followed by stirring, piperidine (77 µl) and aluminum chloride (14 mg) were added, and the mixture was warmed at 90° C. for 5 h. After the reaction, the mixture was subjected to column separation to obtain the target compound (124 mg, 58%).

$^1$H-NMR (300 MHz, DMSO-d$_6$) δ 10.4 (s, 1H), 10.2 (s, 1H), 8.57 (d, J=8.8 Hz, 1H), 7.24 (s, 1H), 6.37 (d, J=0.2 Hz, 1H), 6.29 (dd, J=8.8, 2.6 Hz, 1H 1H), 3.88 (t J=7.3 Hz, 2H), 3.65 (s, 3H), 1.60-1.64 (m, 2H), 1.24-1.26 (m, 10H), 0.84 (t, J=6.4 Hz, 3H).

MS (EI): m/z=410.1110 [M]$^+$.

Example 79

Production of 5-(3,5-dihydroxybenzylidene)-1-methyl-3-octyl-2-selenoxoimidazolidine-4-on (1ame, Compound 79)

Dioxane (1 mL) was added to the compound (70 mg, 0.24 mmol) obtained in step 3) of Example 78 and 3,5-dihydroxybenzaldehyde (40 mg, 0.29 mmol) and followed by stirring, piperidine (36 µl) and aluminum chloride (6.4 mg) were added, and the mixture was warmed at 90° C. for 5 h. After the reaction, the mixture was subjected to column separation to obtain the target compound (91 mg, 92%).

$^1$H-NMR (300 MHz, DMSO-d$_6$) δ 9.52 (s, 1H), 9.42 (s, 1H), 7.15 (s, 1H), 6.96 (s, 0.3H), 6.86 (s, 0.7H), 6.27-6.36 (m, 2H), 3.88 (t, J=7.3 Hz, 2H), 3.66 (s, 3H), 1.63 (s, 2H), 1.25-1.27 (m, 10H), 0.85 (t, J=6.6 Hz, 3H).

MS (EI): m/z=410.1110 [M]$^+$.

Example 80

Production of 3-decyl-5-(2,4-dihydroxybenzylidene)-1-methyl-2-selenoxoimidazolidine-4-on (1ana, Compound 80)

1) Production of N-decylformamide

After N-octylamine (6.9 mL 32 mmol) was added to formic acid (3.6 mL, 95 mmol), the reaction was conducted under reflux at 90° C. for 48 hours and terminated. The reaction mixture was concentrated under reduced pressure, dried in a high vacuum, and subjected to column separation to obtain the target compound (5.5 g, 94%).

$^1$H-NMR (300 MHz, CDCl$_3$) δ 8.16 (s, 0.2H), 5.74 (br s, 1H), 3.29 (q, J=6.7 Hz, 2H), 1.48-1.55 (m, 3H), 1.20-1.29 (m, 13H), 0.88 (t, J=6.8 Hz, 3H).

MS (EI): m/z=184 [M−1]$^+$.

2) Production of N-decyl isoselenocyanate

After N-decylformamide (500 mg, 2.7 mmol) was dissolved in EDC (24 mL), triethylamine (1.6 mL, 25 mmol) and 4A MS (0.1 g) were added. After triphosgene (432 mg, 3.1 mmol) was dissolved in EDC (16 mL), the solution was slowly added dropwise over 1 hour. The reaction mixture was refluxed for 4 h, then selenium (426 mg, 5.4 mmol) was added, and stirring was performed for 4 h. The reaction mixture was cooled, then washed with water, methylene chloride, and brine, dried over anhydrous sodium sulfate, filtered, concentrated under reduced pressure, and then subjected to column separation to obtain the target compound (462 mg, 69%).

$^1$H-NMR (300 MHz, CDCl$_3$) δ 3.59 (t, J=6.7 Hz, 2H), 1.73 (quintet, J=6.7 Hz, 1H), 1.27-1.44 (m, 14H), 0.88 (t, J=6.7 Hz, 3H).

MS (EI): m/z=247 [M]$^+$.

3) Production of N-decyl-1-methyl-2-selenoxoimidazolidine-4-on

Dioxane (10 mL) and sarcosine (108 mg, 1.4 mmol) were added to the compound (300 mg, 1.37 mmol) obtained in step 2), and the mixture was warmed at 110° C. for 4 h. After the reaction, the reaction mixture was cooled to room temperature and concentrated under reduced pressure, and the resulting residue was subjected to column separation to obtain the target compound (289 mg, 75%).

$^1$H-NMR (300 MHz, CDCl$_3$) δ 3.86-3.91 (m, 4H), 3.42 (s, 2H), 1.27-1.44 (m, 3H), 1.63-1.73 (m, 2H), 1.26-1.32 (m, 14H), 0.88 (t, J=6.6 Hz, 3H).

4) Production of 3-decyl-5-(2,4-dihydroxybenzylidene)-1-methyl-2-selenoxoimidazolidine-4-on (1ana)

Dioxane (1.5 mL) was added to the compound (100 mg, 0.32 mmol) obtained in step 3) and 2,4-dihydroxybenzaldehyde (52 mg, 0.38 mmol) and followed by stirring, piperidine (47 µl) and aluminum chloride (8.4 mg) were added, and the mixture was warmed at 90° C. for 5 h. After the reaction, the mixture was subjected to column separation to obtain the target compound (94 mg, 69%).

$^1$H-NMR (300 MHz, DMSO-d$_6$) δ 10.4 (s, 1H), 10.1 (s, 1H), 8.57 (d, J=8.8 Hz, 1H), 7.24 (s, 1H), 6.37 (d, J=2.3 Hz, 1H), 6.28 (dd, J=8.8, 2.2 Hz, 1H), 3.88 (t, J=7.3 Hz, 2H), 3.65 (s, 3H), 1.57-1.67 (m, 2H), 1.17-1.26 (m, 14H), 10.84 (t, J=7.0 Hz, 3H).

MS (EI): m/z=438.1425 [M]$^+$.

Example 81

Production of 5-(2,4-dihydroxybenzylidene)-1-methyl-3-(2-morpholinoethyl)-2-selenoxoimidazolidine-4-on (1apa, Compound 81)

1) Production of N-(3-morpholinoethyl)formamide

After N-(3-aminoethyl)morpholine (3.0 mL 21 mmol) was added to formic acid (2.6 mL, 69 mmol), the reaction was conducted under reflux at 90° C. for 48 hours and terminated. The reaction mixture was concentrated under reduced pressure, dried in a high vacuum, and subjected to column separation to obtain the target compound (4.6 g, 122%).

$^1$H-NMR (300 MHz, CDCl$_3$) δ 8.30 (s, 1), 7.11 (br s, 1H),), 3.83 (t, J=4.7 Hz, 4H), 3.56 (q, J=5.7 Hz, 2H), 2.79-2.83 (m, 6H).

MS (EI): m/z=158 [M]$^+$.

2) Production of N-(3-morpholinoethyl) isoselenocyanate

After N-(3-morpholinoethyl)formamide (1.0 g, 6.3 mmol) was dissolved in EDC (20 mL), triethylamine (3.7 mL, 27 mmol) and 4A MS (1 g) were added. After triphosgene (930 mg, 3.1 mmol) was dissolved in EDC (10 mL), the solution was slowly added dropwise over 1 hour. The reaction mixture was refluxed for 4 h, then selenium (998 mg, 13 mmol) was added, and stirring was performed for 4 h. The reaction mixture was cooled, then washed with water, methylene chloride, and brine, dried over anhydrous sodium sulfate, filtered, concentrated under reduced pressure, and then subjected to column separation to obtain the target compound (452 mg, 33%).

$^1$H-NMR (300 MHz, CDCl$_3$) δ 3.68-3.74 (m, 6H), 2.71 (t, J=6.2 Hz, 2H), 2.52 (t, J=4.7 Hz, 4H).

MS (EI): m/z=220 [M]$^+$.

3) Production of N-(3-morpholinoethyl)-1-methyl-2-selenoxoimidazolidine-4-on

Dioxane (12 mL) and sarcosine (184 mg, 2.06 mmol) were added to the compound (452 mg, 2.06 mmol) obtained in step 2), and the mixture was warmed at 110° C. for 4 h. After the reaction, the reaction mixture was cooled to room temperature and concentrated under reduced pressure, and the resulting residue was subjected to column separation to obtain the target compound (368 mg, 61%).

$^1$H-NMR (300 MHz, CDCl$_3$) δ 4.04 (t, J=6.6 Hz, 2H), 3.89 (s, 2H), 3.65-3.70 (m, 4H), 3.43 (s, 3H), 2.68 (t, J=6.6 Hz, 2H), 2.52-2.55 (m, 3H), 2.40-2.45 (m, 1H).

MS (EI): m/z=291 [M]$^+$.

4) Production of 5-(2,4-dihydroxybenzylidene)-1-methyl-3-(2-morpholinoethyl)-2-selenoxoimidazolidine-4-on (1apa)

Dioxane (1.5 mL) was added to the compound (100 mg, 0.33 mmol) obtained in step 3) and 2,4-dihydroxybenzaldehyde (57 mg, 0.41 mmol) and followed by stirring, piperidine (51 µl) and aluminum chloride (9.2 mg) were added, and the mixture was warmed at 90° C. for 5 h. After the reaction, the mixture was subjected to column separation to obtain the target compound (42 mg, 30%).

$^1$H-NMR (300 MHz, DMSO-d$_6$) δ 10.4 (s, 1H), 10.2 (s, 1H), 8.56 (d, J=8.8 Hz, 1H), 7.25 (s, 1H), 6.38 (d, J=2.1 Hz, 1H), 6.29 (dd, J=8.9, 2.1 Hz, 1H), 4.03 (t, J=6.6 Hz, 2H), 3.66 (s, 3H), 3.53 (t, J=?Hz, 6H), 2.58 (t, J=6.7 Hz, 2H), 2.44 (s, 2H).

MS (EI): m/z=411.0698 [M]$^+$.

Example 82

Production of 5-(3,5-dihydroxybenzylidene)-1-methyl-3-(2-morpholinoethyl)-2-selenoxoimidazolidine-4-on (1ape, Compound 82)

Dioxane (1.5 mL) was added to the compound (100 mg, 0.33 mmol) obtained in step 3) of Example 81 and 3,5-dihydroxybenzaldehyde (57 mg, 0.41 mmol) and followed by stirring, piperidine (51 µl) and aluminum chloride (9.2 mg) were added, and the mixture was warmed at 90° C. for 5 h. After the reaction, the mixture was subjected to column separation to obtain the target compound (4.9 mg, 3.5%).

$^1$H-NMR (300 MHz, DMSO-d$_6$) δ 9.53 (s, 1H), 9.44 (s, 1H), 7.08 (s, 1H), 7.24 (s, 1H), 6.97 (s, 0.4H), 6.88 (s, 0.6H), 6.30 (s, 1H), 6.22-6.38 (m, 1H), 3.96-4.08 (m, 2H), 3.67 (s, 1.3H), 3.47-3.58 (m, 4H), 3.38 (s, 1.7H), 2.54-2.65 (m, 2H), 2.35-2.47 (m, 4H).

MS (EI): m/z=411.0701 [M]$^+$.

Example 83

Production of 5-(2,4-dihydroxybenzylidene)-1-methyl-3-(2-morpholinopropyl)-2-selenoxoimidazolidine-4-on (1aqa, Compound 83)

1) Production of N-(3-morpholinopropyl)formamide

After N-(3-aminoethyl)morpholine (3.0 mL 21 mmol) was added to formic acid (2.4 mL, 62 mmol), the reaction was conducted under reflux at 90° C. for 48 hours and terminated. The reaction mixture was concentrated under reduced pressure, dried in a high vacuum, and subjected to column separation to obtain the target compound (4.4 g, 122%).

$^1$H-NMR (300 MHz, CDCl$_3$) δ 8.34 (s, 1H), 7.03 (br s, 1H),), 3.86 (t, J=4.7 Hz, 4H), 3.37 (q, J=6.4 Hz, 2H), 2.78-2.85 (m, 6H), 1.90 (quintet, J=6.1 Hz, 2H).

MS (EI): m/z=172 [M]$^+$.

2) Production of N-(3-morpholinopropyl) isoselenocyanate

After N-(3-morpholinopropyl)formamide (1.0 g, 5.8 mmol) was dissolved in EDC (20 mL), triethylamine (3.5 mL, 25 mmol) and 4A MS (1 g) were added. After triphosgene (930 mg, 3.1 mmol) was dissolved in EDC (10 mL), the solution was slowly added dropwise over 1 hour. The reaction mixture was refluxed for 4 h, then selenium (917 mg, 66 mmol) was added, and stirring was performed for 4 h. The reaction mixture was cooled, then washed with water, methylene chloride, and brine, dried over anhydrous sodium sulfate, filtered, concentrated under reduced pressure, and then subjected to column separation to obtain the target compound (912 mg, 67%).

$^1$H-NMR (300 MHz, CDCl$_3$) δ 3.69-3.73 (m, 6H), 2.42-2.48 (m, 6H), 1.89 (quintet, J=6.6 Hz, 2H).

MS (EI): m/z=234 [M]$^+$.

3) Production of N-(3-morpholinoethyl)-1-methyl-2-selenoxoimidazolidine-4-on Dioxane (12 mL) and sarcosine (344 mg, 3.86 mmol) were added to the compound (900 mg, 3.86 mmol) obtained in step 2), and the mixture was warmed at 110° C. for 4 h. After the reaction, the reaction mixture was cooled to room temperature and concentrated under reduced pressure, and the resulting residue was subjected to column separation to obtain the target compound (975 mg, 83%).

$^1$H-NMR (300 MHz, CDCl$_3$) δ 4.98 (t, J=7.3 Hz, 2H), 3.87 (s, 2H), 3.69 (t, J=4.6 Hz, 4H), 3.42 (s, 3H), 2.40-2.45 (m, 6H), 1.89 (quintet, J=7.3 Hz, 2H).

MS (EI): m/z=305 [M]$^+$.

4) Production of 5-(2,4-dihydroxybenzylidene)-1-methyl-3-(2-morpholinopropyl)-2-selenoxoimidazolidine-4-on (1aqa)

Dioxane (1.5 mL) was added to the compound (100 mg, 0.33 mmol) obtained in step 3) and 2,4-dihydroxybenzaldehyde (55 mg, 0.39 mmol) and followed by stirring, piperidine (49 µl) and aluminum chloride (8.8 mg) were added, and the mixture was warmed at 90° C. for 5 h. After the reaction, the mixture was subjected to column separation to obtain the target compound (73 mg, 53%).

$^1$H-NMR (300 MHz, DMSO-d$_6$) δ 8.58 (d, J=8.8 Hz, 1H), 7.24 (s, 1H), 6.37 (d, J=2.3 Hz, 1H), 6.28 (dd, J=8.9, 2.3 Hz, 1H), 3.96 (t, J=6.6 Hz, 2H), 3.66 (s, 3H), 3.47 (t, J=4.0 Hz, 4H), 2.28-2.35 (m, 6H), 1.81 (t, J=6.8 Hz, 2H).

MS (EI): m/z=425.0855 [M]$^+$.

Example 84

Production of 5-(3,5-dihydroxybenzylidene)-1-methyl-3-(3-morpholinopropyl)-2-selenoxoimidazolidine-4-on (1aqe, Compound 84)

Dioxane (1.5 mL) was added to the compound (100 mg, 0.33 mmol) obtained in step 3) of Example 83 and 2,4-dihydroxybenzaldehyde (55 mg, 0.39 mmol) and followed by stirring, piperidine (49 µl) and aluminum chloride (8.8 mg) were added, and the mixture was warmed at 90° C. for 5 h. After the reaction, the mixture was subjected to column separation to obtain the target compound (42 mg, 30%).

$^1$H-NMR (300 MHz, DMSO-d$_6$) δ 9.45 (br s, 2H), 7.09 (d, J=2.0 Hz, 1H), 6.97 (s, 0.5H), 6.86 (s, 0.5H), 6.24-6.35 (m, 2H), 3.90-4.02 (m, 2H), 3.67 (s, 1.8H), 3.43-3.58 (m, 4H), 3.38 (s, 1.2H), 2.20-2.40 (m, 6H), 1.74-1.88 (m, 2H).

MS (EI): m/z=425.0854 [M]$^+$.

Example 85

Production of 5-(4-chlorobenzylidene)-1-methyl-3-(3-morpholinopropyl)-2-selenoxoimidazolidine-4-on (1aqj, Compound 85)

Dioxane (0.8 mL) was added to the compound (52 mg, 0.17 mmol) obtained in step 3) of Example 81 and 4-chlorobenzaldehyde (19 mg, 0.13 mmol) and followed by stirring, piperidine (20 µl) and aluminum chloride (1.7 mg) were added, and the mixture was warmed at 90° C. for 5 h. After the reaction, the mixture was subjected to column separation to obtain the target compound (42 mg, 75%).

$^1$H-NMR (300 MHz, DMSO-d$_6$) δ 8.17 (d, J=8.6 Hz, 1.4H), 7.99 (d, J=8.6 Hz, 0.6H), 7.40-7.60 (m, 2H), 7.19 (s, 0.7H), 7.00 (s, 0.3H), 3.92-4.30 (m, 2H), 3.69 (s, 2.2H), 3.43-3.60 (m, 4H), 3.46 (s, 0.8H), 2.18-2.38 (m, 6H), 1.64-1.87 (m, 2H).

MS (EI): m/z=427.0565 [M]$^+$.

Example 86

Production of 5-(4-fluorobenzylidene)-1-methyl-3-(3-morpholinopropyl)-2-selenoxoimidazolidine-4-on (1aqx, Compound 86)

Dioxane (2 mL) was added to the compound (100 mg, 0.33 mmol) obtained in step 3) of Example 81 and 4-fluorobenzaldehyde (35 uL, 0.33 mmol) and followed by stirring, piperidine (81 µl) and aluminum chloride (8.8 mg) were added, and the mixture was warmed at 90° C. for 5 h. After the reaction, the mixture was subjected to column separation to obtain the target compound (69 mg, 52%).

$^1$H-NMR (300 MHz, DMSO-d$_6$) δ 8.19-8.31 (m, 0.7H), 7.98-8.06 (m, 0.3H), 7.56-7.66 (m, 0.3H), 7.40-7.50 (m, 0.7H), 7.20-7.35 (m, 2H), 7.21 (s, 0.7H), 7.02 (s, 0.3H), 3.80-4.30 (m, 2H), 3.69 (s, 1.6H), 3.25-3.63 (m, 4H), 3.18 (s, 1.4H), 2.20-2.40 (m, 6H), 1.65-1.87 (m, 2H).

MS (EI): m/z=411.0859 [M]$^+$.

Example 87

Production of 5-(2,4-dihydroxybenzylidene)-3-(5-fluorohexyl)-1-methyl-2-selenoxoimidazolidine-4-on (lara, Compound 87)

1) Production of N-(6-fluorohexyl)formamide

After 6-formamidohexylmethanesulfonate (800 mg, 3.6 mmol) was dissolved in acetonitrile (60 mL), TBAF (1 m soln. in THF, 7.17 mL, 7.17 mmol) was added, and the mixture for reaction was stirred for 2 hours. The reaction mixture was concentrated under reduced pressure, dried with water, ethyl acetate, and anhydrous sodium sulfate, then filtered, distilled under reduced pressure, dried in a high vacuum, and subjected to column separation to obtain the target compound (463 mg, 88%).

$^1$H-NMR (300 MHz, CDCl$_3$) δ 8.18 (s, 1H), 5.57 (br s, 1H), 4.52 (t, J=6.0 Hz, 1H), 4.37 (t, J=6.0 Hz, 1H), 3.15-3.40 (m, 2H), 1.30-1.80 (m, 8H).

MS (EI): m/z=146 [M–H]$^+$.

2) Production of N-(6-fluorohexyl) isoselenocyanate

After N-(6-fluorohexyl)formamide (595 mg, 4.0 mmol) was dissolved in MC (14 mL), triethylamine (2.4 mL, 17 mmol) and 4A MS (80 mg) were added. After triphosgene (648 mg, 2.2 mmol) was dissolved in MC (6 mL), the solution was slowly added dropwise over 1 hour. The reaction mixture was refluxed for 4 h, then selenium (638 mg, 8.1 mmol) was added, and stirring was performed for 4 h. The reaction mixture was cooled, then washed with water, methylene chloride, and brine, dried over anhydrous sodium sulfate, filtered, concentrated under reduced pressure, and then subjected to column separation to obtain the target compound (513 mg, 61%).

$^1$H-NMR (300 MHz, CDCl$_3$) δ 4.54 (t, J=5.9 Hz, 1H), 4.38 (t, J=5.9 Hz, 1H), 3.63 (t, J=6.6 Hz, 2H), 1.60-1.85 (m, 4H), 1.35-1.57 (m, 4H).

MS (EI): m/z=207 [M−H]$^+$.

3) Production of 3-(6-fluorohexyl)-1-methyl-2-selenoxoimidazolidine-4-on

Dioxane (140 mL) and sarcosine (214 mg, 2.4 mmol) were added to the compound (495 mg, 1.37 mmol) obtained in step 2), and the mixture was warmed at 110° C. for 4 h. After the reaction, the reaction mixture was cooled to room temperature and concentrated under reduced pressure, and the resulting residue was subjected to column separation to obtain the target compound (450 mg, 68%).

$^1$H-NMR (300 MHz, CDCl$_3$) δ 4.47-4.57 (m, 1H), 4.33-4.41 (m, 1H), 3.88 (s, 2H), 3.83-3.97 (m, 2H), 3.42 (s, 2.4H), 3.33 (s, 0.6H), 1.57-1.82 (m, 4H), 1.32-1.54 (m, 4H).

MS (EI): m/z=280 [M+H]$^+$.

4) Production of 5-(2,4-dihydroxybenzylidene)-3-(5-fluorohexyl)-1-methyl-2-selenoxoimidazolidine-4-on (1ara)

Dioxane (0.4 mL) was added to the compound (40 mg, 0.14 mmol) obtained in step 3) and 2,4-dihydroxybenzaldehyde (20 mg, 0.14 mmol) and followed by stirring, piperidine (22 μl) and aluminum chloride (2 mg) were added, and the mixture was warmed at 90° C. for 5 h. After the reaction, the mixture was subjected to column separation to obtain the target compound (19 mg, 33%).

$^1$H-NMR (300 MHz, CD$_3$CN) δ 8.43 (d, J=8.8 Hz, 1H), 7.78 (br s, 2H), 7.17 (s, 1H), 6.41 (dd, J=8.8, 2.4 Hz, 1H), 6.36 (d, J=2.4 Hz, 1H), 4.50 (t, J=6.1 Hz, 1H), 4.34 (t, J=6.1 Hz, 1H), 3.65 (s, 2.7H), 3.37 (s, 0.3H).

MS (EI): m/z=400.0699 [M]$^+$.

Example 88

Production of 5-(3,5-dihydroxybenzylidene)-3-(5-fluorohexyl)-1-methyl-2-selenoxoimidazolidine-4-on (1are, Compound 88)

Dioxane (0.4 mL) was added to the compound (40 mg, 0.14 mmol) obtained in step 3) of Example 87 and 3,5-dihydroxybenzaldehyde (20 mg, 0.14 mmol) and followed by stirring, piperidine (22 μl) and aluminum chloride (2 mg) were added, and the mixture was warmed at 90° C. for 5 h. After the reaction, the mixture was subjected to column separation to obtain the target compound (31 mg, 53%).

$^1$H-NMR (300 MHz, CD$_3$CN) δ 8.03/7.24 (1/9) (br s, 2H), 7.16/7.15/6.99/6.98 (0.8/0.8/0.2/0.2) (s, 2H), 6.88/6.78 (1/4) (s, 1H), 6.30-6.40 (m, 1H), 4.50 (t, J=6.1 Hz, 1H), 4.34 (t, J=6.1 Hz, 1H), 3.90-4.00 (m, 2H), 3.65 (s, 1H), 3.65 (s, 2.6H), 3.38 (s, 0.4H), 1.50-1.78 (m, 4H), 1.28-1.50 (m, 4H).

MS (EI): m/z=400.0702 [M]$^+$.

Example 89

Production of 5-(2,4-dihydroxybenzylidene)-3-(5-fluoropentyl)-1-methyl-2-selenoxoimidazolidine-4-on (1asa, Compound 89)

1) Production of N-(5-fluoropentyl)formamide

After 5-formamidopentyl methanesulfonate (3,460 mg, 17 mmol) was dissolved in acetonitrile (270 mL), TBAF (1 m soln. in THF, 23 mL, 23 mmol) was added, and the mixture for reaction was stirred at 80° C. for 2 h. The reaction mixture was concentrated under reduced pressure, dried with water, ethyl acetate, and anhydrous sodium sulfate, then filtered, distilled under reduced pressure, dried in a high vacuum, and subjected to column separation to obtain the target compound (1,820 mg, 83%).

$^1$H-NMR (300 MHz, CDCl$_3$) δ 8.17 (s, 1H), 5.75 (br s, 1H), 4.53 (t, J=5.9 Hz, 1H), 4.37 (t, J=5.9 Hz, 1H), 3.17-3.40 (m, 2H), 1.33-1.86 (m, 6H).

MS (EI): m/z=148 [M+H]$^+$.

2) Production of N-(5-fluoropentyl) isoselenocyanate

After N-(5-fluoropentyl)amide (824 mg, 6.2 mmol) was dissolved in EDC (22 mL), triethylamine (3.7 mL, 26 mmol) and 4A MS (124 mg) were added. After triphosgene (992 mg, 3.3 mmol) was dissolved in EDC (11 mL), the solution was slowly added dropwise over 1 hour. The reaction mixture was refluxed for 4 h, then selenium (977 mg, 12 mmol) was added, and stirring was performed for 4 h. The reaction mixture was cooled, then washed with water, methylene chloride, and brine, dried over anhydrous sodium sulfate, filtered, concentrated under reduced pressure, and then subjected to column separation to obtain the target compound (820 mg, 68%).

$^1$H-NMR (300 MHz, CDCl$_3$) δ 4.56 (t, J=5.8 Hz, 1H), 4.40 (t, J=5.8 Hz, 1H), 3.65 (t, J=6.5 Hz, 2H), 1.50-1.90 (m, 6H).

MS (EI): m/z=195 [M+H]$^+$.

3) Production of 3-(5-fluoropentyl)-1-methyl-2-selenoxoimidazolidine-4-on

Dioxane (200 mL) and sarcosine (372 mg, 4.2 mmol) were added to the compound (810 mg, 4.17 mmol) obtained in step 2), and the mixture was warmed at 110° C. for 4 h. After the reaction, the reaction mixture was cooled to room temperature and concentrated under reduced pressure, and the resulting residue was subjected to column separation to obtain the target compound (194 mg, 17%).

$^1$H-NMR (300 MHz, CDCl$_3$) δ 4.53 (t, J=6.1 Hz, 1H), 4.37 (t, J=6.1 Hz, 1H), 3.91 (t, J=7.5 Hz, 1H), 3.87 (s, 1.7H), 3.71 (s, 0.3H), 3.42 (s, 3H), 1.60-1.87 (m, 4H), 1.37-1.54 (m, 2H).

MS (EI): m/z=266 [M+H]$^+$.

4) Production of 5-(2,4-dihydroxybenzylidene)-3-(5-fluoropentyl)-1-methyl-2-selenoxoimidazolidine-4-on (1asa)

Dioxane (0.4 mL) was added to the compound (38 mg, 0.14 mmol) obtained in step 3) and 2,4-dihydroxybenzaldehyde (20 mg, 0.14 mmol) and followed by stirring, piperidine (22 μl) and aluminum chloride (2 mg) were added, and the mixture was warmed at 90° C. for 5 h. After the reaction, the mixture was subjected to column separation to obtain the target compound (39 mg, 70%).

$^1$H-NMR (300 MHz, CD$_3$CN) δ 8.41 (d, J=8.7 Hz, 1H), 7.75 (br s, 2H), 7.17 (s, 1H), 6.41 (dd, J=8.7, 2.4 Hz, 1H), 6.36 (d, J=2.4 Hz, 1H), 4.51 (t, J=6.1 Hz, 1H), 4.36 (t, J=6.1 Hz, 1H), 3.97 (t, J=7.3 Hz, 2H), 3.65 (s, 2.7H), 3.42 (s, 0.3H), 1.59-1.81 (m, 4H), 1.33-1.48 (m, 2H).

MS (EI): m/z=386.0544 [M]$^+$.

Example 90

Production of 5-(3,5-dihydroxybenzylidene)-3-(5-fluoropentyl)-1-methyl-2-selenoxoimidazolidine-4-on (lase, Compound 90)

Dioxane (0.4 mL) was added to the compound (38 mg, 0.14 mmol) obtained in step 3) of Example 89 and 2,4-dihydroxybenzaldehyde (20 mg, 0.14 mmol) and followed by stirring, piperidine (22 μl) and aluminum chloride (2 mg) were added, and the mixture was warmed at 90° C. for 5 h. After the reaction, the mixture was subjected to column separation to obtain the target compound (29 mg, 52%).

$^1$H-NMR (300 MHz, DMSO-$d_6$) δ 9.52 (s, 1H), 9.42 (s, 1H), 7.09 (d, J=2.0 Hz, 1H), 6.97 (s, 0.5H), 6.87 (s, 0.5H), 6.22-6.38 (m, 2H), 4.51 (dt, J=6.0, 1.7 Hz, 1H), 4.35 (dt, J=6.0, 1.7 Hz, 1H), 3.85-3.97 (m, 2H), 3.67 (s, 2H), 3.38 (s, 1H), 1.52-1.81 (m, 4H), 1.27-1.46 (m, 2H).

MS (EI): m/z=386.0548 [M]$^+$.

Example 91

Production of 3-butyl-5-(2,4-dihydroxybenzylidene)-1-methyl-2-selenoxoimidazolidine-4-on (1ata, Compound 91)

1) Production of N-butylformamide

After N-butylamine (5.0 mL 51 mmol) was added to formic acid (5.7 mL, 152 mmol), the reaction was conducted under reflux at 90° C. for 48 hours and terminated. The reaction mixture was concentrated under reduced pressure, dried in a high vacuum, and subjected to column separation to obtain the target compound (787 mg, 15%).

$^1$H-NMR (300 MHz, CDCl$_3$) δ 8.15 (s, 1H), 6.06 (br s, 1H), 3.29 (q, J=6.9 Hz, 2H), 1.52 (quintet, J=7.0 Hz, 2H), 1.36 (sextet, J=7.0 Hz, 2H), 0.93 (t, J=7.2 Hz, 3H).

2) Production of N-butyl isoselenocyanate

After N-butylformamide (370 mg, 3.7 mmol) was dissolved in EDC (12 mL), triethylamine (2.2 mL, 16 mmol) and 4A MS (80 mg) were added. After triphosgene (586 mg, 2.0 mmol) was dissolved in EDC (8 mL), the solution was slowly added dropwise over 1 hour. The reaction mixture was refluxed for 4 h, then selenium (578 mg, 7.3 mmol) was added, and stirring was performed for 4 h. The reaction mixture was cooled, then washed with water, methylene chloride, and brine, dried over anhydrous sodium sulfate, filtered, concentrated under reduced pressure, and then subjected to column separation to obtain the target compound (368 mg, 62%).

$^1$H-NMR (300 MHz, CDCl$_3$) δ 3.62 (t, J=6.6 Hz, 2H), 1.73 (quintet, J=7.1 Hz, 2H), 1.47 (sextet, J=7.5 Hz, 2H), 0.96 (t, J=7.3 Hz, 3H).

3) Production of 3-butyl-1-methyl-2-selenoxoimidazolidine-4-on

Dioxane (30 mL) and sarcosine (202 mg, 2.3 mmol) were added to the compound (368 mg, 2.3 mmol) obtained in step 2), and the mixture was warmed at 110° C. for 4 h. After the reaction, the reaction mixture was cooled to room temperature and concentrated under reduced pressure, and the resulting residue was subjected to column separation to obtain the target compound (255 mg, 48%).

$^1$H-NMR (300 MHz, CDCl$_3$) δ 3.87-3.92 (m, 4H), 3.43 (s, 3H), 1.62-1.72 (m, 2H), 1.37 (sestet, J=7.5 Hz, 2H), 0.95 (t, J=7.3 Hz, 3H).

MS (EI): m/z=234 [M+H]$^+$.

4) Production of 3-butyl-5-(2,4-dihydroxybenzylidene)-1-methyl-2-selenoxoimidazolidine-4-on (1ata)

Dioxane (1.0 mL) was added to the compound (50 mg, 0.21 mmol) obtained in step 3) and 2,4-dihydroxybenzaldehyde (30 mg, 0.21 mmol) and followed by stirring, piperidine (32 μl) and aluminum chloride (2.8 mg) were added, and the mixture was warmed at 90° C. for 5 h. After the reaction, the mixture was subjected to column separation to obtain the target compound (10 mg, 13%).

$^1$H-NMR (300 MHz, CD$_3$CN) δ 8.41 (d, J=8.7 Hz, 1H), 7.18 (s, 1H), 6.27-6.45 (m, 2H), 3.95 (t, J=7.4 Hz, 2H), 3.65 (s, 3H), 1.50-1.74 (m, 2H), 1.20-1.40 (m, 2H), 0.93 (t, J=7.3 Hz, 3H).

MS (EI): m/z=354.0484 [M]$^+$.

Example 92

Production of 3-butyl-5-(3,5-dihydroxybenzylidene)-1-methyl-2-selenoxoimidazolidine-4-on (late, Compound 92)

Dioxane (0.8 mL) was added to the compound (30 mg, 0.13 mmol) obtained in step 3) of Example 91 and 2,4-dihydroxybenzaldehyde (18 mg, 0.13 mmol) and followed by stirring, piperidine (19 μl) and aluminum chloride (1.7 mg) were added, and the mixture was warmed at 90° C. for 5 h. After the reaction, the mixture was subjected to column separation to obtain the target compound (31 mg, 68%).

$^1$H-NMR (300 MHz, CD$_3$CN) δ 7.52 (br s, 2H), 7.15 (d, J=2.0 Hz, 1H), 6.88 (s, 0.4H), 6.78 (s, 0.6H), 6.30-6.40 (m, 2H), 3.89-4.00 (m, 2H), 3.65 (s, 2H), 3.38 (s, 1H), 1.57-1.74 (m, 2H), 1.22-1.42 (m, 2H), 0.85-1.00 (m, 3H).

MS (EI): m/z=354.0479 [M]$^+$.

Example 93

Production of 5-(2,4-dihydroxybenzylidene)-1-methyl-3-pentyl-2-selenoxoimidazolidine-4-on (1aua, Compound 93)

1) Production of N-pentylformamide

After N-amylamine (5.0 mL 43 mmol) was added to formic acid (4.9 mL, 129 mmol), the reaction was conducted under reflux at 90° C. for 48 hours and terminated. The reaction mixture was concentrated under reduced pressure, dried in a high vacuum, and subjected to column separation to obtain the target compound (2.98 g, 60%).

$^1$H-NMR (300 MHz, CDCl$_3$) δ 8.15 (s, 1H), 6.17 (br s, 1H), 3.28 (q, J=6.8 Hz, 2H), 1.53 (quintet, J=6.8 Hz, 2H), 1.29-1.34 (m, 6H), 0.88-0.92 (m, 3H).

MS (EI): m/z=114 [M−H]$^+$.

2) Production of N-pentyl isoselenocyanate

After N-pentylformamide (1.0 g, 3.7 mmol) was dissolved in EDC (30 mL), triethylamine (5.2 mL, 37 mmol) and 4A MS (200 mg) were added. After triphosgene (1.39 g, 4.7 mmol) was dissolved in EDC (20 mL), the solution was slowly added dropwise over 1 hour. The reaction mixture was refluxed for 4 h, then selenium (1.37 mg, 7.3 mmol) was added, and stirring was performed for 4 h. The reaction mixture was cooled, then washed with water, methylene chloride, and brine, dried over anhydrous sodium sulfate, filtered, concentrated under reduced pressure, and then subjected to column separation to obtain the target compound (1.06 g, 69%).

$^1$H-NMR (300 MHz, CDCl$_3$) δ 3.61 (t, J=6.6 Hz, 2H), 1.74 (quintet, J=6.6 Hz, 2H), 1.30-1.46 (m, 4H), 0.95 (t, J=6.6 Hz, 1H).

3) Production of 1-methyl-3-pentyl-2-selenoxoimidazolidine-4-on

Dioxane (80 mL) and sarcosine (536 mg, 6.0 mmol) were added to the compound (1.06 g, 6.0 mmol) obtained in step 2), and the mixture was warmed at 110° C. for 4 h. After the reaction, the reaction mixture was cooled to room temperature and concentrated under reduced pressure, and the resulting residue was subjected to column separation to obtain the target compound (622 mg, 42%).

$^1$H-NMR (300 MHz, CDCl$_3$) δ 3.87-3.91 (m, 4H), 3.42 (s, 3H), 1.69 (quintet, J=7.5 Hz, 2H), 1.26-1.40 (m, 4H), 0.90 (t, J=6.8 Hz, 3H).

MS (EI): m/z=248 [M]$^+$.

4) Production of 5-(2,4-dihydroxybenzylidene)-1-methyl-3-pentyl-2-selenoxoimidazolidine-4-on (1aua)

Dioxane (1.0 mL) was added to the compound (50 mg, 0.20 mmol) obtained in step 3) and 2,4-dihydroxybenzaldehyde (28 mg, 0.20 mmol) and followed by stirring, piperidine (30 μl) and aluminum chloride (2.7 mg) were added, and the mixture was warmed at 90° C. for 5 h. After the reaction, the mixture was subjected to column separation to obtain the target compound (26 mg, 35%).

$^1$H-NMR (300 MHz, CD$_3$CN) δ 8.43 (d, J=8.7 Hz, 1H), 7.18 (br s, 1H), 6.27-6.45 (m, 2H), 3.94 (t, J=7.4 Hz, 2H), 3.65 (s, 3H), 3.42 (s, 0.3H), 1.60-1.78 (m, 2H), 1.20-1.40 (m, 4H), 0.80-0.95 (m, 3H).

MS (EI): m/z=368.0641 [M]$^+$.

Example 94

Production of 5-(3,5-dihydroxybenzylidene)-1-methyl-3-pentyl-2-selenoxoimidazolidine-4-on (1 aue, Compound 94)

Dioxane (1.0 mL) was added to the compound (30 mg, 0.12 mmol) obtained in step 3) of Example 93 and 3,5-dihydroxybenzaldehyde (17 mg, 0.12 mmol) and followed by stirring, piperidine (18 μl) and aluminum chloride (1.6 mg) were added, and the mixture was warmed at 90° C. for 5 h. After the reaction, the mixture was subjected to column separation to obtain the target compound (38 mg, 84%).

$^1$H-NMR (300 MHz, CD$_3$CN) δ 7.15 (d, J=2.1 Hz, 1H), 6.88 (s, 0.3H), 6.78 (s, 0.7H), 6.28-6.39 (m, 2H), 3.89-4.00 (m, 2H), 3.65 (s, 1.9H), 3.38 (s, 1.1H), 1.62-1.75 (m, 2H), 1.20-1.48 (m, 4H), 0.84-0.94 (m, 3H).

MS (EI): m/z=368.0638 [M]$^+$.

Example 95

Production of 5-(2,4-dihydroxybenzylidene)-1-ethyl-3-phenyl-2-selenoxoimidazolidine-4-on (1baa, Compound 95)

1) Production of 1-ethyl-3-phenyl-2-selenoxoimidazolidine-4-on

Dioxane (170 mL) and N-ethylglycine (401 mg, 3.89 mmol) were added to the compound (817 mg, 3.89 mmol) obtained in step 2) of Example 1, and the mixture was warmed at 110° C. for 4 h. After the reaction, the reaction mixture was cooled to room temperature and concentrated under reduced pressure, and the resulting residue was subjected to column separation to obtain the target compound (210 mg, 87%).

$^1$H-NMR (300 MHz, CDCl$_3$) δ 7.42-7.56 (m, 3H), 7.28-7.36 (m, 2H), 4.04 (q, J=7.2 Hz, 2H), 4.02 (s, 2H), 1.36 (t, J=7.2 Hz, 3H).

MS (EI): m/z=268 [M]$^+$.

2) Production of 5-(2,4-dihydroxybenzylidene)-1-ethyl-3-phenyl-2-selenoxoimidazolidine-4-on (1baa)

Dioxane (0.6 mL) was added to the compound (52 mg, 0.2 mmol) obtained in step 1) and 2,4-dihydroxybenzaldehyde (25 mg, 0.22 mmol) and followed by stirring, piperidine (30 μl) and aluminum chloride (3 mg) were added, and the mixture was warmed at 90° C. for 5 h. After the reaction, the mixture was subjected to column separation to obtain the target compound (63 mg, 81%).

$^1$H-NMR (300 MHz, DMSO-d$_6$) δ 10.4 (s, 1H), 10.1 (s, 1H), 8.46 (d, J=8.7 Hz, 1H), 7.25-7.58 (m, 5H), 6.38 (s, 1H), 6.25 (d, J=9.0 Hz, 1H), 4.35 (q, J=6.9 Hz, 2H), 1.15-1.35 (m, 3H).

MS (ESI): m/z=389.0401 [M+H]$^+$.

Example 96

Production of 5-(2,3-dihydroxybenzylidene)-1-ethyl-3-phenyl-2-selenoxoimidazolidine-4-on (1bab, Compound 96)

Dioxane (0.6 mL) was added to the compound (52 mg, 0.2 mmol) obtained in step 1) of Example 95 and 2,3-dihydroxybenzaldehyde (25 mg, 0.22 mmol) and followed by stirring, piperidine (30 μl) and aluminum chloride (3 mg) were added, and the mixture was warmed at 90° C. for 5 h. After the reaction, the mixture was subjected to column separation to obtain the target compound (25 mg, 32%).

$^1$H-NMR (300 MHz, DMSO-d$_6$) δ 9.40 (br s, 2H), 7.69-7.78 (m, 1H), 7.43-7.57 (m, 5H), 7.35-7.42 (m, 2H), 7.30-7.35 (m, 1H), 4.30-4.43 (m, 1.5H), 4.15-4.28 (m, 0.5H), 1.31 (t, J=6.9 Hz, 2H), 0.87 (t, 6.9 Hz, 1H).

MS (ESI): m/z=411.0222 [M+Na]$^+$.

Example 97

Production of 5-(4-(dimethylamino)benzylidene)-1-ethyl-3-phenyl-2-selenoxoimidazolidine-4-on (1bac, Compound 97)

Dioxane (0.6 mL) was added to the compound (52 mg, 0.2 mmol) obtained in step 1) of Example 95 and 4-dimethylaminobenzaldehyde (25 mg, 0.22 mmol) and followed by stirring, piperidine (30 µl) and aluminum chloride (3 mg) were added, and the mixture was warmed at 90° C. for 5 h. After the reaction, the mixture was subjected to column separation to obtain the target compound (16 mg, 22%).

$^1$H-NMR (300 MHz, DMSO-d$_6$) δ 8.26 (d, J=1.7 Hz, 2H), 7.42-7.42 (m, 1H), 7.19 (s, 0.7H), 7.06 (s, 0.3H), 6.79 (d, J=8.6 Hz, 0.8H), 6.74 (d, J=9.2 Hz, 1.2H), 4.34-4.50 (m, 2H), 3.10 (s, 4H), 3.01 (s, 2H), 1.18-1.35 (m, 3H).

MS (ESI): m/z=400.0929 [M+H]$^+$.

Example 98

Production of 5-(3,4-dihydroxybenzylidene)-1-ethyl-3-phenyl-2-selenoxoimidazolidine-4-on (1bad, Compound 98)

Dioxane (0.6 mL) was added to the compound (52 mg, 0.2 mmol) obtained in step 1) of Example 95 and 3,4-dihydroxybenzaldehyde (25 mg, 0.22 mmol) and followed by stirring, piperidine (30 µl) and aluminum chloride (3 mg) were added, and the mixture was warmed at 90° C. for 5 h. After the reaction, the mixture was subjected to column separation to obtain the target compound (31 mg, 40%).

$^1$H-NMR (300 MHz, DMSO-d$_6$) δ 9.69 (s, 1H), 7.98 (d, J=1.7 Hz, 1H), 7.42-7.58 (m, 4H), 7.33-7.41 (m, 2H), 7.20-7.29 (m, 1H), 7.13 (s, 1H), 6.89 (d, J=8.0 Hz, 0.25H), 6.76 (d, J=8.3 Hz, 0.75H), 4.29-4.60 (m, 2H), 1.16-1.38 (m, 3H).

MS (ESI): m/z=389.0404 [M+H]$^+$.

Example 99

Production of 5-(3,5-dihydroxybenzylidene)-1-ethyl-3-phenyl-2-selenoxoimidazolidine-4-on (1bae, Compound 99)

Dioxane (0.6 mL) was added to the compound (52 mg, 0.2 mmol) obtained in step 1) of Example 95 and 3,4-dihydroxybenzaldehyde (25 mg, 0.22 mmol) and followed by stirring, piperidine (30 µl) and aluminum chloride (3 mg) were added, and the mixture was warmed at 90° C. for 5 h. After the reaction, the mixture was subjected to column separation to obtain the target compound (38 mg, 49%).

$^1$H-NMR (300 MHz, DMSO-d$_6$) δ 9.60 (s, 0.5H), 9.40 (s, 1.5H), 7.32-7.80 (m, 5H), 7.09 (s, 2H), 6.31 (s, 2H), 4.30-4.55 (m, 1.5H), 4.14-4.29 (m, 0.5H), 1.22-1.40 (m, 3H).

MS (ESI): m/z=389.0403 [M+H]$^+$.

Example 100

Production of 5-(3,5-dihydroxybenzylidene)-1-ethyl-3-(4-ethylphenyl)-2-selenoxoimidazolidine-4-on (1bce, Compound 100)

1) Production of 3-(4-ethylphenyl)-1-ethyl-2-selenoxoimidazolidine-4-on

Dioxane (240 mL) and N-ethylglycine (400 mg, 3.88 mmol) were added to the compound (815 mg, 3.88 mmol) obtained in step 2) of Example 24, and the mixture was warmed at 110° C. for 4 h. After the reaction, the reaction mixture was cooled to room temperature and concentrated under reduced pressure, and the resulting residue was subjected to column separation to obtain the target compound (520 mg, 478%).

$^1$H-NMR (300 MHz, CDCl$_3$) δ 7.33 (d, J=8.0 Hz, 2H), 7.22 (d, J=7.7 Hz, 2H), 4.05 (q, J=7.1 Hz, 2H), 4.03 (s, 2H), 2.71 (q, J=7.6 Hz, 2H), 1.31 (t, J=7.2 Hz, 3H), 1.27 (t, J=7.2 Hz, 3H).

MS (EI): m/z=296 [M+H]$^+$.

2) Production of 5-(3,5-dihydroxybenzylidene)-1-ethyl-3-(4-ethylphenyl)-2-selenoxoimidazolidine-4-on (1bce)

Dioxane (0.6 mL) was added to the compound (59 mg, 0.2 mmol) obtained in step 1) and 2,4-dihydroxybenzaldehyde (29 mg, 0.22 mmol) and followed by stirring, piperidine (30 µl) and aluminum chloride (3 mg) were added, and the mixture was warmed at 90° C. for 5 h. After the reaction, the mixture was subjected to column separation to obtain the target compound (40 mg, 50%).

$^1$H-NMR (300 MHz, CDCl$_3$) δ 7.13-7.41 (m, 6H), 6.98 (s, 0.3H), 6.88 (s, 0.7H), 6.31-6.44 (m, 1H), 4.38 (q, J=7.1 Hz, 1.3H), 4.26 (q, J=7.1 Hz, 0.7H), 2.62-2.80 (m, 2H), 1.13-1.44 (m, 6H).

MS (ESI): m/z=416.0642 [M]$^+$.

Example 101

Production of 5-(4-bromobenzylidene)-1-ethyl-3-(4-ethylphenyl)-2-selenoxoimidazolidine-4-on (1bci, Compound 101)

Dioxane (0.6 mL) was added to the compound (61 mg, 0.2 mmol) obtained in step 1) of Example 100 and 4-bromobenzaldehyde (41 mg, 0.22 mmol) and followed by stirring, piperidine (30 µl) and aluminum chloride (3 mg) were added, and the mixture was warmed at 90° C. for 5 h. After the reaction, the mixture was subjected to column separation to obtain the target compound (20 mg, 22%).

$^1$H-NMR (300 MHz, CDCl$_3$) δ 8.25 (d, J=8.9 Hz, 1H), 7.42-7.59 (m, 4H), 7.29-7.41 (m, 2H), 7.15 (s, 0.6H), 7.01 (s, 0.4H), 6.50-6.67 (m, 2H), 3.78 (s, 1.8H), 3.60 (s, 1.2H), 3.34 (br s, 4H), 1.90-2.05 (m, 4H).

MS (ESI): m/z=487.9739 [M+Na]$^+$.

Example 102

Production of 1-ethyl-3-(4-ethylphenyl)-5-(4-pyrrolidine-1-yl)benzylidene-2-selenoxoimidazolidine-4-on (1bck, Compound 102)

Dioxane (0.6 mL) was added to the compound (59 mg, 0.2 mmol) obtained in step 1) of Example 100 and 4-(pyrrolidine-1-yl)benzaldehyde (39 mg, 0.22 mmol) and followed by stirring, piperidine (30 µl) and aluminum chloride (3 mg) were added, and the mixture was warmed at 90° C. for 5 h. After the reaction, the mixture was subjected to column separation to obtain the target compound (25 mg, 28%).

$^1$H-NMR (300 MHz, CDCl$_3$) δ 8.21 (d, J=8.8 Hz, 1H), 7.46-7.77 (m, 0.4H), 7.19-7.45 (m, 5H), 7.17 (s, 0.4H), 6.77 (s, 0.6H), 6.57 (d, J=8.8 Hz, 0.6H), 6.52 (d, J=8.6 Hz, 1H), 4.45 (pentet, J=7.2 Hz, 1.6H), 4.20-4.39 (m, 0.4H), 3.25-3.55 (m, 4H), 2.71 (q, J=7.5 Hz, 2H), 1.93-2.20 (m, 4H), 1.42 (t, J=7.2 Hz, 2H), 1.27 (t, J=7.6 Hz, 3H), 1.08 (t, J=7.0 Hz, 1H).

MS (EI): m/z=453.1317 [M]$^+$.

Example 103

Production of 1-benzyl-5-(2,4-dihydroxybenzylidene)-3-phenyl-2-selenoxoimidazolidine-4-on (1caa, Compound 103)

1) Production of 1-benzyl-3-phenyl-2-selenoxoimidazolidine-4-on

Dioxane (170 mL) and N-benzylglycine (643 mg, 3.89 mmol) were added to the compound (817 mg, 3.89 mmol) obtained in step 2) of Example 1, and the mixture was warmed at 110° C. for 4 h. After the reaction, the reaction mixture was cooled to room temperature and concentrated under reduced pressure, and the resulting residue was subjected to column separation to obtain the target compound (1.23 g, 96%).
$^1$H-NMR (300 MHz, CDCl$_3$) δ 7.28-7.56 (m, 10H), 5.20 (s, 2H), 3.89 (s, 2H).
MS (EI): m/z=330 [M+H]+.

2) Production of 1-benzyl-5-(2,4-dihydroxybenzylidene)-3-phenyl-2-selenoxoimidazolidine-4-on (1caa)

Dioxane (0.6 mL) was added to the compound (66 mg, 0.2 mmol) obtained in step 1) and 2,4-dihydroxybenzaldehyde (25 mg, 0.22 mmol) and followed by stirring, piperidine (30 μl) and aluminum chloride (3 mg) were added, and the mixture was warmed at 90° C. for 5 h. After the reaction, the mixture was subjected to column separation to obtain the target compound (46 mg, 51%).
$^1$H-NMR (300 MHz, DMSO-d$_6$) δ 10.3 (s, 1H), 10.1 (s, 1H), 8.51 (d, J=8.8 Hz, 1H), 7.28-7.59 (m, 10H), 7.27 (s, 1H), 6.26 (s, 1H), 6.20 (d, J=8.7 Hz, 1H), 5.64 (s, 2H).
MS (ESI): m/z=451.0560 [M+H]$^+$.

Example 104

Production of 1-benzyl-5-(2,3-dihydroxybenzylidene)-3-phenyl-2-selenoxoimidazolidine-4-on (1cab, Compound 104)

Dioxane (0.6 mL) was added to the compound (66 mg, 0.2 mmol) obtained in step 1) of Example 103 and 2,4-dihydroxybenzaldehyde (25 mg, 0.22 mmol) and followed by stirring, piperidine (30 μl) and aluminum chloride (3 mg) were added, and the mixture was warmed at 90° C. for 5 h. After the reaction, the mixture was subjected to column separation to obtain the target compound (41 mg, 46%).
$^1$H-NMR (300 MHz, DMSO-d$_6$) δ 9.10 (br s, 2H), 7.77 (d, J=6.8 Hz, 1H), 7.32-7.58 (m, 9H), 7.15 (s, 1H), 6.68 (d, J=7.8 Hz, 1H), 668 (d, J=1.4 Hz, 1H), 6.52-6.67 (m, 1H), 5.64 (s, 2H).
MS (ESI): m/z=451.0559 [M+H]$^+$.

Example 105

Production of 1-benzyl-5-(4-(dimethylamino)benzylidene)-3-phenyl-2-selenoxoimidazolidine-4-on (1cac, Compound 105)

Dioxane (0.6 mL) was added to the compound (66 mg, 0.2 mmol) obtained in step 1) of Example 103 and 4-(dimethylamino)benzaldehyde (33 mg, 0.22 mmol) and followed by stirring, piperidine (30 μl) and aluminum chloride (3 mg) were added, and the mixture was warmed at 90° C. for 5 h. After the reaction, the mixture was subjected to column separation to obtain the target compound (59 mg, 64%).
$^1$H-NMR (300 MHz, DMSO-d$_6$) δ 8.03 (d, J=8.9 Hz, 2H), 7.29-7.47 (m, 9H), 6.69 (s, 1H), 6.56 (d, J=8.8 Hz, 2H), 5.66 (s, 2H), 2.48 (s, 6H).
MS (ESI): m/z=462.1081 [M+H]$^+$.

Example 106

Production of 1-benzyl-5-(3,4-dihydroxybenzylidene)-3-phenyl-2-selenoxoimidazolidine-4-on (1cad, Compound 106)

Dioxane (0.6 mL) was added to the compound (66 mg, 0.2 mmol) obtained in step 1) of Example 103 and 3,4-dihydroxybenzaldehyde (25 mg, 0.22 mmol) and followed by stirring, piperidine (30 μl) and aluminum chloride (3 mg) were added, and the mixture was warmed at 90° C. for 5 h. After the reaction, the mixture was subjected to column separation to obtain the target compound (48 mg, 53%).
$^1$H-NMR (300 MHz, DMSO-d$_6$) δ 9.79 (br s, 1H), 9.22 (br s, 1H), 7.81 (d, J=1.9 Hz, 1H), 7.10-7.62 (m, 11H), 6.91 (s, 1H), 6.70 (d, J=8.4 Hz, 1H), 5.65 (s, 2H).
MS (ESI): m/z=451.0558 [M+H]$^+$.

Example 107

Production of 1-benzyl-5-(3,5-dihydroxybenzylidene)-3-phenyl-2-selenoxoimidazolidine-4-on (1cae, Compound 107)

Dioxane (0.6 mL) was added to the compound (66 mg, 0.2 mmol) obtained in step 1) of Example 103 and 3,5-dihydroxybenzaldehyde (25 mg, 0.22 mmol) and followed by stirring, piperidine (30 μl) and aluminum chloride (3 mg) were added, and the mixture was warmed at 90° C. for 5 h. After the reaction, the mixture was subjected to column separation to obtain the target compound (72 mg, 80%).
$^1$H-NMR (300 MHz, DMSO-d$_6$) δ 9.45, 9.42, 9.38, 9.25 (each s, 2H), 7.22-7.60 (m, 6H), 6.64-6.90 (m, 3H), 6.12-6.35 (m, 1H), 6.08 (s, 2H), 5.68 (s, 0.4H), 5.54 (s, 1H), 5.00, 4.86 (each s, 0.6H).
MS (ESI): m/z=473.0378 [M+Na]$^+$.

Example 108

Production of 1-benzyl-5-(2,4-dihydroxybenzylidene)-3-(4-ethylphenyl)-2-selenoxoimidazolidine-4-on (1cca, Compound 108)

1) Production of 3-(4-ethylphenyl)-1-benzyl-2-selenoxoimidazolidine-4-on

Dioxane (15 mL) and N-benzylglycine (864 mg, 5.23 mmol) were added to the compound (1.10 g, 5.23 mmol) obtained in step 2) of Example 24, and the mixture was warmed at 110° C. for 4 h. After the reaction, the reaction mixture was cooled to room temperature and concentrated under reduced pressure, and the resulting residue was subjected to column separation to obtain the target compound (1.72 g, 92%).
$^1$H-NMR (300 MHz, CDCl$_3$) δ 7.38-7.49 (m, 5H), 7.34 (d, J=8.5 Hz, 2H), 7.25 (d, J=8.1 Hz, 2H), 5.22 (s, 2H), 3.87 (s, 2H), 2.72 (q, J=7.6 Hz, 2H), 1.28 (t, J=7.6 Hz, 3H).
MS (EI): m/z=329 [M]$^+$.

2) Production of 1-benzyl-5-(2,4-dihydroxybenzylidene)-3-(4-ethylphenyl)-2-selenoxoimidazolidine-4-on (1cca)

Dioxane (0.9 mL) was added to the compound (100 mg, 0.28 mmol) obtained in step 1) and 2,4-dihydroxybenzaldehyde (43 mg, 0.31 mmol) and followed by stirring, piperidine (41 μl) and aluminum chloride (4 mg) were added, and the mixture was warmed at 90° C. for 5 h. After the reaction, the mixture was subjected to column separation to obtain the target compound (31 mg, 23%).

$^1$H-NMR (300 MHz, DMSO-d$_6$) δ 10.2 (br s, 1H), 10.1 (br s, 1H), 8.50 (d, J=8.9 Hz, 1H), 7.28-7.50 (m, 9H), 7.25 (s, 1H), 6.23-6.28 (m, 1H), 6.13-6.22 (m, 1H), 5.63 (s, 2H), 2.56-2.76 (m, 2H), 1.10-1.30 (m, 3H).

MS (EI): m/z=478.0793 [M]$^+$.

Example 109

Production of 1-benzyl-5-(3,4-dihydroxybenzylidene)-3-(4-ethylphenyl)-2-selenoxoimidazolidine-4-on (1ccd, Compound 109)

Dioxane (0.9 mL) was added to the compound (100 mg, 0.28 mmol) obtained in step 1) of Example 108 and 3,4-dihydroxybenzaldehyde (43 mg, 0.31 mmol) and followed by stirring, piperidine (41 μl) and aluminum chloride (4 mg) were added, and the mixture was warmed at 90° C. for 5 h. After the reaction, the mixture was subjected to column separation to obtain the target compound (73 mg, 55%).

$^1$H-NMR (300 MHz, DMSO-d$_6$) δ 9.70 (br s, 1H), 9.20 (br s, 1H), 7.80 (d, J=2.1 Hz, 1H), 7.10-7.49 (m, 10H), 6.90 (s, 1H), 6.70 (d, J=8.3 Hz, 1H), 5.68 (s, 2H), 267 (q, J=7.6 Hz, 2H), 1.22 (t, J=7.6 Hz, 3H).

MS (EI): m/z=478.0798 [M]$^+$.

Example 110

Production of 1-benzyl-5-(3,5-dihydroxybenzylidene)-3-(4-ethylphenyl)-2-selenoxoimidazolidine-4-on (1cce, Compound 110)

Dioxane (0.9 mL) was added to the compound (100 mg, 0.28 mmol) obtained in step 1) of Example 108 and 3,5-dihydroxybenzaldehyde (43 mg, 0.22 mmol) and followed by stirring, piperidine (41 μl) and aluminum chloride (4 mg) were added, and the mixture was warmed at 90° C. for 5 h. After the reaction, the mixture was subjected to column separation to obtain the target compound (67 mg, 50%).

$^1$H-NMR (300 MHz, DMSO-d$_6$) δ 9.45 (s, 1H), 9.26 (s, 1H), 7.23-7.53 (m, 7H), 7.10-7.20 (m, 1H), 6.65-6.96 (m, 2H), 6.03-6.35 (m, 2H), 5.67 (s, 0.5H), 5.54 (s, 0.5H), 4.99 (s, 0.5H), 4.86 (s, 0.5H), 2.57-2.66 (m, 2H), 1.06-1.30 (m, 3H).

MS (EI+): m/z=478.0797 [M]$^+$.

Example 111

Production of 1-benzyl-3-(4-chlorophenyl)-5-(2,3-dihydroxybenzylidene)-2-selenoxoimidazolidine-4-on (1cdb, Compound 111)

1) Production of 3-(4-chlorophenyl)-1-benzyl-2-selenoxoimidazolidine-4-on

Dioxane (11 mL) and N-benzylglycine (610 mg, 3.69 mmol) were added to the compound (800 mg, 3.69 mmol) obtained in step 2) of Example 35, and the mixture was warmed at 110° C. for 4 h. After the reaction, the reaction mixture was cooled to room temperature and concentrated under reduced pressure, and the resulting residue was subjected to column separation to obtain the target compound (1.27 g, 95%).

$^1$H-NMR (300 MHz, CDCl$_3$) δ 7.28-7.55 (m, 9H), 5.21 (s, 2H), 3.88 (s, 2H).

MS (EI): m/z=364 [M+H]$^+$.

2) Production of 1-benzyl-3-(4-chlorophenyl)-5-(2,3-dihydroxybenzylidene)-2-selenoxoimidazolidine-4-on (1cdb)

Dioxane (0.9 mL) was added to the compound (98 mg, 0.27 mmol) obtained in step 1) and 2,3-dihydroxybenzaldehyde (41 mg, 0.30 mmol) and followed by stirring, piperidine (41 μl) and aluminum chloride (4 mg) were added, and the mixture was warmed at 90° C. for 5 h. After the reaction, the mixture was subjected to column separation to obtain the target compound (49 mg, 38%).

$^1$H-NMR (300 MHz, DMSO-d$_6$) δ 9.56 (br s, 1H), 9.16 (br s, 1H), 7.48-7.65 (m, 5H), 7.25-7.47 (m, 4H), 7.24 (s, 1H), 6.80 (dd, J=7.8, 1.4 Hz, 1H), 6.55 (t, J=7.8 Hz, 1H), 5.63 (s, 2H).

MS (EI+): m/z=484.0097 [M]$^+$.

Example 112

Production of 1-benzyl-3-(4-chlorophenyl)-5-(3,4-dihydroxybenzylidene)-2-selenoxoimidazolidine-4-on (1cdd, Compound 112)

Dioxane (0.9 mL) was added to the compound (98 mg, 0.27 mmol) obtained in step 1) of Example 11 and 3,4-dihydroxybenzaldehyde (41 mg, 0.30 mmol) and followed by stirring, piperidine (41 μl) and aluminum chloride (4 mg) were added, and the mixture was warmed at 90° C. for 5 h. After the reaction, the mixture was subjected to column separation to obtain the target compound (88 mg, 67%).

$^1$H-NMR (300 MHz, DMSO-d$_6$) δ 9.50 (br s, 2H), 7.81 (s, 1H), 7.20-7.65 (m, 8H), 6.91 (s, 1H), 6.72 (d, J=8.3 Hz, 1H), 5.68 (s, 2H).

MS (EI+): m/z=484.0096 [M]$^+$.

Example 113

Production of 1-methyl-3-phenyl-5-(4-(pyrrolidine-1-yl)benzylidene)-2-selenoxoimidazolidine-4-on hydrochloride (1aak HCl, Compound 113)

After 1-methyl-3-phenyl-5-(4-(pyrrolidine-1-yl)benzylidene)-2-selenoxoimidazolidine-4-on (1aak, 10 mg) was dissolved in dichloromethane (0.3 mL), 2 M HCl/ether (0.3 mL) was added dropwise in an ice bath at 0° C. After stirring at room temperature for 3 hours, drying under reduced pressure was performed to obtain the target compound (8.4 mg, ~78%).

$^1$H-NMR (300 MHz, CDCl$_3$) δ 8.23 (br s, 2H), 7.27-7.70 (m, 5H), 6.80 (br s, 1H), 6.54 (br s, 2H), 3.90 (br s, 3H), 3.39 (br s, 4H), 2.04 (br s, 4H).

MS (ESI): m/z=412 [M+H]$^+$.

Example 114

Production of 1-methyl-5-(4-pyrrolidine-1-yl)benzylidene-2-selenoxo-3-(4-tolyl)imidazolidine-4-on hydrochloride (1abk HCl, Compound 114)

After 1-methyl-5-(4-pyrrolidine-1-yl)benzylidene-2-selenoxo-3-(4-tolyl)imidazolidine-4-on (1abk, 10 mg) was dissolved in dichloromethane (0.3 mL), 2 M HCl/ether (0.3 mL) was added dropwise in an ice bath at 0° C. After stirring at room temperature for 3 hours, drying under reduced pressure was performed to obtain the target compound (10.5 mg, ~97%).

$^1$H-NMR (300 MHz, CDCl$_3$) δ 8.35 (br s, 1H), 7.05-7.50 (m, 5H), 3.66 (s, 3H), 3.10-3.30 (m, 4H), 2.40 (s, 3H), 2.00-2.20 (m, 4H).

MS (ESI): m/z=426 [M+H]$^+$.

Example 115

Production of 1-methyl-5-(4-(4-methylpiperazine-1-yl)benzylidene)-2-selenoxo-3-(4-tolyl)imidazoline-4-on hydrochloride (1abt HCl, Compound 115)

After 1-methyl-5-(4-(4-methylpiperazine-1-yl)benzylidene)-2-selenoxo-3-(4-tolyl)-imidazolidine-4-on (1abt, 21 mg) was dissolved in dioxane (0.3 mL), 4 M HCl/dioxane (70 uL) was added dropwise in an ice bath at 0° C. After stirring at room temperature for 3 hours, drying under reduced pressure was performed to obtain the target compound (20 mg, 87%).

$^1$H-NMR (300 MHz, DMSO-d$_6$) δ 10.6 (s, 1H), 8.23 (d, J=8.6 Hz, 2H), 7.30 (d, J=8.1 Hz, 2H), 7.23 (d, J=7.9 Hz, 2H), 7.19 (s, 1H), 7.05 (d, J=8.9 Hz, 2H), 3.77 (s, 3H), 2.81 (s, 3H), 2.38 (s, 3H).

MS (EI): m/z=454.1269 [M−HCl]$^+$

Example 116

Production of 1-methyl-5-(4-((2-morpholinoethyl)amino)benzylidene)-2-selenoxo-3-(4-tolyl)imidazoridine-4-on hydrochloride (1abw HCl, Compound 116)

After 1-methyl-5-(4-((2-morpholinoethyl)amino))benzylidene)-2-selenoxo-3-(4-tolyl)-imidazolidine-4-on (1abw, 17 mg) was dissolved in dichloromethane (0.3 mL), 4 M HCl/dioxane (90 uL) was added dropwise in an ice bath at 0° C. After stirring at room temperature for 3 hours, drying under reduced pressure was performed to obtain the target compound (18 mg, ~96%).

$^1$H-NMR (300 MHz, DMSO-d$_6$) δ 11.34 (br s, 1H), 8.19 (d, J=8.7 Hz, 2H), 7.30 (d, J=8.2 Hz, 2H), 7.22 (d, J=8.1 Hz, 2H), 7.15 (s, 1H), 6.71 (d, J=8.8 Hz, 2H), 3.84-4.14 (m, 8H), 3.77 (s, 3H), 3.46-3.65 (m, 4H), 2.38 (s, 3H).

MS (EI): m/z=484.1380 [M−HCl]$^+$

Example 117

Production of 3-(4-ethylphenyl)-1-methyl-5-(4-(piperidine-1-yl)benzylidene)-2-selenoxoimidazolidine-4-on hydrochloride (1ach HCl, Compound 117)

After 3-(4-ethylphenyl)-1-methyl-5-(4-(piperidine-1-yl)benzylidene)-2-selenoxoimidazolidine-4-on (1ach, 10 mg) was dissolved in dichloromethane (0.3 mL), 2 M HCl/ether (0.3 mL) was added dropwise in an ice bath at 0° C. After stirring at room temperature for 3 hours, drying under reduced pressure was performed to obtain the target compound (10.3 mg, ~100%).

$^1$H-NMR (300 MHz, CDCl$_3$) δ 8.10 (br s, 1H), 6.90-8.00 (m, 9H), 3.20-4.50 (br s, 5H), 2.69 (br s, 2H), 1.40-1.70 (m, 6H), 1.23 (br s, 3H).

MS (ESI): m/z=454 [M+H−HCl]$^+$.

Example 118

Production of 3-hexyl-1-methyl-5-(4-((2-morpholinoethyl)amino)benzylidene)-2-selenoxoimidazolidine-4-on hydrochloride (1ajw HCl, Compound 118)

After 3-hexyl-1-methyl-5-(4-((2-morpholinoethyl)amino)benzylidene)-2-selenoxoimidazolidine-4-on (1ajw, 20 mg) was dissolved in dichloromethane (0.3 mL), 2 M HCl/ether (0.3 mL) was added dropwise in an ice bath at 0° C. After stirring at room temperature for 3 hours, drying under reduced pressure was performed to obtain the target compound (24 mg, ~100%).

$^1$H-NMR (300 MHz, CDCl$_3$) δ 9.37 (br s, 1H), 8.10 (br s, 2H), 6.84 (br s, 2H), 6.65 (s, 1H), 3.95-4.10 (m, 4H), 3.71 (s, 2H), 3.55-3.70 (m, 2H), 3.35-3.53 (.m, 4H), 2.85-3.30 (m, 4H), 1.85-1.98 (m, 2H), 1.60-1.82 (m, 2H), 1.26-1.44 (m, 4H), 0.84-0.99 (m, 3H).

MS (EI): m/z=478.1849 [M−HCl]$^+$.

Example 119

Production of 1-methyl-3-phenethyl-5-(4-(pyrrolidine-1-yl)benzylidene)-2-selenoxoimidazolidine-4-on hydrochloride (1ahk HCl, Compound 119)

After 1-methyl-3-phenethyl-5-(4-(pyrrolidine-1-yl)benzylidene)-2-selenoxoimidazolidine-4-on (1ahk, 10 mg) was dissolved in dichloromethane (0.5 mL), 2 M HCl/ether (0.3 mL) was added dropwise in an ice bath at 0° C. After stirring at room temperature for 3 hours, drying under reduced pressure was performed to obtain the target compound (10.1 mg, ~100%).

$^1$H-NMR (300 MHz, CDCl$_3$) δ 6.70-8.30 (m, 11H), 3.75-4.80 (br s, 4H), 3.69 (s, 3H), 2.60-3.65 (m, 4H), 1.23 (br s, 4H), 0.82 (br s, 2H).

MS (ESI): m/z=462 [M+Na-HCl]$^+$.

Example 120

Production of 3-cyclopentyl-5-(4-(dimethylamino)benzylidene)-1-methyl-2-selenoxoimidazolidine-4-on hydrochloride (1akc HCl, Compound 120)

After 3-cyclopentyl-5-(4-(dimethylamino)benzylidene)-1-methyl-2-selenoxoimidazolidine-4-on (1akc, 10 mg) was dissolved in dichloromethane (0.5 mL), 2 M HCl/ether (0.3 mL) was added dropwise in an ice bath at 0° C. After stirring at room temperature for 3 hours, drying under reduced pressure was performed to obtain the target compound (11 mg, ~97%).

$^1$H-NMR (300 MHz, CDCl$_3$) δ 7.30-8.90 (br s, 5H), 6.91 (br s, 2H), 5.23 (br s, 1H), 2.52-4.10 (m, 9H), 1.80-2.50 (m, 4H), 1.64 (br s, 2H), 1.25 (br s, 2H).

MS (ESI): m/z=378 [M+H−HCl]$^+$.

Example 121

Production of 5-(2,4-dihydroxybenzylidene)-1-methyl-3-(3-morpholinopropyl)-2-selenoxoimidazolidine-4-on hydrochloride (1aqa HCl, Compound 121)

After 5-(2,4-dihydroxybenzylidene)-1-methyl-3-(3-morpholinopropyl)-2-selenoxoimidazolidine-4-on (1aqa, 10 mg) was dissolved in dichloromethane (0.5 mL), 4 M HCl/dioxane (59 uL) was added dropwise in an ice bath at 0° C. After stirring at room temperature for 3 hours, drying under reduced pressure was performed to obtain the target compound (2.9 mg, 26%).

$^1$H-NMR (300 MHz, DMSO-$d_6$) δ 10.5 (s, 1H), 10.2 (br s, 2H), 8.57 (d, J=8.9 Hz, 0.8H), 8.22 (d, J=8.6 Hz, 0.2H), 7.28 (s, 0.8H), 6.60 (s, 0.2H), 6.42 (d, J=2.3 Hz, 6.37 (d, J=2.3 Hz, 0.2H), 6.29 (dd, J=8.9, 2.3 Hz, 0.8H), 6.20-6.26 (m, 0.2H), 3.89-4.06 (m, 4H), 3.67 (s, 2.4H), 3.56 (s, 0.6H), 2.93-3.21 (m, 8H), 1.93-2.20 (m, 2H).

MS (EI): m/z=425.0855 [M−HCl]$^+$.

Example 122

Production of 5-(4-fluorobenzylidene)-1-methyl-3-(3-morpholinopropyl)-2-selenoxoimidazolidine-4-on hydrochloride (1aqx HCl, Compound 122)

After 5-(4-fluorobenzylidene)-1-methyl-3-(3-morpholinopropyl)-2-selenoxoimidazolidine-4-on (1aqx, 14.5 mg) was dissolved in dichloromethane (0.5 mL), 4 M HCl/dioxane (100 uL) was added dropwise in an ice bath at 0° C. After stirring at room temperature for 3 hours, drying under reduced pressure was performed to obtain the target compound (17 mg, 100%).

$^1$H-NMR (300 MHz, DMSO-$d_6$) δ 10.7 (br s, 1H), 8.17-8.29 (m, 1.5H), 7.98-8.09 (m, 0.5H), 7.55-7.64 (m, 0.5H), 7.38-7.48 (m, 1.5H), 7.05 (s, 0.7H), 6.57 (s, 0.3H), 3.87-4.05 (m, 2H), 3.71-3.82 (m, 2H), 3.70 (s, 2H), 3.57 (s, 1H), 2.90-3.20 (m, 6H), 1.40-1.76 (m, 4H).

MS (EI): m/z=411.0859 [M−HCl]$^+$.

Experimental Example 1

Evaluation of Activity to Inhibit Generation of Reactive Oxygen Species and Spore Germination Through NOX Enzyme Inhibition When NADPH oxidase (NOX), which is involved in the generation of reactive oxygen species in red mold, is inhibited, normal mycelial growth is inhibited, abnormal form of monocyclic conidia is formed, and germination is inhibited. The abnormal phenotype caused by the reduction of reactive oxygen species in red mold can be easily observed under an optical microscope. Through this, the ability to inhibit generation of reactive oxygen species through NOX inhibition was evaluated.

Specifically, for the evaluation of compound activity, 0.1 mM of the compound was added to a minimum medium (MM20) spore suspension diluted to 1/5. Spores (105/ml) of wild-type red mold strain GZ3639 were inoculated into the medium and cultured at 25° C. for 24 h, followed by microscopic observation. Compounds having a germination inhibition rate and microcycle conidiation to be 50% or more of those in normal germination were selected, and their activities were evaluated at concentrations of 50 μM, 25 μM, and 10 μM. At this time, the activity of substances having a germination inhibition rate of 95% at 10 μM was further evaluated at concentrations of 5 μM, 1 μM, 0.5 μM, and 0.1 μM. Based on the result of this evaluation, the compound concentration (inhibitory concentration 50%, IC$_{50}$) at which the spore germination inhibition rate was 50% was determined.

The IC$_{50}$ evaluation results of the compounds of the present disclosure are shown in Table 2 below. However, Examples in Table 2 below show some compounds which are selected and tested among the compounds of the present disclosure, and the present invention is not limited to the compounds listed in Table 2 below, and compounds not listed in Table 2 also exhibit the activity to inhibit generation of reactive oxygen species and spore germination through NOX enzyme inhibition.

TABLE 2

| Compound number | Compound | IC50 (μM) |
| --- | --- | --- |
| 1 | 1aaa | 20 |
| 3 | 1aac | 26 |
| 7 | 1aak | 16 |
| 8 | 1aam | 41 |
| 9 | 1aan | 37 |
| 11 | 1abb | 46 |
| 15 | 1abh | 11 |
| 16 | 1abi | 46 |
| 17 | 1abk | 11 |
| 18 | 1abl | 13 |
| 19 | 1abn | 41 |
| 22 | 1abv | 2.3 |
| 23 | 1abw | 5.2 |
| 24 | 1aca | 14 |
| 27 | 1ace | 9.0 |
| 28 | 1ach | 11 |
| 29 | 1aci | 11 |
| 31 | 1acn | 30 |
| 35 | 1ada | 31 |
| 36 | 1adb | 46 |
| 37 | 1add | 20 |
| 38 | 1ade | 56 |
| 39 | 1adn | 27 |
| 40 | 1aeb | 42 |
| 41 | 1aha | 9.8 |
| 43 | 1ahc | 23 |
| 44 | 1ahe | 1.0 |
| 52 | 1ahs | 3.5 |
| 55 | 1aia | 1.0 |
| 56 | 1aib | 18 |
| 57 | 1aic | 46 |
| 58 | 1aie | 18 |
| 59 | 1aja | 0.68 |
| 60 | 1ajb | 6.0 |
| 61 | 1ajc | 33 |
| 62 | 1aje | 5.0 |
| 63 | 1ajs | 0.50 |
| 67 | 1aju | 0.45 |
| 68 | 1aka | 3.0 |
| 69 | 1akb | 14 |
| 70 | 1akc | 26 |
| 71 | 1akd | 26 |
| 75 | 1alc | 23 |
| 85 | 1aqi | 5.0 |
| 88 | 1are | 18 |
| 89 | 1asa | 13 |
| 93 | 1aua | 2.9 |
| 95 | 1baa | 22 |
| 96 | 1bad | 44 |
| 101 | 1bci | 45 |
| 102 | 1bck | 40 |
| 104 | 1cab | 23 |
| 106 | 1cad | 34 |
| 107 | 1cae | 23 |
| 108 | 1cca | 22 |
| 109 | 1ccd | 29 |

TABLE 2-continued

| Compound number | Compound | IC50 (µM) |
|---|---|---|
| 110 | 1cce | 23 |
| 111 | 1cdb | 26 |
| 112 | 1ccd | 31 |

As shown in Table 2, the compounds of the present invention exhibit excellent activity ($IC_{50}$). In particular, a large number of compounds have an $IC_{50}$ value of 5 µM or less.

Experimental Example 2

Evaluation of Effect of Inhibiting Generation of Reactive Oxygen Species

It is known that reactive oxygen species are generated by inhibition of mitochondria, activation of NOX enzyme, and the like when MPP+ or rotenone is administered to a cell line. Since the reactive oxygen species generated at this time react with the CM-H2DCFDA reagent to be fluorescent, the reactive oxygen species can be indirectly quantified.

Specifically, the SH-SY5Y cell line was treated with Compound 1aaa (Compound 1, 10 µM), apocynin (5 µM), or allopurinol (50 µM), and then with MPP+ (2 mM) or rotenone (2 µM) for 24 hours. The effect of each compound to inhibit the generation of reactive oxygen species is illustrated in FIGS. 2 and 3 as a relative percentage to that of the control group.

Figure 2:
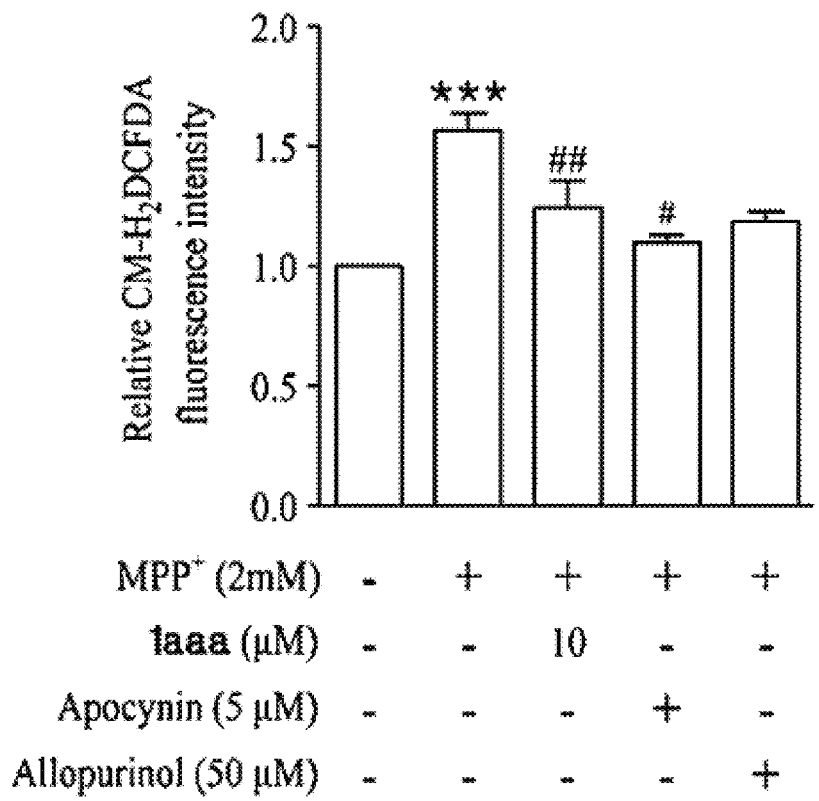
FIG. 2 illustrates the reactive oxygen species generation inhibitory effect of Compound 1aaa (Compound 1) of the present invention in a case of being treated with MPP$^+$.
Figure 3:
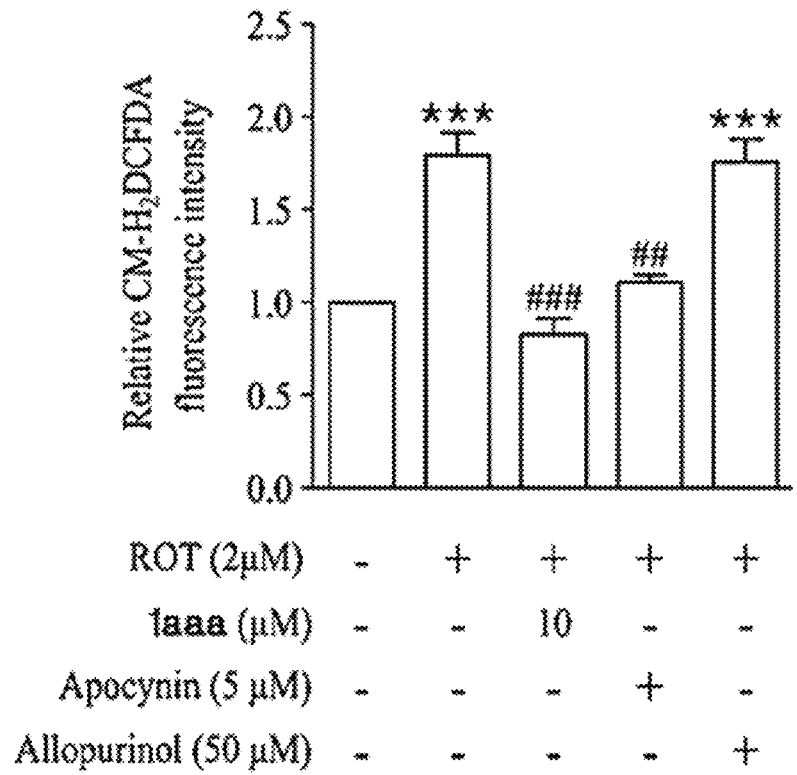
FIG. 3 illustrates the reactive oxygen species generation inhibitory effect of Compound 1aaa (Compound 1) of the present invention in a case of being treated with rotenone.

As illustrated in FIGS. 2 and 3, it has been confirmed that Compound 1aaa of the present invention effectively inhibits the increased generation of reactive oxygen species after exposure of the SH-SY5Y cell line to MPP+ or rotenone.

Experimental Example 3

Experiment to Evaluate Cell Viability

When a cell line is treated with a neurotoxic substance MPP+ or rotenone, the neurotoxic substance exhibits cytotoxicity, and the viable cells at this time can be measured through MTT assay.

Specifically, the SH-SY5Y cell line was treated with 0.5 µM of Compound 1aaa (Compound 1), 1aca (Compound 24), 1ace (Compound 27), 1ahe (Compound 44) or 1aje (Compound 62) and then with MPP+ (2 mM) or rotenone (2 µM) for 24 hours. Cell viability in the case of being treated with each compound is illustrated in FIGS. 4 and 5.

Figure 4:
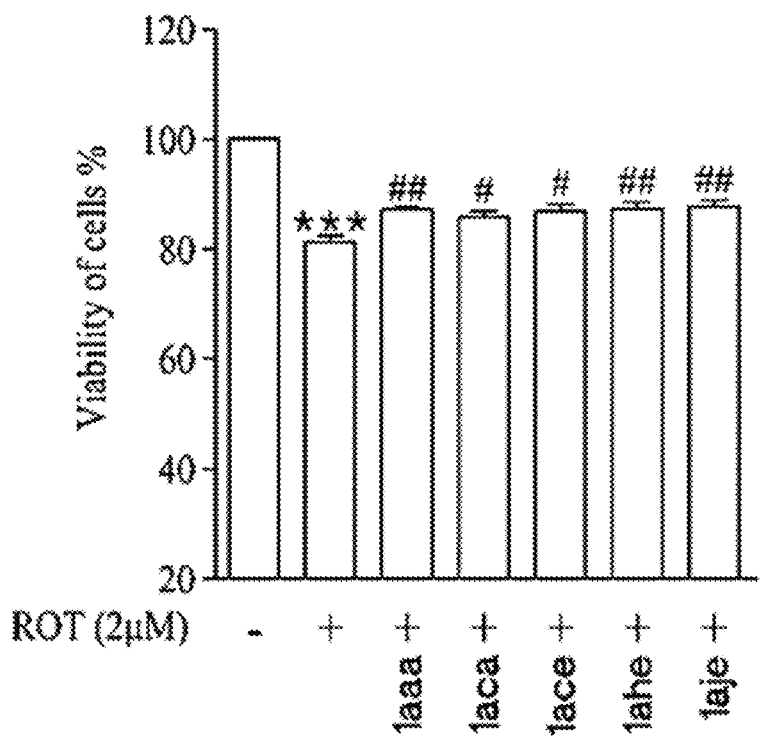
FIG. 4 illustrates the cell viability by Compounds 1aaa (Compound 1), 1aca (Compound 24), 1ace (Compound 27), 1ahe (Compound 44) and 1aje (Compound 62) of the present invention in a case of being treated with rotenone.
Figure 5:
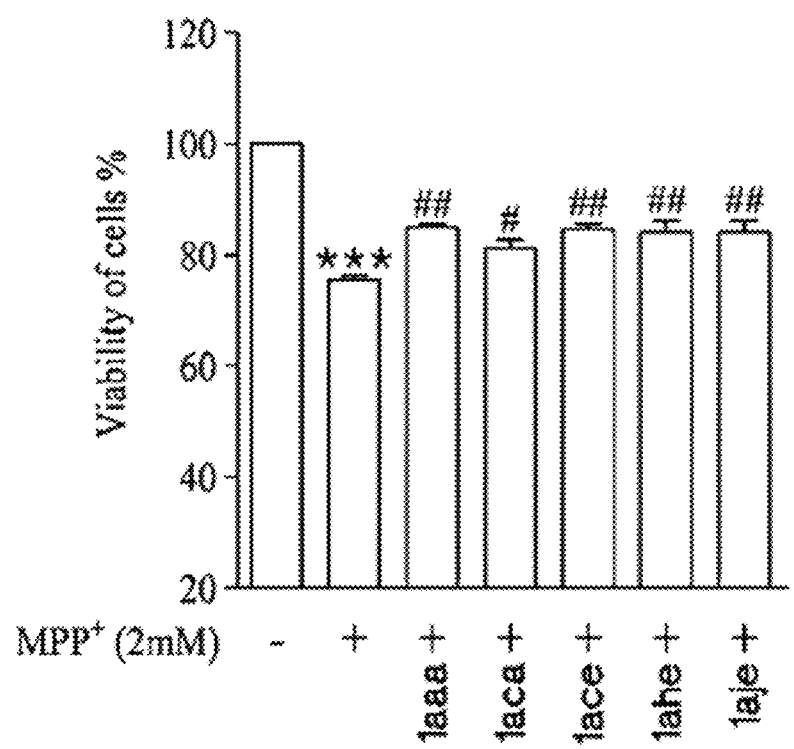
FIG. 5 illustrates the cell viability by Compounds 1aaa (Compound 1), 1aca (Compound 24), 1ace (Compound 27), 1ahe (Compound 44) and 1aje (Compound 62) of the present invention in a case of being treated with MPP$^+$.

As illustrated in FIGS. 4 and 5, it has been confirmed that Compounds 1aaa, 1aca, 1ace, 1ahe, and 1aje of the present invention significantly inhibit cell death, which is reduced by MPP+ or rotenone, and improve cell viability.

Experimental Example 4

Evaluation of Alpha-Synuclein Aggregation Inhibitory Effect

When rotenone is administered to nerve cells, phosphorylation, namely aggregation of alpha-synuclein occurs. Phosphorylation, aggregation of alpha-synuclein can be observed and quantified through Western blotting.

Specifically, the SH-SY5Y cell line was treated with Compound 1aaa (Compound 1, 10 µM) and then with rotenone. Thereafter, Western blotting was performed to measure the expression levels of alpha-synuclein and phosphorylated alpha-synuclein, and the results are illustrated in FIG. 6.

Figure 6:
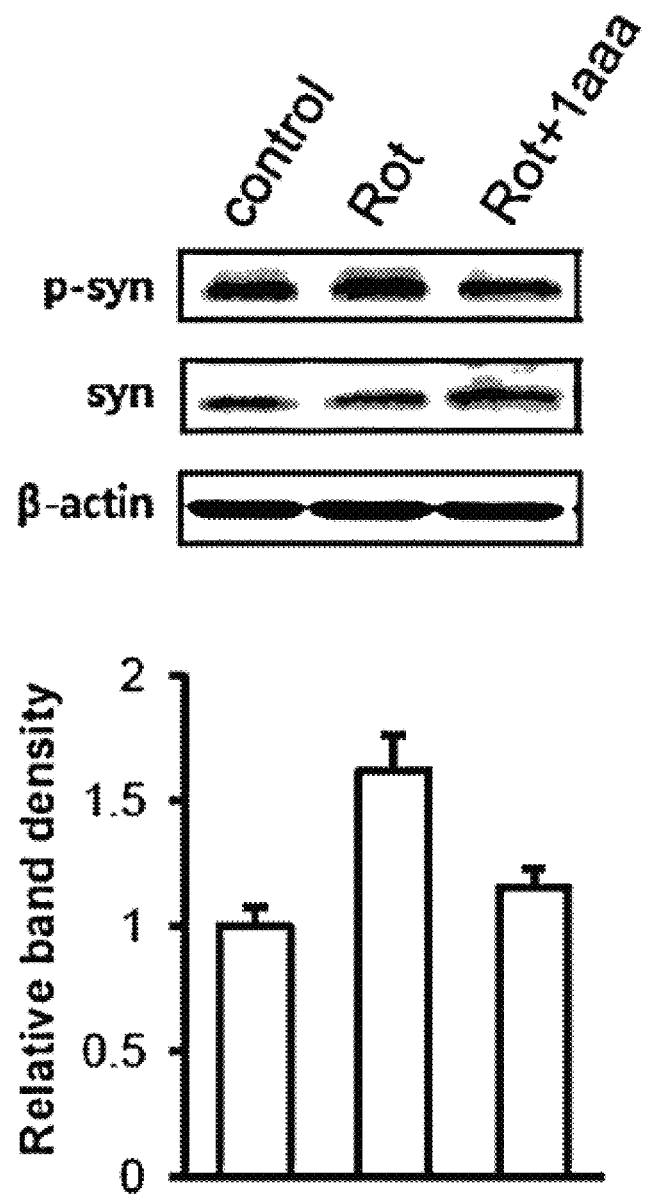
FIG. 6 illustrates the expression levels of α-synuclein and phosphorylated α-synuclein analyzed through Western blotting.

As illustrated in FIG. 6, it has been confirmed that phosphorylation of alpha-synuclein by rotenone is significantly reduced by the treatment with Compound 1aaa of the present invention. Consequently, it can be seen that Compound 1aaa of the present invention has an effect of inhibiting alpha-synuclein aggregation by inhibiting phosphorylation of alpha-synuclein.

Experimental Example 5

Evaluation of Nrf-2 Induction Effect

When oxidative stress caused by reactive oxygen species increases in cells, the synthesis of antioxidants increases in response to this. One of the transcription factors mediating this antioxidant response is Nrf-2. As the transcription factor Nrf-2 enters the nucleus and the expression of genes related to antioxidation increases, the antioxidant capacity of cells increases.

Specifically, the SH-SY5Y cell line was exposed to Compound 1aaa (Compound 1, 10 µM) for 24 hours and then the cells were taken. Thereafter, the nuclear fraction was extracted, then Western blotting was performed to analyze the amount of Nrf-2 in the nucleus, and the results are illustrated in FIG. 7.

Figure 7:
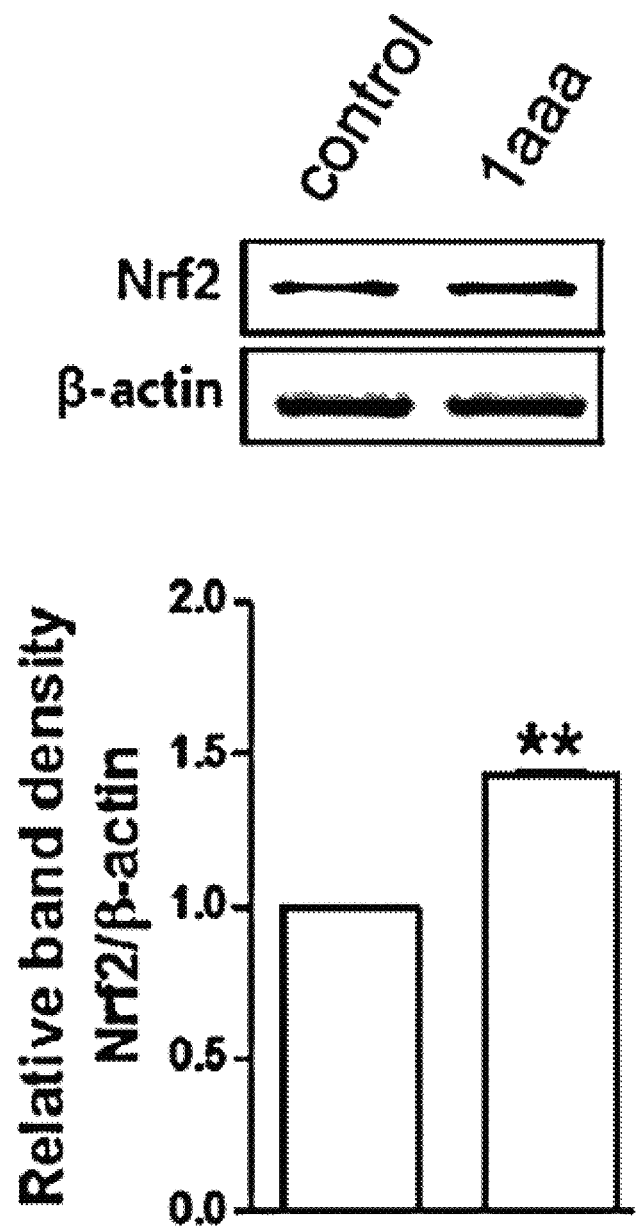
FIG. 7 illustrates the amount of Nrf-2 in the nucleus analyzed through Western blotting.

As illustrated in FIG. 7, it has been confirmed that the amount of Nrf-2 in the nucleus is increased by about 1.5 times by the treatment with Compound 1aaa of the present invention. Consequently, it can be seen that Compound 1aaa of the present invention activates the cellular antioxidant system by increasing the induction and nuclear import of Nrf-2.

Experimental Example 6

Evaluation of Efficacy of Inhibiting Nerve Cell Death

The dopaminergic neuronal cell protecting effect of the compound of the present invention was evaluated in an animal model of Parkinson's disease. The animal model used was 7-week-old C57Bl6/J mice (23 to 25 g), to which MPTP (15 mg/kg) was administered 4 times at 1.5 hour intervals. For 1 to 2 days after administration, behavior was noticeably slowed and gradually recovered. In 1 week after MPTP administration, behavior was almost normalized to a level similar to that of normal mice. However, fine and precise motor skills were decreased, dopamine concentration in the striatum was significantly reduced, and histopathologically, dopamine neurons were significantly reduced in the substantia nigra.

6-1. Evaluation 1

In order to evaluate the efficacy of the compounds of the present invention, Compounds 1aaa (Compound 1), 1ace (Compound 27), 1ahe (Compound 44) and 1aje (Compound 62) were each administered at a dose of 5 mg/kg for 1 week, then MPTP (15 mg/kg×4 times) was injected. These compounds were additionally administered for 1 week, and then dopamine innervation in the substantia nigra region was analyzed through immunostaining.

Specifically, selegiline, 1aaa, 1ace, 1ahe, 1aje, and apocynin were administered at a dose of 5 mg/kg for 7 days, then MPTP (15 mg/kg×4 times) was administered to induce damage to dopaminergic neurons. After 7 days of additional administration of the compounds at the same dose, the animals were sacrificed. Immunostaining was performed using tyrosine hydroxylase antibody to measure the survival rate of substantia nigra dopaminergic neurons. After immunostaining, the number of surviving dopaminergic neurons was analyzed. The results are illustrated in FIG. 8.

Figure 8:
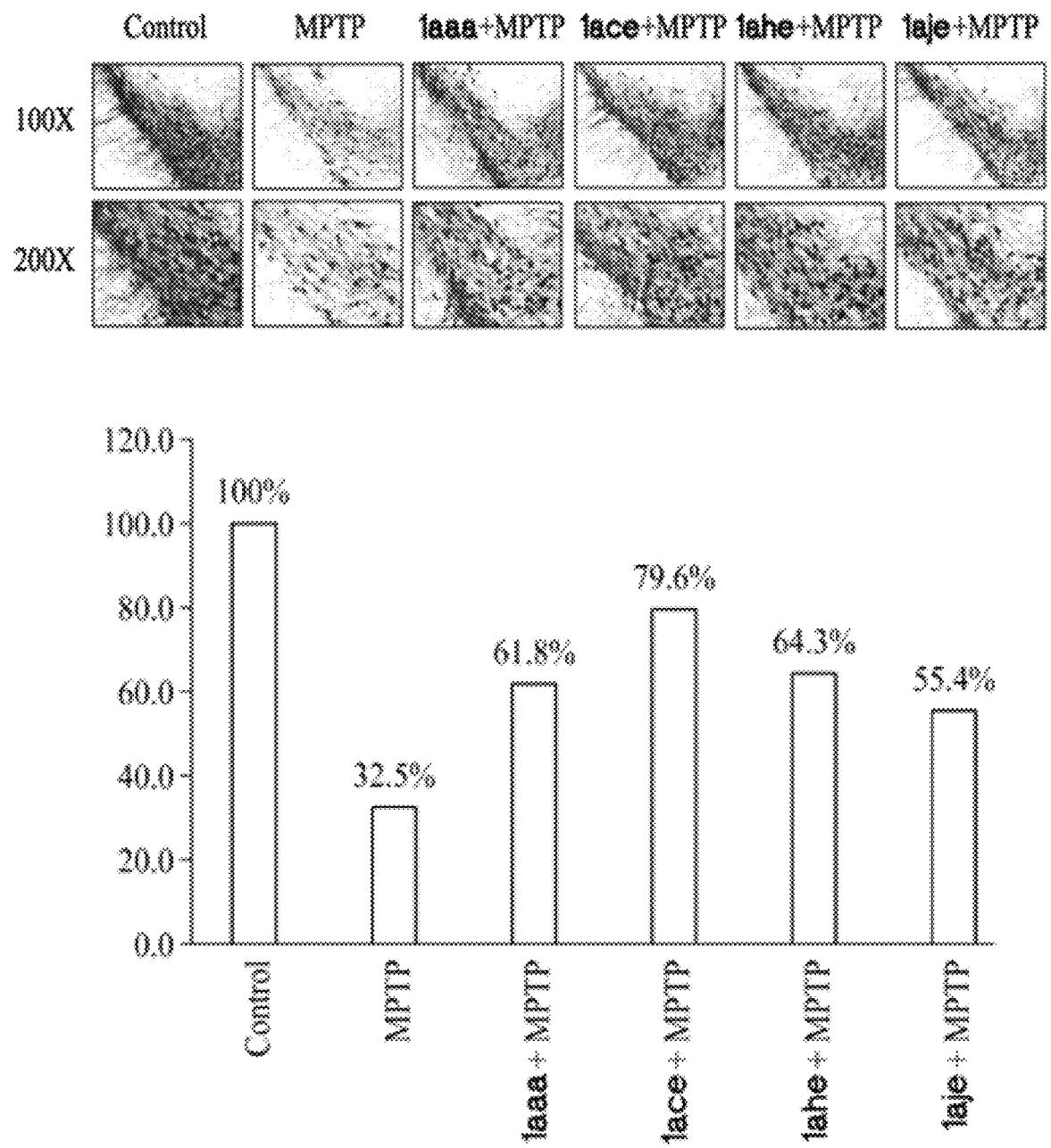
FIG. 8 illustrates photomicrographs after midbrain substantia nigra staining in a case of being treated with Compounds 1aaa (Compound 1), 1aca (Compound 24), 1ace (Compound 27), 1ahe (Compound 44) and 1aje (Compound 62) of the present invention, and a graph quantitatively displaying the dopaminergic neuronal cell death inhibitory efficacy of the Compounds as a relative percentage (%) to that of a control group.

As illustrated in FIG. 8, the compounds of the present invention exhibited a nerve cell death inhibitory effect, and in particular, Compound 1ace exhibited a greatly excellent effect as the survival rate in this group was 79.6% of that in the control group. This indicates that the compounds of the present invention have an excellent effect of recovering the survival rate from 32.5% in the control group up to 79.6% (by about 2.5 times).

6-2. Evaluation 2

In order to evaluate the efficacy of the compounds of the present invention, Compounds 1abv (Compound 22), 1abw (Compound 23), and 1ahs (Compound 52) were each intraperitoneally administered at a dose of 5 mg/kg for 1 week or orally administered at a dose of 50 mg/kg, then MPTP (15 mg/kg×4 times) was injected. These compounds were additionally administered for 1 week, and then dopamine innervation in the substantia nigra region was analyzed through immunostaining. The results are illustrated in FIG. 9.

Figure 9:
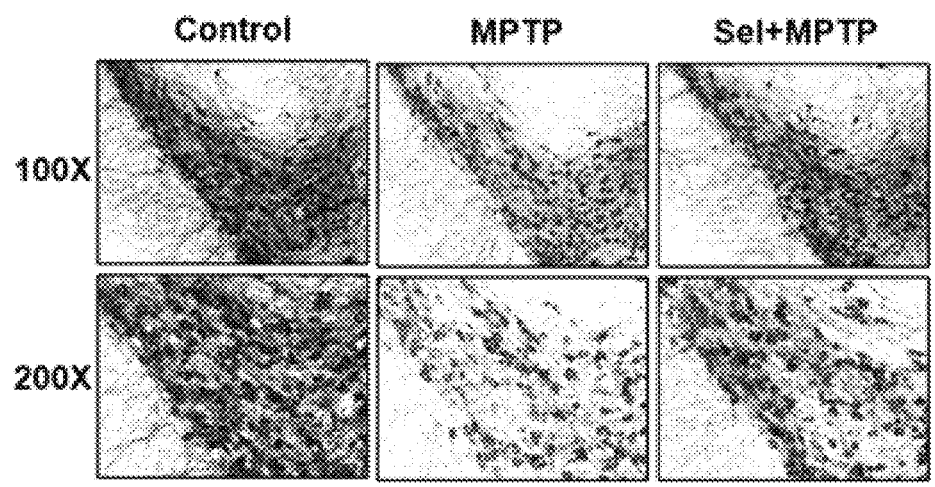
FIG. 9 illustrates photomicrographs after midbrain substantia nigra staining in a case of being treated with Compounds 1abv (Compound 22), 1abw (Compound 23) and 1ahs (Compound 52) of the present invention, and a graph quantitatively displaying the dopaminergic neuronal cell death inhibitory efficacy of the Compounds as a relative percentage (%) to that of a control group.
Figure 9:
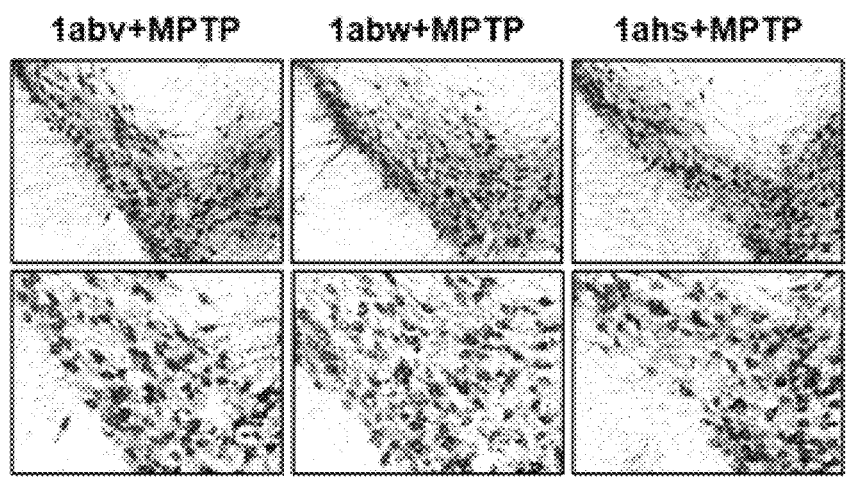
Figure 9:
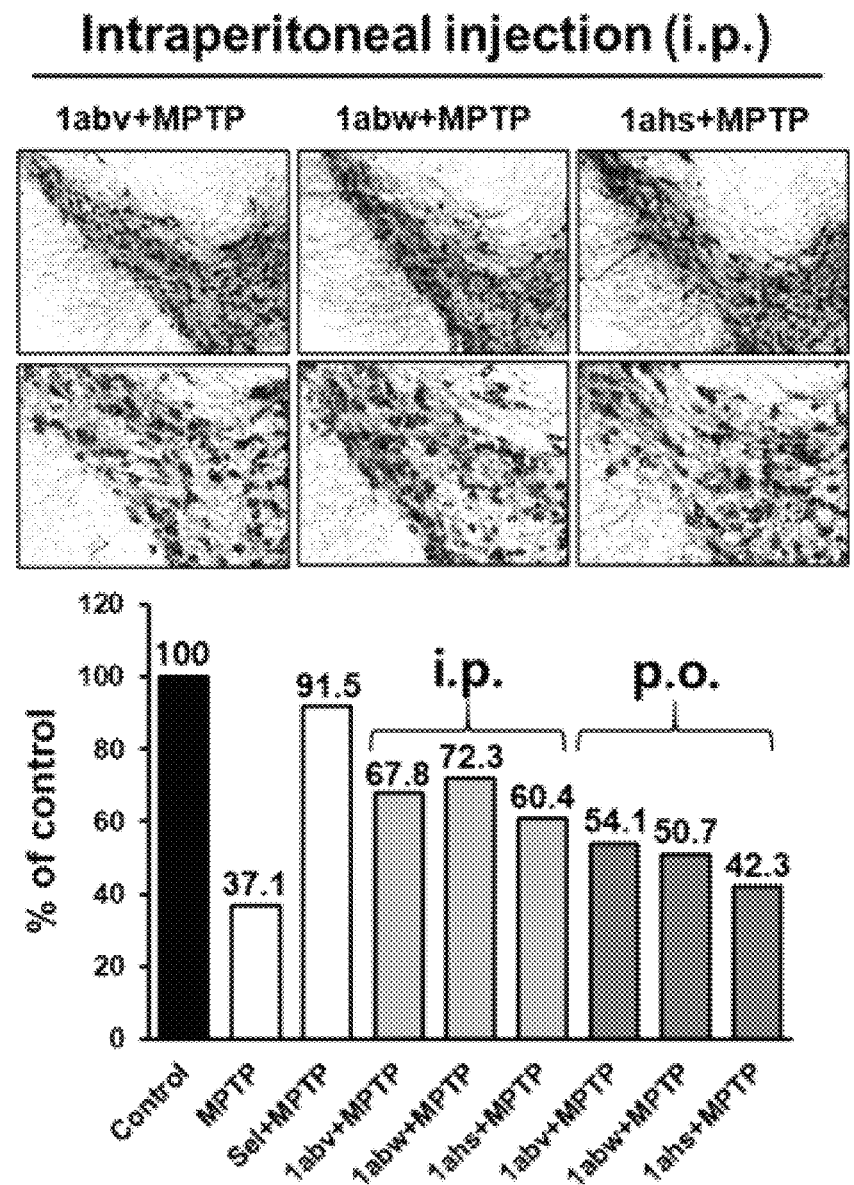

As illustrated in FIG. 9, the compounds of the present invention exhibited a nerve cell death inhibitory effect, and in particular, Compounds 1abv and 1abw exhibited a greatly excellent effect as the survival rate in these groups was 67.8% and 72.3%, respectively, of that in the control group. This indicates that the compounds of the present invention have an excellent effect of increasing the survival rate of neuronal cells by about two times that in the control group (MPTP administration group, 37.1%).

6-3. Evaluation 3

In order to evaluate the dopaminergic neuroprotective effect of the compounds of the present invention, Compounds 1aja (Compound 59) and 1abk (Compound 17) were each intraperitoneally administered at a dose of 5 mg/kg for 1 week, then MPTP (15 mg/kg×4 times) was injected. These compounds were additionally administered for 1 week. After immunostaining using brain slices from each group, surviving dopaminergic neurons were photographed under a microscope and analyzed. The results are illustrated in FIG. 10.

Figure 10:
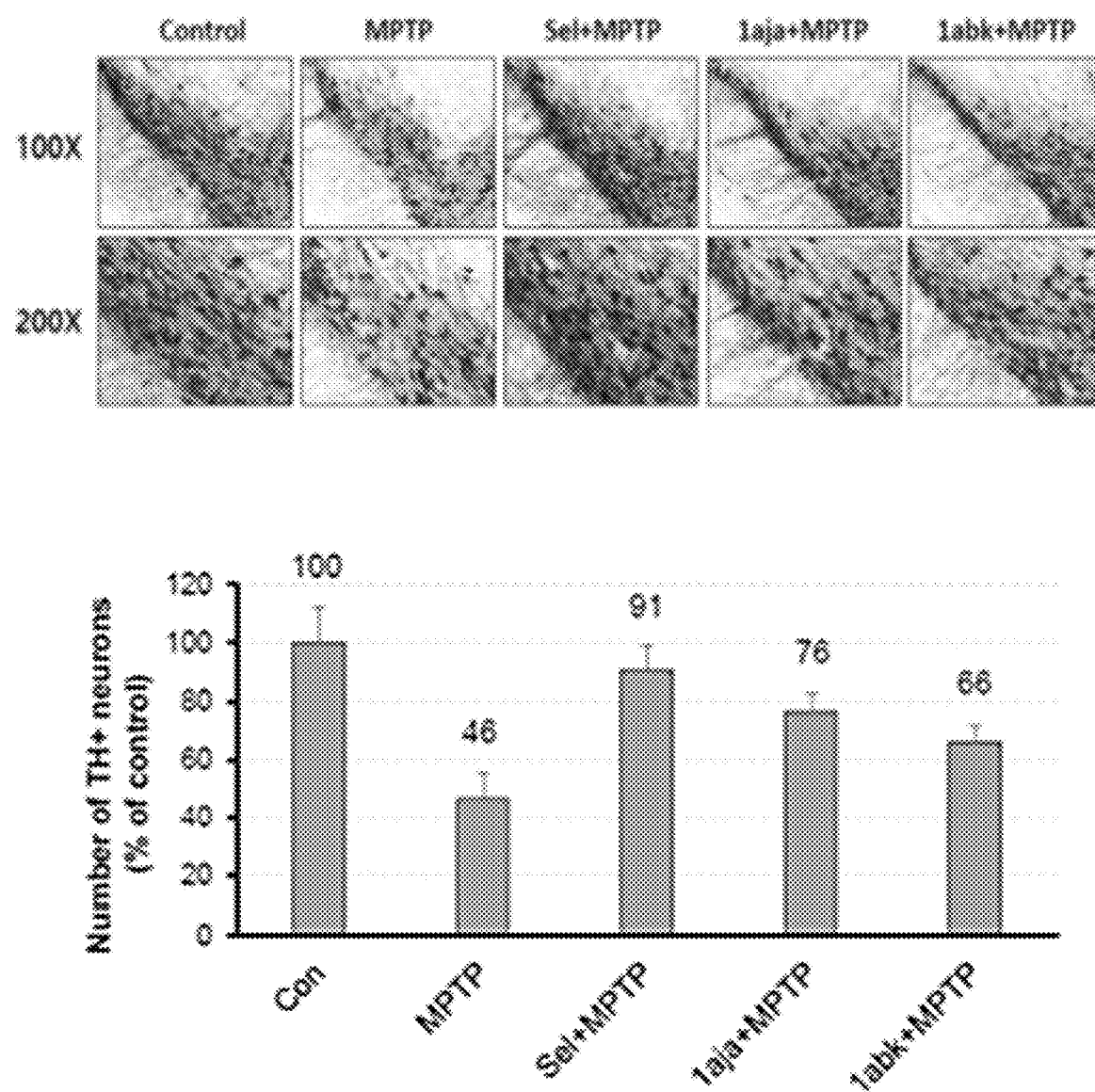
FIG. 10 illustrates photomicrographs after midbrain substantia nigra staining in a case of being treated with Compounds 1aja (Compound 59) and 1abk (Compound 17) of the present invention, and a graph quantitatively displaying the dopaminergic neuronal cell death inhibitory efficacy of the Compounds as a relative percentage (%) to that of a control group.

As illustrated in FIG. 10, the compounds of the present invention exhibited a nerve cell death inhibitory effect, and Compounds 1aja and 1abk exhibited a significant dopaminergic neuroprotective effect as the survival rate in these groups was 76% and 66%, respectively, of that in the control group when intraperitoneally administered.

6-4. Evaluation 4

In order to evaluate the dopaminergic neuroprotective effect of the compounds of the present invention, Compounds 1ajs (Compound 63), 1ajy (Compound 67), and 1aqj (Compound 85) were each intraperitoneally administered at a dose of 5 mg/kg for 1 week, then MPTP (15 mg/kg×4 times) was injected. These compounds were additionally administered for 1 week. After immunostaining using brain slices from each group, surviving dopaminergic neurons were photographed under a microscope and analyzed. The results are illustrated in FIG. 11.

Figure 11:
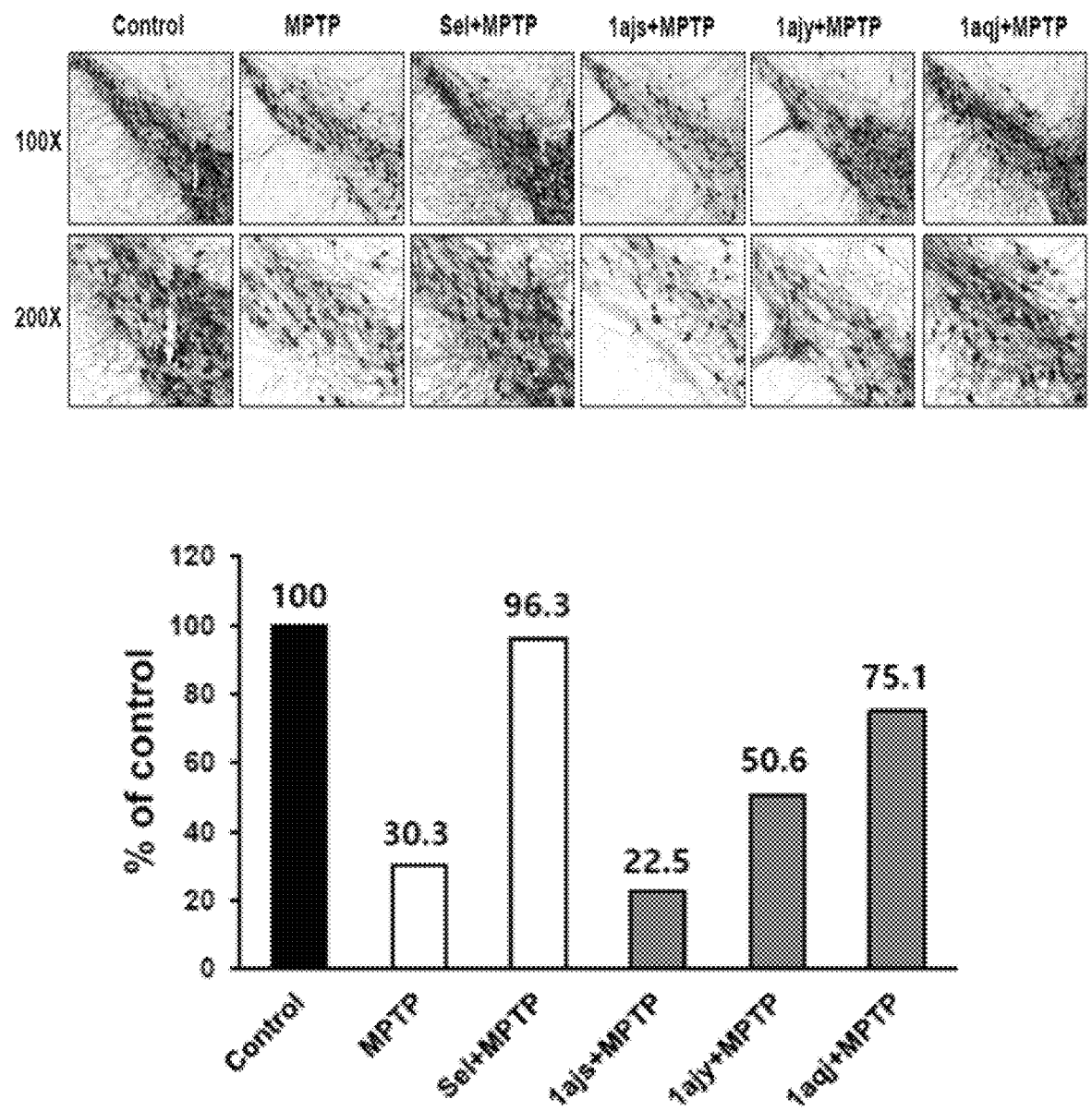
FIG. 11 illustrates photomicrographs after midbrain substantia nigra staining in a case of being treated with Compounds 1ajs (Compound 63), 1ajy (Compound 67) and 1aqj (Compound 85) of the present invention, and a graph quantitatively displaying the dopaminergic neuronal cell death inhibitory efficacy of the Compounds as a relative percentage (%) to that of a control group.

As illustrated in FIG. 11, the compounds of the present invention exhibited a nerve cell death inhibitory effect, and in particular, Compounds 1ajy and 1aqj exhibited a significant dopaminergic neuroprotective effect as the survival rate in these groups was 50.6% and 75.1%, respectively, of that in the control group when intraperitoneally administered.

Experimental Example 7

Evaluation of Behavioral Activity 7-1. Evaluation 1

In order to evaluate the behavioral activation by the compounds of the present invention, Compounds 1ace (Compound 27), 1ahe (Compound 44), and 1abv (Compound 22) were each intraperitoneally administered at a dose of 5 mg/kg for 1 week, then MPTP (15 mg/kg×4 times) was injected. These compounds were additionally administered for 1 week. A beam test and a challenge beam test were conducted 1 day before and 2 days after MPTP administration, respectively. The results are illustrated in FIG. 12.

Figure 12:
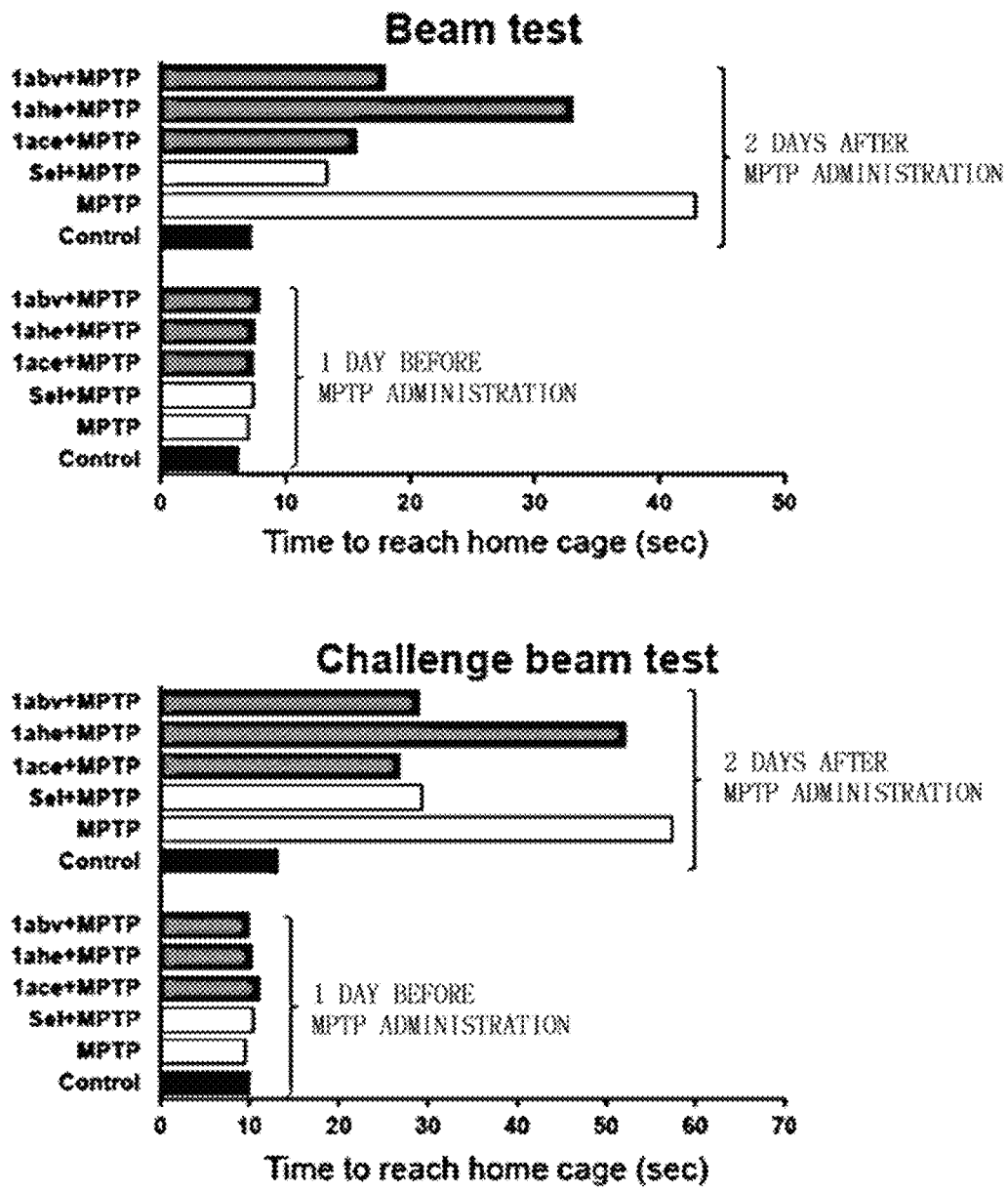
FIG. 12 illustrates the results of beam test and challenge beam test in a case of being treated with Compounds 1ace (Compound 27), 1ahe (Compound 44), and 1abv (Compound 22) of the present invention.

As illustrated in FIG. 12, it has been found that Compounds 1ace and 1abv of the present invention reduces the time for mice to reach the home cage by 50% or more compared to that in the control group (MPTP administration group). Through this, it has been confirmed that Compounds 1ace and 1abv effectively inhibit MPTP-induced damage to dopaminergic nerves and improve behavioral activity.

7-2. Evaluation 2

In order to evaluate the behavioral activation by the compounds of the present invention, Compounds 1ajs (Compound 63), 1ajy (Compound 67), and 1abw (Compound 23) were each intraperitoneally administered at a dose of 5 mg/kg for 1 week, then MPTP (15 mg/kg×4 times) was injected. These compounds were additionally administered for 1 week. A beam test and a challenge beam test were conducted 2 days after MPTP administration. The results are illustrated in FIG. 13.

Figure 13:
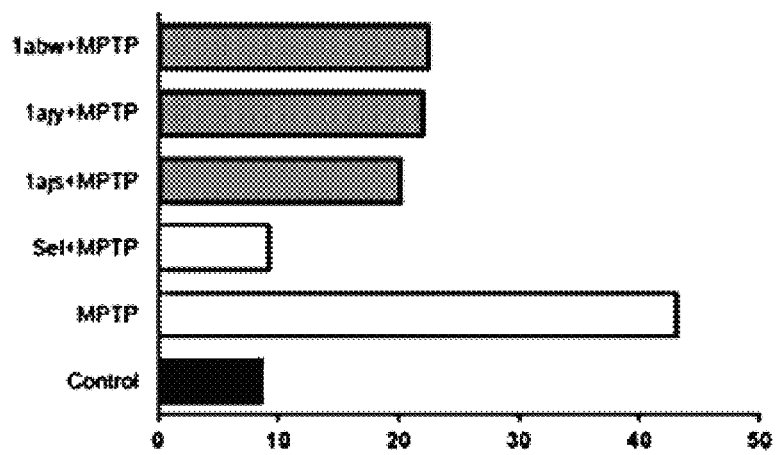
FIG. 13 illustrates the results of beam test and challenge beam test in a case of being treated with Compounds 1ajs (Compound 63), 1ajy (Compound 67), and 1abw (Compound 23) of the present invention.
Figure 13:
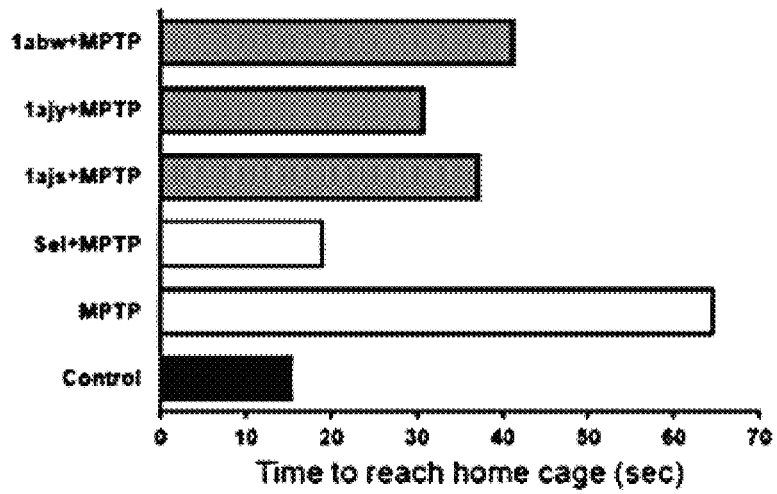

As illustrated in FIG. 13, as a result of the beam test, it has been found that Compounds 1ajs, 1ajy, and 1abw of the present invention reduces the time for mice to reach the home cage by about 50% compared to that in the control group (MPTP administration group). As a result of the challenge beam test, it has been found that Compounds 1ajs, 1ajy, and 1abw of the present invention reduces the time for mice to reach the home cage by about 40% to 50% compared to that in the control group (MPTP administration group). Through this, it has been confirmed that Compounds 1ajs, 1ajy and 1abw effectively inhibit the decrease in behavioral activity caused by MPTP.

Experimental Example 8

Evaluation of Pharmacokinetic Properties

The bioavailability (BA) and pharmacokinetic properties of the compounds of the present invention were evaluated in an animal model. The compounds were administered to 8-week-old SD rats (300 to 350 g) at a dose of 2 to 5 mg/kg through oral and intravenous administration routes. After administration, blood was collected at regular time intervals and the time course of blood concentration was analyzed. Based on this, pharmacokinetic parameters including bioavailability were examined, and the results are shown in Table 3 below.

TABLE 3

| Compound number | Compound | BA, F (%) |
|---|---|---|
| 1 | 1aaa | 13 |
| 15 | 1abh | 11 |
| 21 | 1abu | 11 |
| 22 | 1abv | 55 |
| 27 | 1ace | 31 |
| 44 | 1ahe | 73 |
| 59 | 1aja | 23 |

(Margin of error omitted)

Experimental Example 9

Toxicity Evaluation
9-1. Single Acute Toxicity Evaluation 1

Acute toxicity properties after single administration of the compound of the present invention were evaluated in an animal model. Compound 1aaa (Compound 1) was orally administered to 8-week-old ICR mice (30 to 35 g) at a dose of 1000 mg/kg, and changes in body weight and changes by acute toxicity were observed for 1 week after administration. Among others, the changes in body weight when Compound 1aaa is administered are shown in Table 4 below.

TABLE 4

| Number of days (day) | 0 | 1 | 2 | 3 | 5 | 7 |
|---|---|---|---|---|---|---|
| Control group | 100 | 98.41 | 99.68 | 104.14 | 107.96 | 110.51 |
| Compound 1aaa | 100 | 98.06 | 101.29 | 104.85 | 106.47 | 109.39 |

(Margin of error omitted)

As shown in Table 4, after administration of Compound 1aaa of the present invention, there was no change in body weight and a specific acute toxicity phenomenon was not observed. In addition, there was no change in organ weight, and no specific findings were found in the autopsy report.

9-2. Single Acute Toxicity Evaluation 2

Acute toxicity properties after single administration of the compounds of the present invention were evaluated in an animal model. Compounds 1abv (Compound 22), 1ace (Compound 27), 1ahe (Compound 44), 1ahs (Compound 52), 1aja (Compound 59), 1ajs (Compound 63) and 1aqj (Compound 85) were orally administered to 8-week-old ICR mice (30 to 35 g) at a dose of 2000 mg/kg, and changes in body weight and changes by acute toxicity were observed for 2 weeks after administration. Among others, the changes in body weight when the compounds are administered are shown in Table 5 below.

TABLE 5

| Number of days (day) | 0 | 2 | 4 | 8 | 10 | 14 |
|---|---|---|---|---|---|---|
| Control group | 100 | 100.6 | 101.8 | 106.6 | 109.6 | 109.8 |
| Compound 1abv | 100 | 99.0 | 100.0 | 102.5 | 103.4 | 105.0 |
| Compound 1ace | 100 | 99.2 | 100.3 | 102.1 | 103.5 | 105.5 |
| Compound 1ahe | 100 | 98.6 | 100.9 | 104.2 | 105.5 | 106.0 |
| Compound 1ahs | 100 | 97.6 | 100.0 | 103.8 | 104.5 | 105.0 |
| Compound 1aja | 100 | 95.6 | 102.8 | 105.8 | 107.8 | 107.6 |
| Compound 1ajs | 100 | 94.3 | 91.9 | 96.7 | 101.6 | 99.4 |
| Compound 1aqj | 100 | 94.6 | 99.8 | 104.8 | 105.9 | 106.6 |

(Margin of error omitted)

As shown in Table 5, after administration of the compounds of the present invention, there was no change in body weight and a specific acute toxicity phenomenon was not observed. In addition, there was no change in organ weight, and specific findings were not found in the autopsy report.

The invention claimed is:

1. A compound represented by the following Chemical Formula 1 or a pharmaceutically acceptable salt of the compound:

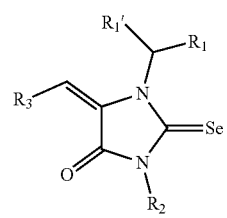

[Chem. 1]

where,
$R_1$ and $R_1'$ are each independently selected from the group consisting of hydrogen, alkyl, cycloalkyl, heterocycloalkyl, an aryl group, heteroaryl, benzyl, and a phenethyl group, or $R_1$ and $R_1'$ may bond to each other to form a single ring;
$R_2$ and $R_3$ are each independently hydrogen, halo, cyano, alkyl, alkoxy, alkenyl, alkynyl, cycloalkyl, heterocycloalkyl, heterocycloalkyl-alkyl, aryl, aryl-alkyl, or heteroaryl; and
the alkyl, alkoxy, alkenyl, alkynyl, cycloalkyl, heterocycloalkyl, heterocycloalkyl-alkyl, aryl, aryl-alkyl, or heteroaryl may not be substituted or may be substituted with one or more groups selected from the group consisting of hydroxy; halogen; alkyl; -alkyl-hydroxy; -heterocycloalkyl-alkyl-hydroxy; —NH alkyl-O-alkyl-hydroxy; —NH alkyl-O-alkyl-halogen; —NH alkyl-heterocycloalkyl; alkoxy; amino; dialkylamino; nitro; cyano; carbonyl; cycloalkyl;
heterocycloalkyl unsubstituted or substituted with alkyl; aryl; and heteroaryl.

2. The compound represented by Chemical Formula 1 or a pharmaceutically acceptable salt of the compound according to claim 1, wherein $R_1$ and $R_1'$ are each independently selected from the group consisting of hydrogen, $C_1$-$C_6$ alkyl, $C_3$-$C_8$ cycloalkyl, $C_3$-$C_8$ heterocycloalkyl, $C_6$-$C_{10}$ aryl, $C_5$-$C_{10}$ heteroaryl, benzyl and a phenethyl group, or $R_1$ and $R_1'$ may bond to each other to form a single ring.

3. The compound represented by Chemical Formula 1 or a pharmaceutically acceptable salt of the compound according to claim 1, wherein

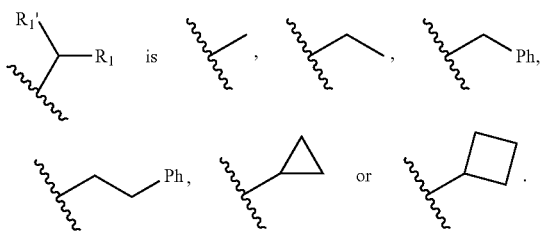

4. The compound represented by Chemical Formula 1 or a pharmaceutically acceptable salt of the compound according to claim 1, wherein $R_2$ is hydrogen; $C_1$-$C_{12}$ alkyl unsubstituted or substituted with halogen; $C_3$-$C_{10}$ cycloalkyl; —$C_1$-$C_6$ alkyl-$C_3$-$C_{10}$ heterocycloalkyl containing one or more heteroatoms selected from the group consisting of N, S and O; —$C_6$-$C_{10}$ aryl unsubstituted or substituted with halogen or $C_1$-$C_{12}$ alkyl; or —$C_1$-$C_6$ alkyl-$C_6$-$C_{10}$ aryl.

5. The compound represented by Chemical Formula 1 or a pharmaceutically acceptable salt of the compound according to claim 1, wherein $R_2$ is hydrogen; $C_1$-$C_{12}$ alkyl; $C_1$-$C_6$ alkyl substituted with halogen; $C_3$-$C_8$ cycloalkyl; —$C_1$-$C_6$ alkyl-$C_3$-$C_{10}$ heterocycloalkyl containing heteroatoms N and O; —$C_6$-$C_{10}$ aryl unsubstituted or substituted with halogen or $C_1$-$C_6$ alkyl; or —$C_1$-$C_6$ alkyl-$C_6$-$C_{10}$ aryl.

6. The compound represented by Chemical Formula 1 or a pharmaceutically acceptable salt of the compound according to claim 1, wherein $R_2$ is hydrogen; $C_1$-$C_{12}$ alkyl; $C_1$-$C_6$ alkyl substituted with halogen; $C_3$-$C_8$ cycloalkyl; —$C_1$-$C_6$ alkyl-morpholine; phenyl unsubstituted or substituted with halogen or $C_1$-$C_6$ alkyl; or —$C_1$-$C_6$ alkyl-phenyl.

7. The compound represented by Chemical Formula 1 or a pharmaceutically acceptable salt of the compound according to claim 1, wherein $R_3$ is $C_6$-$C_{10}$ heterocycloalkyl, $C_6$-$C_{10}$ aryl or $C_6$-$C_{10}$ heteroaryl, and the heterocycloalkyl, aryl or heteroaryl is not substituted or is substituted with one or more groups selected from the group consisting of hydroxy; halogen; $C_1$-$C_6$ alkyl; —$C_1$-$C_6$ alkyl-hydroxy; —$C_3$-$C_8$ heterocycloalkyl-$C_1$-$C_6$ alkyl-hydroxy; —NH$C_1$-$C_6$ alkyl-O—$C_1$-$C_6$ alkyl-hydroxy; —NH$C_1$-$C_6$ alkyl-O—$C_1$-$C_6$ alkyl-halogen; —NH$C_1$-$C_6$ alkyl-$C_3$-$C_8$ heterocycloalkyl; $C_1$-$C_6$ alkoxy; amino; di-$C_1$-$C_6$ alkylamino; and $C_3$-$C_8$ heterocycloalkyl unsubstituted or substituted with $C_1$-$C_6$ alkyl.

8. The compound represented by Chemical Formula 1 or a pharmaceutically acceptable salt of the compound according to claim 1, wherein $R_3$ is $C_6$-$C_{10}$ heterocycloalkyl having a heteroatom N, $C_6$-$C_{10}$ aryl or $C_6$-$C_{10}$ heteroaryl having a heteroatom N, and the heterocycloalkyl, aryl or heteroaryl is not substituted or is substituted with one or more groups selected from the group consisting of hydroxy; halogen; $C_1$-$C_6$ alkyl; —$C_1$-$C_6$ alkyl-hydroxy; —$C_3$-$C_8$ heterocycloalkyl-$C_1$-$C_6$ alkyl-hydroxy; —NH$C_1$-$C_6$ alkyl-O—$C_1$-$C_6$ alkyl-hydroxy; —NH$C_1$-$C_6$ alkyl-O—$C_1$-$C_6$ alkyl-halogen; —NH$C_1$-$C_6$ alkyl-$C_3$-$C_8$ heterocycloalkyl; $C_1$-$C_6$ alkoxy; amino; di-$C_1$-$C_6$ alkylamino; and $C_3$-$C_8$ heterocycloalkyl unsubstituted or substituted with $C_1$-$C_6$ alkyl.

9. The compound represented by Chemical Formula 1 or a pharmaceutically acceptable salt of the compound according to claim 1, wherein $R_3$ is phenyl, naphthyl, pyridine, piperazine, or imidazole, and the phenyl, naphthyl, pyridine, piperazine, or imidazole is not substituted or is substituted with one or more groups selected from the group consisting of hydroxy; halogen; $C_1$-$C_6$ alkyl; —$C_1$-$C_6$ alkyl-hydroxy; -piperazine-$C_1$-$C_6$ alkyl-hydroxy; —NH$C_1$-$C_6$ alkyl-O—$C_1$-$C_6$ alkyl-hydroxy; —NH$C_1$-$C_6$ alkyl-O—$C_1$-$C_6$ alkyl-halogen; —NH$C_1$-$C_6$ alkyl-morpholine; $C_1$-$C_6$ alkoxy; amino; di-$C_1$-$C_6$ alkylamino; pyrrolidine; piperidine; piperazine unsubstituted or substituted with $C_1$-$C_6$ alkyl; and morpholine.

10. The compound represented by Chemical Formula 1 or a pharmaceutically acceptable salt of the compound according to claim 1, which is selected from the group consisting of the following compounds:

| Compound | Structural formula |
|---|---|
| 1 | 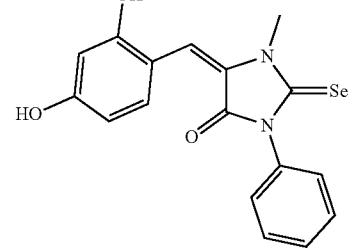 |
| 2 | 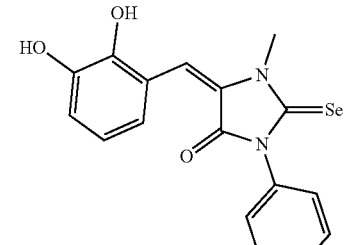 |
| 3 | 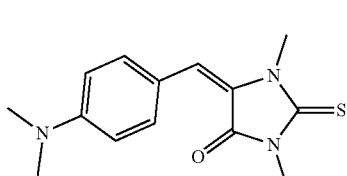 |

-continued

| Compound | Structural formula |
|---|---|
| 4 | |
| 5 | |
| 6 | |
| 7 | |
| 8 | |
| 9 | |

-continued

| Compound | Structural formula |
|---|---|
| 10 | |
| 11 | |
| 12 | |
| 13 | |
| 14 | |

-continued

| Compound | Structural formula |
|---|---|
| 15 | |
| 16 | |
| 17 | |
| 18 | |
| 19 | |

-continued

| Compound | Structural formula |
|---|---|
| 20 | |
| 21 | |
| 22 | |
| 23 | |
| 24 | |

-continued

| Compound | Structural formula |
|---|---|
| 25 | 4-(dimethylamino)benzylidene-1-methyl-2-selenoxo-3-(4-ethylphenyl)imidazolidin-4-one |
| 26 | 5-(3,4-dihydroxybenzylidene)-1-methyl-2-selenoxo-3-(4-ethylphenyl)imidazolidin-4-one |
| 27 | 5-(3,5-dihydroxybenzylidene)-1-methyl-2-selenoxo-3-(4-ethylphenyl)imidazolidin-4-one |
| 28 | 5-(4-(piperidin-1-yl)benzylidene)-1-methyl-2-selenoxo-3-(4-ethylphenyl)imidazolidin-4-one |
| 29 | 5-(4-bromobenzylidene)-1-methyl-2-selenoxo-3-(4-ethylphenyl)imidazolidin-4-one |

-continued
| Compound | Structural formula |
|---|---|
| 30 |  |
| 31 | 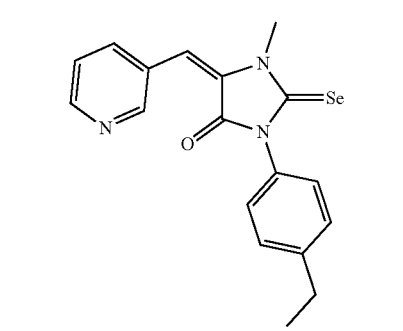 [SMILES: CCc1ccc(N2C(=O)/C(=C\c3cccnc3)N(C)C2=[Se])cc1] |
| 32 | 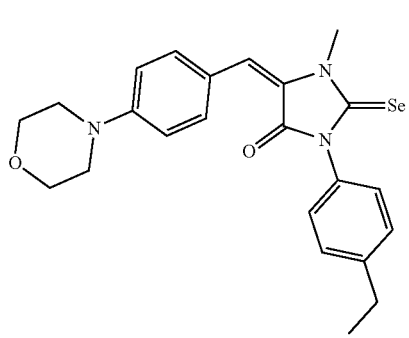 [SMILES: CCc1ccc(N2C(=O)/C(=C\c3ccc(N4CCOCC4)cc3)N(C)C2=[Se])cc1] |
| 33 | 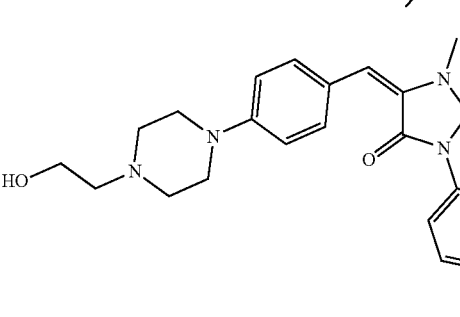 |
| 34 | 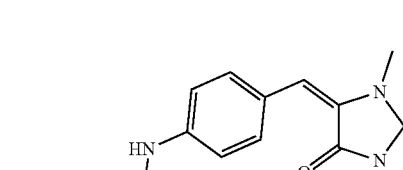 |

| Compound | Structural formula |
|---|---|
| 35 | 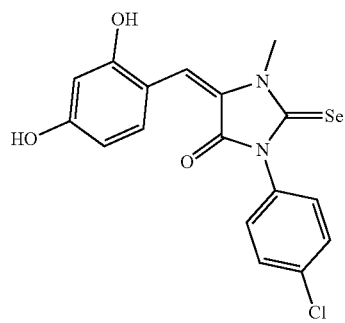 [SMILES: CN1C(=[Se])N(c2ccc(Cl)cc2)C(=O)/C1=C\c1ccc(O)cc1O] |
| 36 | 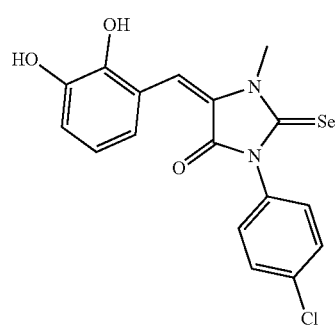 [SMILES: CN1C(=[Se])N(c2ccc(Cl)cc2)C(=O)/C1=C\c1cccc(O)c1O] |
| 37 | 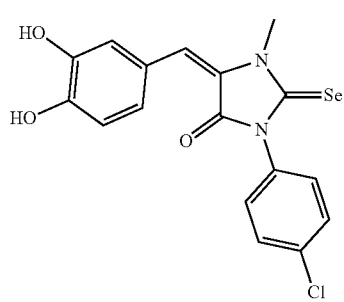 [SMILES: CN1C(=[Se])N(c2ccc(Cl)cc2)C(=O)/C1=C\c1ccc(O)c(O)c1] |
| 38 | 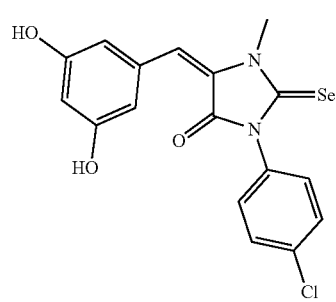 |
| 39 | 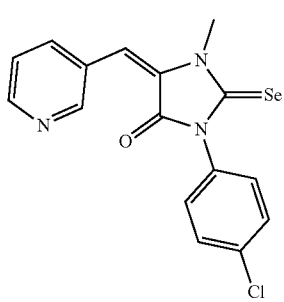 [SMILES: CN1C(=[Se])N(c2ccc(Cl)cc2)C(=O)/C1=C\c1cccnc1] |

-continued
| Compound | Structural formula |
|---|---|
| 40 | 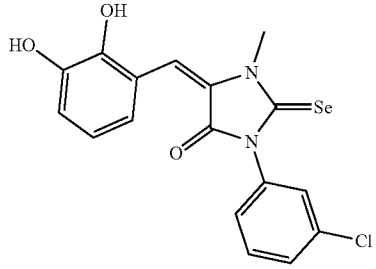 [SMILES: CN1C(=[Se])N(c2cccc(Cl)c2)C(=O)/C1=C\c1cccc(O)c1O] |
| 41 | 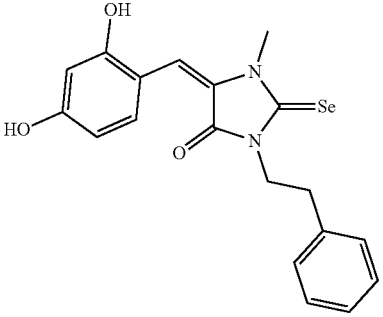 [SMILES: CN1C(=[Se])N(CCc2ccccc2)C(=O)/C1=C\c1ccc(O)cc1O] |
| 42 | 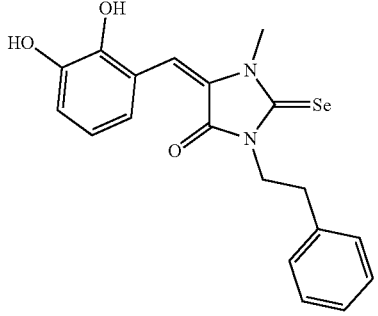 [SMILES: CN1C(=[Se])N(CCc2ccccc2)C(=O)/C1=C\c1cccc(O)c1O] |
| 43 | 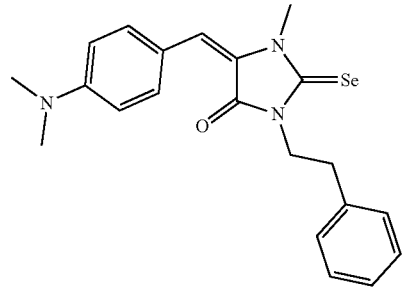 [SMILES: CN1C(=[Se])N(CCc2ccccc2)C(=O)/C1=C\c1ccc(N(C)C)cc1] |
| 44 | 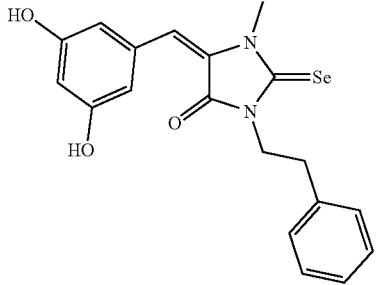 [SMILES: CN1C(=[Se])N(CCc2ccccc2)C(=O)/C1=C\c1cc(O)cc(O)c1] |

-continued

| Compound | Structural formula |
|---|---|
| 45 | |
| 46 | |
| 47 | |
| 48 | |
| 49 | |

-continued

| Compound | Structural formula |
|---|---|
| 50 | |
| 51 | |
| 52 | |
| 53 | |
| 54 | |

-continued
| Compound | Structural formula |
|---|---|
| 55 | 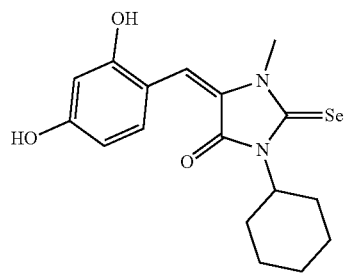 [SMILES: CN1C(=[Se])N(C2CCCCC2)C(=O)/C1=C\c1ccc(O)cc1O] |
| 56 | 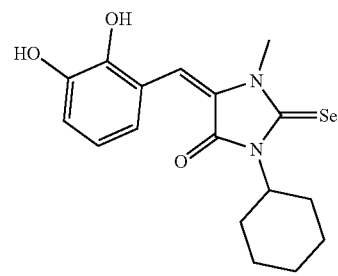 [SMILES: CN1C(=[Se])N(C2CCCCC2)C(=O)/C1=C\c1cccc(O)c1O] |
| 57 | 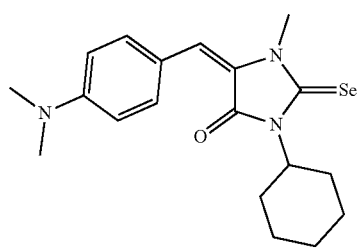 [SMILES: CN1C(=[Se])N(C2CCCCC2)C(=O)/C1=C\c1ccc(N(C)C)cc1] |
| 58 | 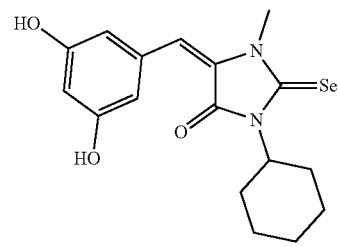 [SMILES: CN1C(=[Se])N(C2CCCCC2)C(=O)/C1=C\c1cc(O)cc(O)c1] |
| 59 | 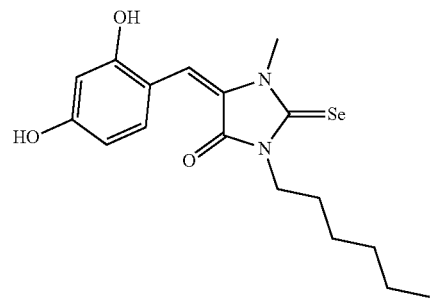 [SMILES: CCCCCCN1C(=O)/C(=C\c2ccc(O)cc2O)N(C)C1=[Se]] |

-continued
| Compound | Structural formula |
|---|---|
| 60 | 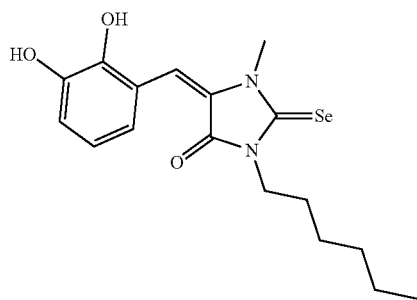 [SMILES: CCCCCCN1C(=O)/C(=C\c2cccc(O)c2O)N(C)C1=[Se]] |
| 61 | 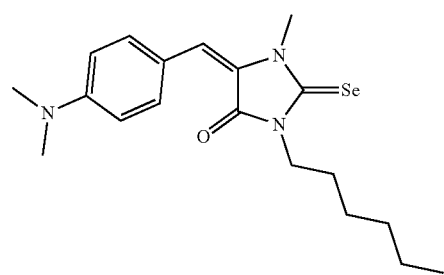 [SMILES: CCCCCCN1C(=O)/C(=C\c2ccc(N(C)C)cc2)N(C)C1=[Se]] |
| 62 | 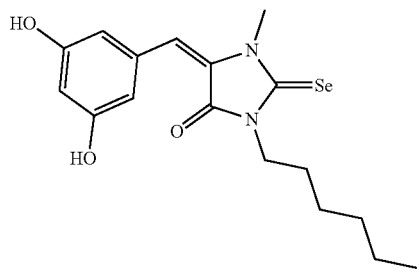 [SMILES: CCCCCCN1C(=O)/C(=C\c2cc(O)cc(O)c2)N(C)C1=[Se]] |
| 63 | 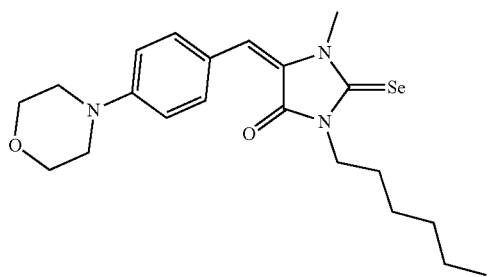 [SMILES: CCCCCCN1C(=O)/C(=C\c2ccc(N3CCOCC3)cc2)N(C)C1=[Se]] |
| 64 | 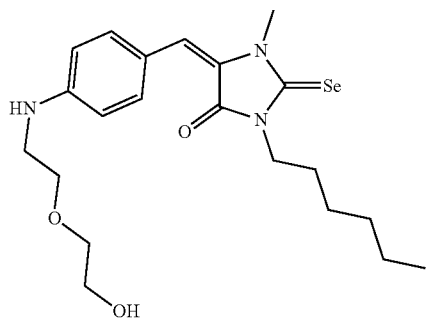 [SMILES: CCCCCCN1C(=O)/C(=C\c2ccc(NCCOCCO)cc2)N(C)C1=[Se]] |

-continued
| Compound | Structural formula |
|---|---|
| 65 | 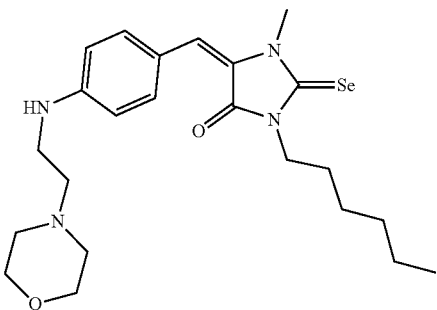 [SMILES: CCCCCCN1C(=O)/C(=C\c2ccc(NCCN3CCOCC3)cc2)N(C)C1=[Se]] |
| 66 | 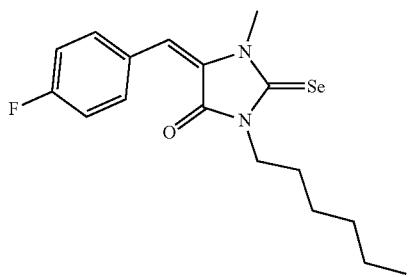 [SMILES: CCCCCCN1C(=O)/C(=C\c2ccc(F)cc2)N(C)C1=[Se]] |
| 67 | 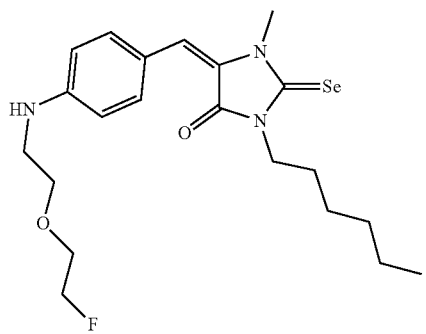 [SMILES: CCCCCCN1C(=O)/C(=C\c2ccc(NCCOCCF)cc2)N(C)C1=[Se]] |
| 68 | 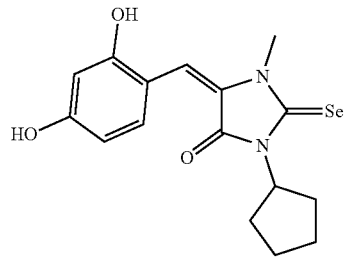 [SMILES: CN1C(=[Se])N(C2CCCC2)C(=O)/C1=C\c1ccc(O)cc1O] |
| 69 | 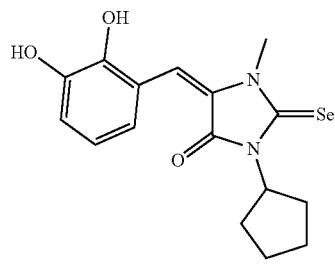 [SMILES: CN1C(=[Se])N(C2CCCC2)C(=O)/C1=C\c1cccc(O)c1O] |

-continued

| Compound | Structural formula |
|---|---|
| 70 | |
| 71 | |
| 72 | |
| 73 | |
| 74 | |

-continued
| Compound | Structural formula |
|---|---|
| 75 | 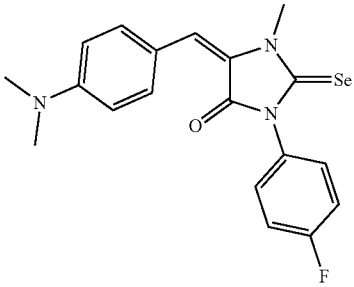 [SMILES: CN1C(=[Se])N(c2ccc(F)cc2)C(=O)/C1=C\c1ccc(N(C)C)cc1] |
| 76 | 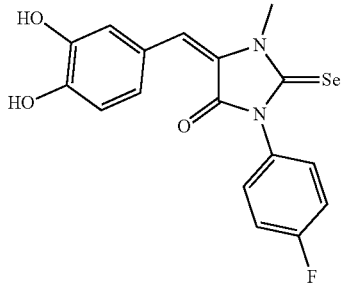 [SMILES: CN1C(=[Se])N(c2ccc(F)cc2)C(=O)/C1=C\c1ccc(O)c(O)c1] |
| 77 | 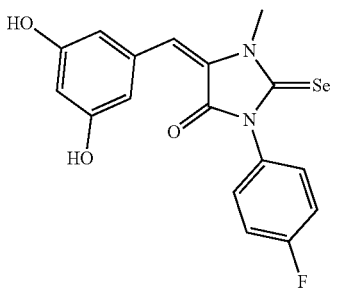 [SMILES: CN1C(=[Se])N(c2ccc(F)cc2)C(=O)/C1=C\c1cc(O)cc(O)c1] |
| 78 | 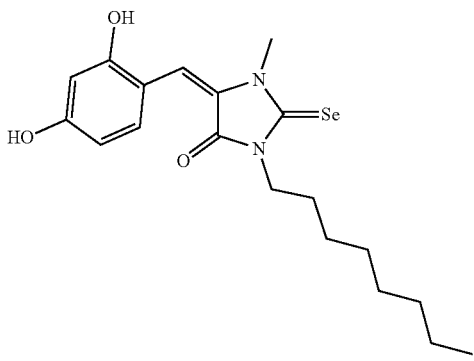 [SMILES: CCCCCCCCN1C(=O)/C(=C\c2ccc(O)cc2O)N(C)C1=[Se]] |
| 79 | 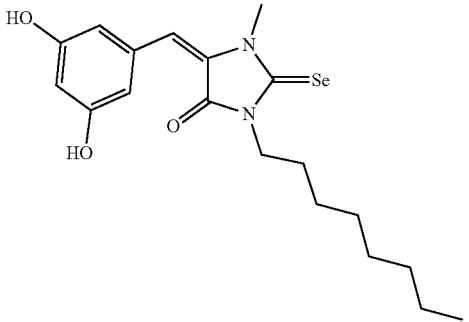 [SMILES: CCCCCCCCN1C(=O)/C(=C\c2cc(O)cc(O)c2)N(C)C1=[Se]] |

-continued
| Compound | Structural formula |
|---|---|
| 80 | 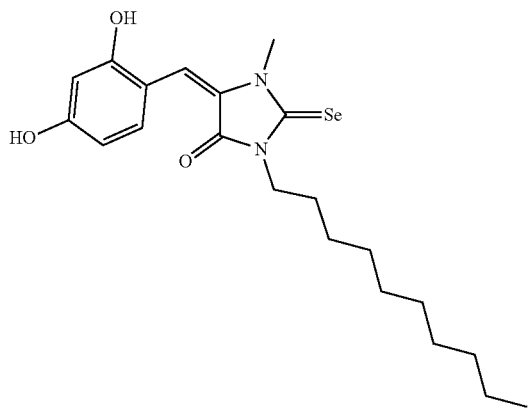 [SMILES: CCCCCCCCCCN1C(=O)/C(=C\c2ccc(O)cc2O)N(C)C1=[Se]] |
| 81 | 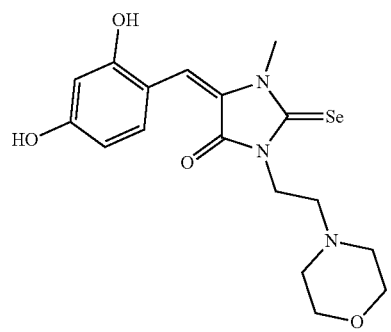 [SMILES: CN1C(=[Se])N(CCN2CCOCC2)C(=O)/C1=C\c1ccc(O)cc1O] |
| 82 | 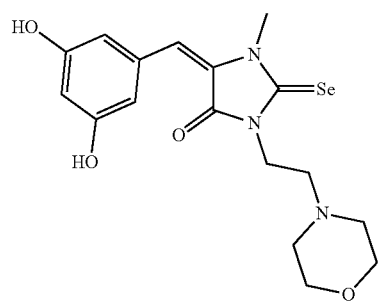 [SMILES: CN1C(=[Se])N(CCN2CCOCC2)C(=O)/C1=C\c1cc(O)cc(O)c1] |
| 83 | 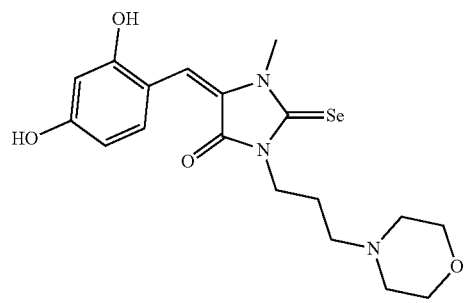 [SMILES: CN1C(=[Se])N(CCCN2CCOCC2)C(=O)/C1=C\c1ccc(O)cc1O] |

-continued
| Compound | Structural formula |
|---|---|
| 84 | 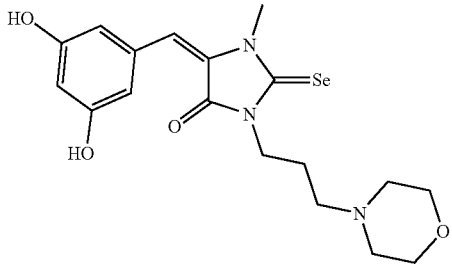 [SMILES: CN1C(=[Se])N(CCCN2CCOCC2)C(=O)/C1=C\c1cc(O)cc(O)c1] |
| 85 | 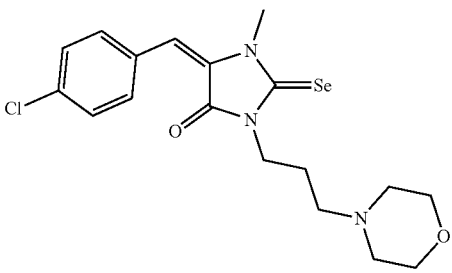 [SMILES: CN1C(=[Se])N(CCCN2CCOCC2)C(=O)/C1=C\c1ccc(Cl)cc1] |
| 86 | 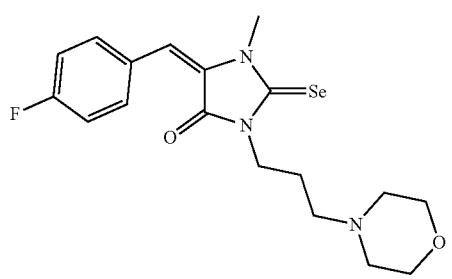 [SMILES: CN1C(=[Se])N(CCCN2CCOCC2)C(=O)/C1=C\c1ccc(F)cc1] |
| 87 | 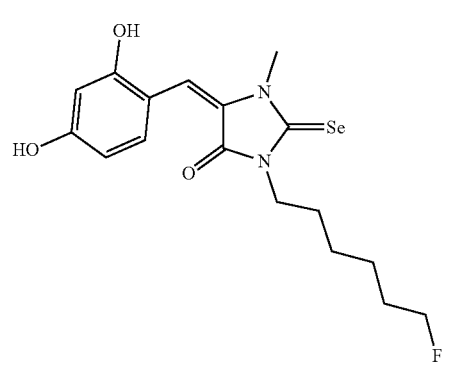 [SMILES: CN1C(=[Se])N(CCCCCCF)C(=O)/C1=C\c1ccc(O)cc1O] |
| 88 | 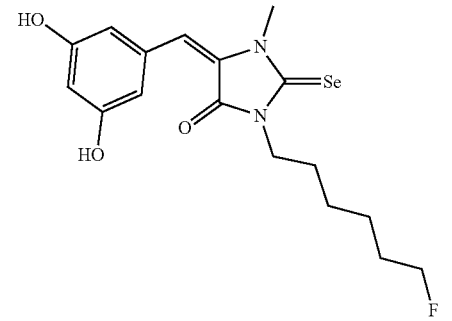 [SMILES: CN1C(=[Se])N(CCCCCCF)C(=O)/C1=C\c1cc(O)cc(O)c1] |

-continued
| Compound | Structural formula |
|---|---|
| 89 | 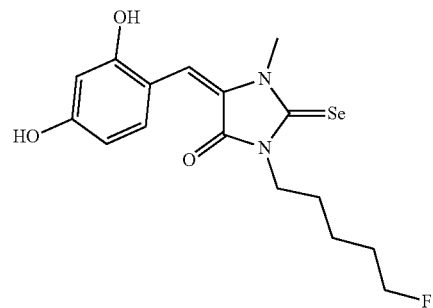 [SMILES: CN1C(=[Se])N(CCCCCF)C(=O)/C1=C\c1ccc(O)cc1O] |
| 90 | 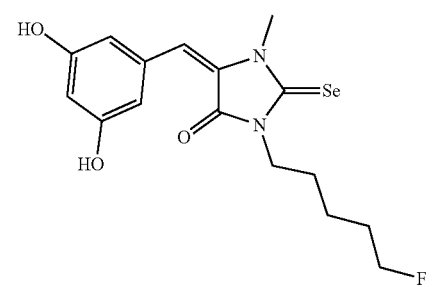 [SMILES: CN1C(=[Se])N(CCCCCF)C(=O)/C1=C\c1cc(O)cc(O)c1] |
| 91 | 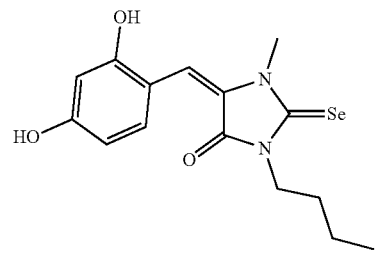 [SMILES: CCCCN1C(=O)/C(=C\c2ccc(O)cc2O)N(C)C1=[Se]] |
| 92 | 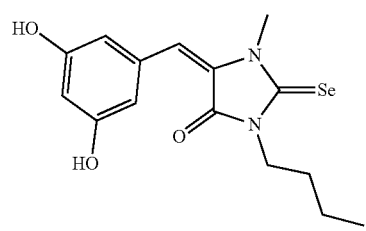 [SMILES: CCCCN1C(=O)/C(=C\c2cc(O)cc(O)c2)N(C)C1=[Se]] |
| 93 | 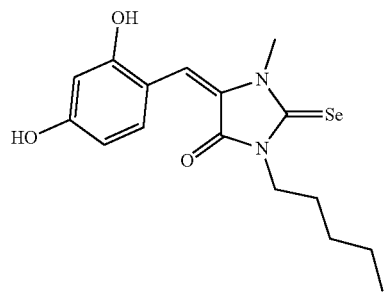 [SMILES: CCCCCN1C(=O)/C(=C\c2ccc(O)cc2O)N(C)C1=[Se]] |

-continued

| Compound | Structural formula |
|---|---|
| 94 | 5-(3,5-dihydroxybenzylidene)-1-methyl-3-pentyl-2-selenoxoimidazolidin-4-one |
| 95 | 5-(2,4-dihydroxybenzylidene)-1-ethyl-3-phenyl-2-selenoxoimidazolidin-4-one |
| 96 | 5-(2,3-dihydroxybenzylidene)-1-ethyl-3-phenyl-2-selenoxoimidazolidin-4-one |
| 97 | 5-(4-(dimethylamino)benzylidene)-1-ethyl-3-phenyl-2-selenoxoimidazolidin-4-one |
| 98 | 5-(3,4-dihydroxybenzylidene)-1-ethyl-3-phenyl-2-selenoxoimidazolidin-4-one |
| 99 | 5-(3,5-dihydroxybenzylidene)-1-ethyl-3-phenyl-2-selenoxoimidazolidin-4-one |

-continued
| Compound | Structural formula |
|---|---|
| 100 | 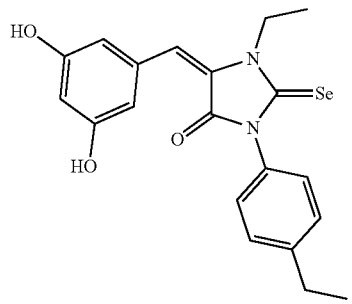 [SMILES: CCc1ccc(N2C(=O)/C(=C\c3cc(O)cc(O)c3)N(CC)C2=[Se])cc1] |
| 101 | 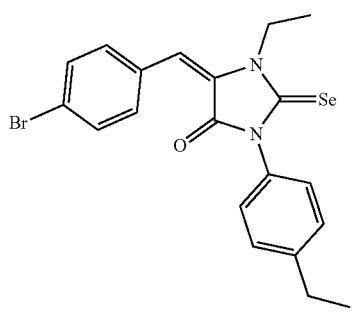 [SMILES: CCc1ccc(N2C(=O)/C(=C\c3ccc(Br)cc3)N(CC)C2=[Se])cc1] |
| 102 | 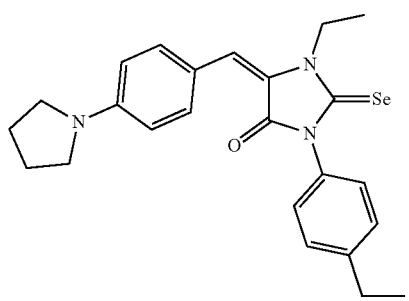 [SMILES: CCc1ccc(N2C(=O)/C(=C\c3ccc(N4CCCC4)cc3)N(CC)C2=[Se])cc1] |
| 103 | 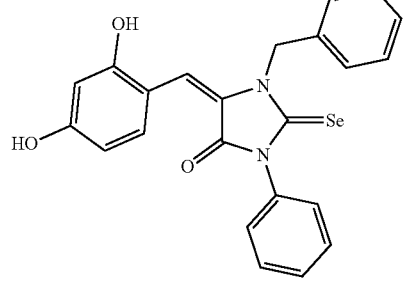 |
| 104 | 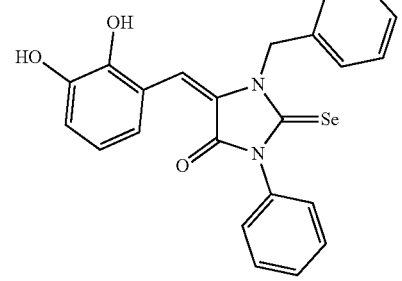 |

-continued
| Compound | Structural formula |
|---|---|
| 105 | 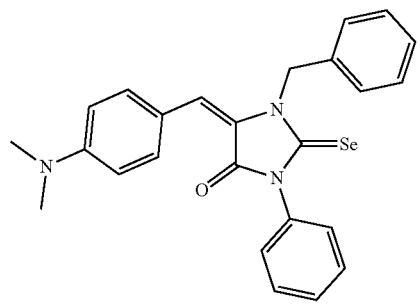 [SMILES: CN(C)c1ccc(/C=C2\C(=O)N(c3ccccc3)C(=[Se])N2Cc2ccccc2)cc1] |
| 106 | 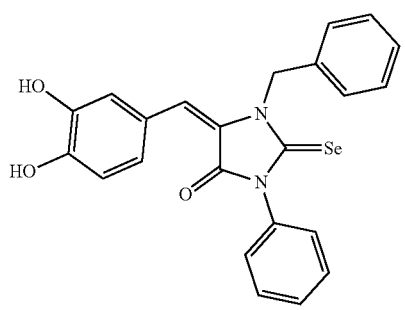 [SMILES: O=C1/C(=C\c2ccc(O)c(O)c2)N(Cc2ccccc2)C(=[Se])N1c1ccccc1] |
| 107 | 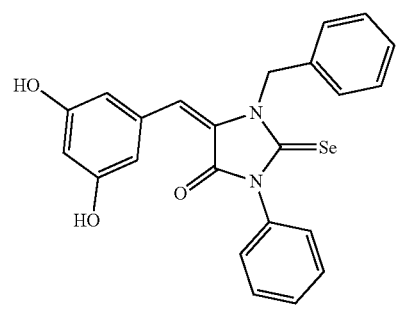 [SMILES: O=C1/C(=C\c2cc(O)cc(O)c2)N(Cc2ccccc2)C(=[Se])N1c1ccccc1] |
| 108 | 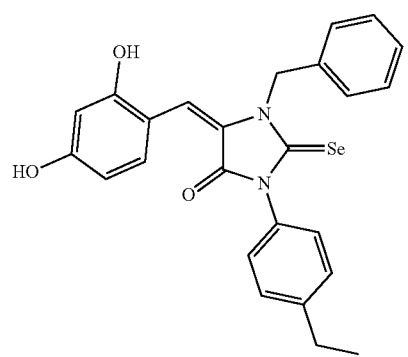 [SMILES: CCc1ccc(N2C(=O)/C(=C\c3ccc(O)cc3O)N(Cc3ccccc3)C2=[Se])cc1] |

-continued
| Compound | Structural formula |
|---|---|
| 109 | 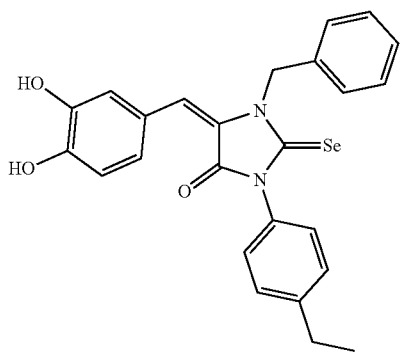 [SMILES: CCc1ccc(N2C(=O)/C(=C\c3ccc(O)c(O)c3)N(Cc3ccccc3)C2=[Se])cc1] |
| 110 | 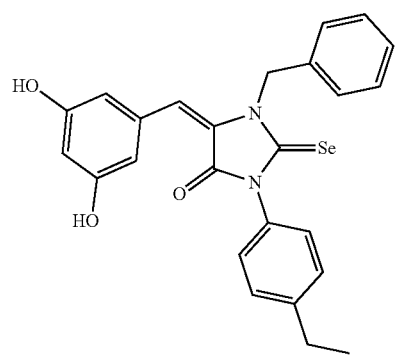 [SMILES: CCc1ccc(N2C(=O)/C(=C\c3cc(O)cc(O)c3)N(Cc3ccccc3)C2=[Se])cc1] |
| 111 | 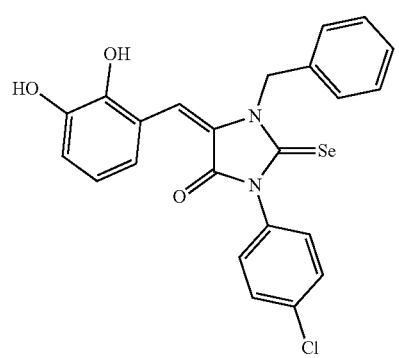 [SMILES: O=C1/C(=C\c2cccc(O)c2O)N(Cc2ccccc2)C(=[Se])N1c1ccc(Cl)cc1] |
| 112 | 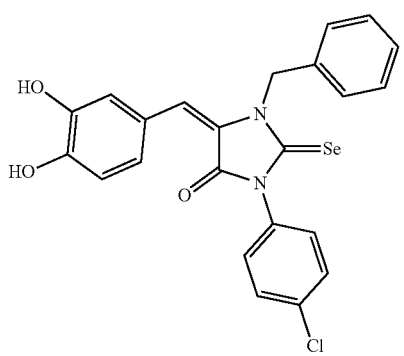 [SMILES: O=C1/C(=C\c2ccc(O)c(O)c2)N(Cc2ccccc2)C(=[Se])N1c1ccc(Cl)cc1] |

-continued
| Compound | Structural formula |
|---|---|
| 113 | 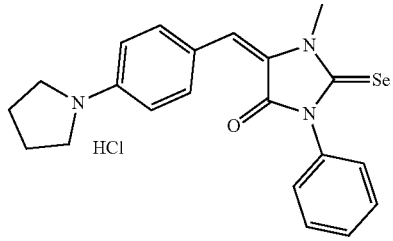 [SMILES: CN1C(=[Se])N(c2ccccc2)C(=O)/C1=C\c1ccc(N2CCCC2)cc1 ; Cl] |
| 114 | 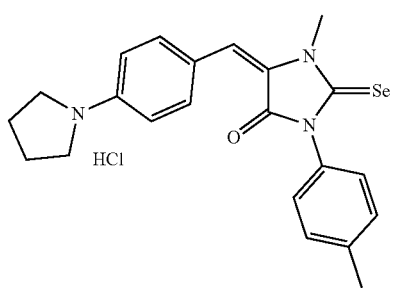 [SMILES: Cc1ccc(N2C(=O)/C(=C\c3ccc(N4CCCC4)cc3)N(C)C2=[Se])cc1 ; Cl] |
| 115 | 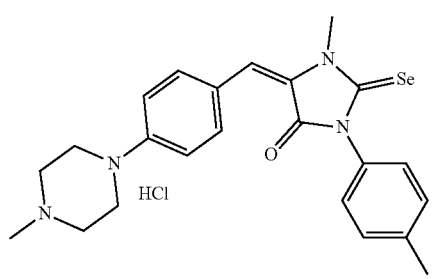 |
| 116 | 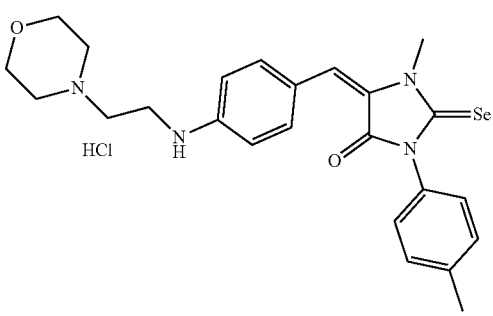 [SMILES: Cc1ccc(N2C(=O)/C(=C\c3ccc(NCCN4CCOCC4)cc3)N(C)C2=[Se])cc1 ; Cl] |
| 117 | 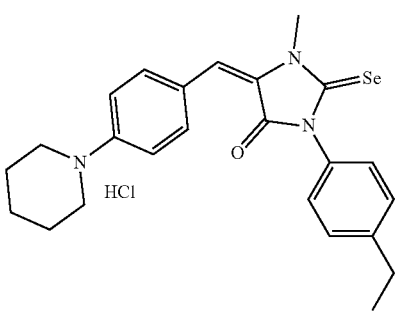 [SMILES: CCc1ccc(N2C(=O)/C(=C\c3ccc(N4CCCCC4)cc3)N(C)C2=[Se])cc1 ; Cl] |

-continued
| Compound | Structural formula |
|---|---|
| 118 | 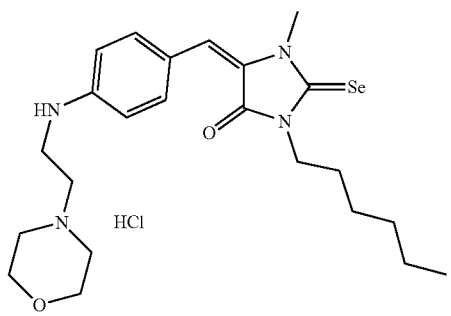 [SMILES: CCCCCCN1C(=O)/C(=C\c2ccc(NCCN3CCOCC3)cc2)N(C)C1=[Se] ; Cl] |
| 119 | 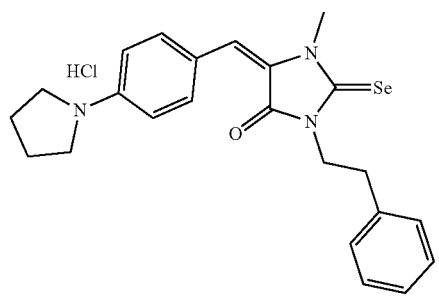 [SMILES: CN1C(=[Se])N(CCc2ccccc2)C(=O)/C1=C\c1ccc(N2CCCC2)cc1 ; Cl] |
| 120 | 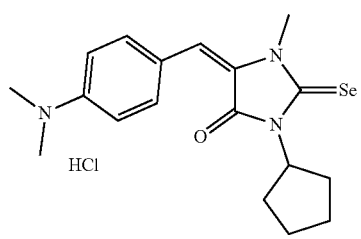 |
| 121 | 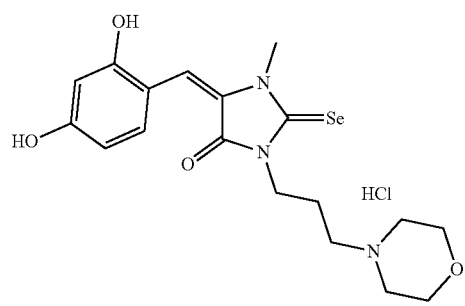 |
| 122 | 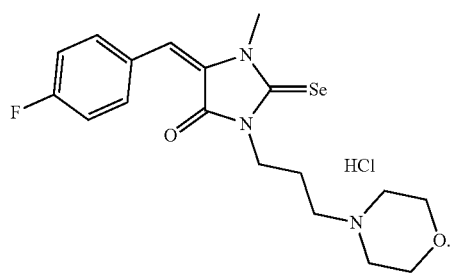 [SMILES: CN1C(=[Se])N(CCCN2CCOCC2)C(=O)/C1=C\c1ccc(F)cc1 ; Cl] |

11. A method for preventing or treating neurodegenerative disease selected from the group consisting of Parkinson's disease, Alzheimer's disease, Huntington's disease, Lou Gehrig's disease, and Lewy body related disease, the method comprising administering the compound according to claim 1 to an individual in need thereof.

12. A method for producing a compound represented by the following Chemical Formula 1 or a pharmaceutically acceptable salt of the compound, the method comprising:
reacting an amine compound represented by the following Chemical Formula 5 with formic acid to produce a formamide compound represented by the following Chemical Formula 6;
reacting the formamide compound with selenium (Se) under a condition containing one or more selected from the group consisting of triphosgene, dichloromethane, and triethylamine to produce an isoselenocyanate compound represented by the following Chemical Formula 7;
reacting the isoselenocyanate compound with an amino acid compound represented by the following Chemical Formula 8 in a solvent to produce a 1-alkyl-2-selenoxo-imidazolidine-4-on compound represented by the following Chemical Formula 9; and
reacting the 1-alkyl-2-selenoxoimidazolidine-4-on compound with an aldehyde-based compound represented by the following Chemical Formula 10 to produce the compound represented by Chemical Formula 1:

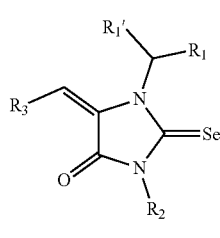

[Chem. 1]

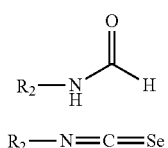

[Chem. 5]

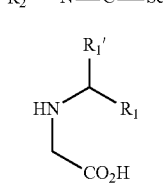

[Chem. 6]

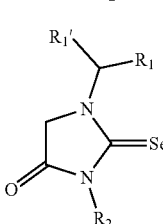

[Chem. 7]

[Chem. 8]

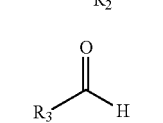

[Chem. 9]

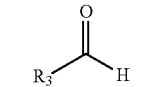

[Chem. 10]

where, $R_1$ and $R_1'$ are each independently selected from the group consisting of hydrogen, alkyl, cycloalkyl, heterocycloalkyl, an aryl group, heteroaryl, benzyl, and a phenethyl group, or $R_1$ and $R_1'$ may bond to each other to form a single ring;

$R_2$ and $R_3$ are each independently hydrogen, halo, cyano, alkyl, alkoxy, alkenyl, alkynyl, cycloalkyl, heterocycloalkyl, heterocycloalkyl-alkyl, aryl, aryl-alkyl, or heteroaryl; and the alkyl, alkoxy, alkenyl, alkynyl, cycloalkyl, heterocycloalkyl, heterocycloalkyl-alkyl, aryl, aryl-alkyl, or heteroaryl may not be substituted or may be substituted with one or more groups selected from the group consisting of hydroxy; halogen; alkyl; -alkyl-hydroxy; -heterocycloalkyl-alkyl-hydroxy; —NH alkyl-O-alkyl-hydroxy; —NH alkyl-O-alkyl-halogen; —NH alkyl-heterocycloalkyl; alkoxy; amino; dialkylamino; nitro; cyano; carbonyl; cycloalkyl; heterocycloalkyl unsubstituted or substituted with alkyl; aryl; and heteroaryl.

13. The method for producing a compound represented by Chemical Formula 1 or a pharmaceutically acceptable salt of the compound according to claim 12, wherein

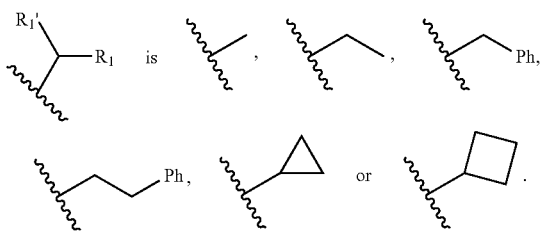

14. The method for producing a compound represented by Chemical Formula 1 or a pharmaceutically acceptable salt of the compound according to claim 12, wherein $R_2$ is hydrogen; $C_1$-$C_{12}$ alkyl; $C_1$-$C_6$ alkyl substituted with halogen; $C_3$-$C_8$ cycloalkyl; —$C_1$-$C_6$ alkyl-morpholine; phenyl unsubstituted or substituted with halogen or $C_1$-$C_6$ alkyl; or —$C_1$-$C_6$ alkyl-phenyl.

15. The method for producing a compound represented by Chemical Formula 1 or a pharmaceutically acceptable salt of the compound according to claim 12, wherein $R_3$ is phenyl, naphthyl, pyridine, piperazine, or imidazole, and the phenyl, naphthyl, pyridine, piperazine, or imidazole is not substituted or is substituted with one or more groups selected from the group consisting of hydroxy; halogen; $C_1$-$C_6$ alkyl; —$C_1$-$C_6$ alkyl-hydroxy; -piperazine-$C_1$-$C_6$ alkyl-hydroxy; —NH$C_1$-$C_6$ alkyl-O—$C_1$-$C_6$ alkyl-hydroxy; —NH$C_1$-$C_6$ alkyl-O—$C_1$-$C_6$ alkyl-halogen; —NH$C_1$-$C_6$ alkyl-morpholine; $C_1$-$C_6$ alkoxy; amino; di-$C_1$-$C_6$ alkylamino; pyrrolidine; piperidine; piperazine unsubstituted or substituted with $C_1$-$C_6$ alkyl; and morpholine.

16. The method for producing a compound represented by Chemical Formula 1 or a pharmaceutically acceptable salt of the compound according to claim 12, wherein the solvent is one or more selected from the group consisting of dioxane, methanol, ethanol, acetonitrile, tetrahydrofuran (THF), dimethylformamide (DMF), dimethyl sulfoxide (DMSO), and dichloroethylene (DCE).

* * * * *